United States Patent
Fitzgerald et al.

(10) Patent No.: US 9,881,152 B2
(45) Date of Patent: Jan. 30, 2018

(54) SYSTEM FOR MONITORING THE UNAUTHORIZED USE OF A DEVICE

(75) Inventors: William Fitzgerald, Cork (IE); Peter Bermingham, Cork (IE); Frank Hannigan, Cork (IE); Paul Prendergast, Cork (IE)

(73) Assignee: YOUGETITBACK LIMITED, Cork (IE)

( * ) Notice: Subject to any disclaimer, the term of this patent is extended or adjusted under 35 U.S.C. 154(b) by 1332 days.

(21) Appl. No.: 12/203,835

(22) Filed: Sep. 3, 2008

(65) Prior Publication Data

US 2009/0247122 A1    Oct. 1, 2009

Related U.S. Application Data

(63) Continuation-in-part of application No. 12/060,863, filed on Apr. 1, 2008.

(51) Int. Cl.
*G06F 21/55* (2013.01)
*G06F 21/30* (2013.01)
(Continued)

(52) U.S. Cl.
CPC .............. *G06F 21/55* (2013.01); *G06F 21/00* (2013.01); *G06F 21/121* (2013.01);
(Continued)

(58) Field of Classification Search
CPC ..... H04W 4/008; H04W 12/06; H04W 12/08; H04W 4/023; H04W 12/02; H04L 63/10;
(Continued)

(56) References Cited

U.S. PATENT DOCUMENTS

| 5,659,595 A | 8/1997 | Chanu et al. |
| 5,715,174 A | 2/1998 | Cotichini et al. |

(Continued)

FOREIGN PATENT DOCUMENTS

| CN | 1662028 | 8/2005 |
| CN | 101141722 | 3/2008 |

(Continued)

OTHER PUBLICATIONS

Anti-Thief; Symbian Brains Inc.; Jan. 13, 2007; http://www.sybianbrainsco.uk/.

(Continued)

*Primary Examiner* — Magdi Elhag
(74) *Attorney, Agent, or Firm* — Squire Patton Boggs

(57) ABSTRACT

The invention is directed to systems and methods for detecting the loss, theft or unauthorized use of a device and/or altering the functionality of the device in response. In one embodiment, a device monitors its use, its local environment, and/or its operating context to determine that the device is no longer within the control of an authorized user. The device may receive communications or generate an internal signal altering its functionality, such as instructing the device to enter a restricted use mode, a surveillance mode, to provide instructions to return the device and/or to prevent unauthorized use or unauthorized access to data. Additional embodiments also address methods and systems for gathering forensic data regarding an unauthorized user to assist in locating the unauthorized user and/or the device.

18 Claims, 64 Drawing Sheets

(51) Int. Cl.
*G06F 21/12* (2013.01)
*G06F 21/00* (2013.01)
*G06F 21/50* (2013.01)
*G06F 21/88* (2013.01)
*H04L 29/06* (2006.01)
*H04W 12/12* (2009.01)
*H04W 88/02* (2009.01)

(52) U.S. Cl.
CPC ............ *G06F 21/305* (2013.01); *G06F 21/50* (2013.01); *G06F 21/552* (2013.01); *G06F 21/554* (2013.01); *G06F 21/88* (2013.01); *H04L 63/1416* (2013.01); *H04W 12/12* (2013.01); *H04W 88/02* (2013.01)

(58) Field of Classification Search
CPC ..... H04L 63/20; H04L 63/08; H04L 63/0853; H04L 63/0428; H04L 63/1408; H04L 63/102; H04L 63/083; H04L 63/107; H04L 63/0823; H04L 63/1416; H04L 63/1441; G06F 21/44; G06F 21/31; G06F 21/00; G06F 21/34; G06F 21/88; G06F 21/554; G06F 21/577; G06F 21/55; G06F 21/552; G06F 21/121; G06F 21/305
USPC ....... 455/404.1, 404.2, 405, 410, 411, 412.1, 455/412.2, 418–420, 456.1
See application file for complete search history.

(56) References Cited

U.S. PATENT DOCUMENTS

| | | | |
|---|---|---|---|
| 5,802,157 A * | 9/1998 | Clarke et al. | 379/196 |
| 5,802,280 A | 9/1998 | Cotichini et al. | |
| 5,905,949 A | 5/1999 | Hawkes et al. | |
| 5,926,091 A | 7/1999 | Svensson et al. | |
| 5,945,915 A | 8/1999 | Cromer et al. | |
| 6,032,257 A | 2/2000 | Olarig et al. | |
| 6,064,305 A | 5/2000 | Lockyer | |
| 6,131,067 A | 10/2000 | Girerd et al. | |
| 6,145,004 A | 11/2000 | Walsh | |
| 6,154,790 A | 11/2000 | Pruett et al. | |
| 6,172,606 B1 | 1/2001 | Lockyer | |
| 6,259,367 B1 | 7/2001 | Klein | |
| 6,263,440 B1 | 7/2001 | Pruett et al. | |
| 6,269,392 B1 | 7/2001 | Cotichini et al. | |
| 6,300,863 B1 | 10/2001 | Cotichini et al. | |
| 6,311,291 B1 | 10/2001 | Barrett, Sr. | |
| 6,433,685 B1 | 8/2002 | Struble et al. | |
| 6,453,461 B1 | 9/2002 | Chaiken | |
| 6,463,276 B1 * | 10/2002 | Jonsson | 455/410 |
| 6,507,914 B1 | 1/2003 | Cain et al. | |
| 6,553,497 B1 | 4/2003 | Challener et al. | |
| 6,581,107 B1 | 6/2003 | Deac | |
| 6,594,254 B1 | 7/2003 | Kelly | |
| 6,606,662 B2 | 8/2003 | Nagasaki | |
| 6,614,349 B1 | 9/2003 | Proctor et al. | |
| 6,650,622 B1 | 11/2003 | Austerman, III et al. | |
| 6,661,372 B1 | 12/2003 | Girerd et al. | |
| 6,721,403 B1 | 4/2004 | Mandalia | |
| 6,725,379 B1 | 4/2004 | Dailey | |
| 6,728,767 B1 | 4/2004 | Day et al. | |
| 6,771,972 B2 | 8/2004 | McDonnell et al. | |
| 6,774,811 B2 | 8/2004 | Kaufman et al. | |
| 6,782,251 B2 * | 8/2004 | Kagay, Jr. | 455/410 |
| 6,796,506 B1 | 9/2004 | Pradhan et al. | |
| 6,804,699 B1 | 10/2004 | Henrie | |
| 6,810,420 B1 | 10/2004 | Buse et al. | |
| 6,813,487 B1 | 11/2004 | Trommelen | |
| 6,820,562 B2 | 11/2004 | Zodnik et al. | |
| 6,868,265 B2 | 3/2005 | Zodnik | |
| 6,912,399 B2 * | 6/2005 | Zirul et al. | 455/463 |
| 6,954,147 B1 | 10/2005 | Cromer et al. | |
| 6,975,204 B1 | 12/2005 | Silver | |
| 7,047,426 B1 * | 5/2006 | Andrews | G06F 21/88 707/E17.032 |
| 7,054,624 B2 | 5/2006 | Cochita | |
| 7,068,168 B2 | 6/2006 | Girshovich et al. | |
| 7,089,591 B1 | 8/2006 | Chi | |
| 7,099,927 B2 | 8/2006 | Cudd et al. | |
| 7,149,208 B2 | 12/2006 | Mattaway et al. | |
| 7,155,742 B1 | 12/2006 | Szor | |
| 7,159,013 B2 | 1/2007 | Cudd et al. | |
| 7,159,149 B2 | 1/2007 | Spiegel et al. | |
| 7,167,912 B1 | 1/2007 | Dhingra | |
| 7,181,195 B2 | 2/2007 | Booth et al. | |
| 7,194,321 B2 | 3/2007 | Sun et al. | |
| 7,200,220 B1 | 4/2007 | Yamao | |
| 7,200,652 B2 | 4/2007 | Cheston et al. | |
| 7,203,959 B2 | 4/2007 | Nachenberg et al. | |
| 7,216,348 B1 | 5/2007 | deCarmo | |
| 7,230,534 B2 | 6/2007 | Elledge | |
| 7,249,187 B2 | 7/2007 | Sobel et al. | |
| 7,257,374 B1 | 8/2007 | Creigh | |
| 7,286,522 B2 | 10/2007 | Preston et al. | |
| 7,296,293 B2 | 11/2007 | Isenberg | |
| 7,319,397 B2 * | 1/2008 | Chung et al. | 340/572.4 |
| 7,350,715 B2 | 4/2008 | Pradhan et al. | |
| 7,409,219 B2 | 8/2008 | Levitan | |
| 7,715,824 B2 * | 5/2010 | Zhou | 455/412.1 |
| 7,844,247 B2 * | 11/2010 | Chen et al. | 455/404.1 |
| 2003/0005316 A1 | 1/2003 | Girard | |
| 2003/0181219 A1 * | 9/2003 | Huang | 455/558 |
| 2004/0117660 A1 | 6/2004 | Karaoguz et al. | |
| 2004/0124239 A1 | 7/2004 | Feld | |
| 2005/0027844 A1 | 2/2005 | Hariprasad et al. | |
| 2005/0044404 A1 | 2/2005 | Bhansali et al. | |
| 2005/0046584 A1 | 3/2005 | Breed | |
| 2005/0073389 A1 | 4/2005 | Chandley | |
| 2005/0138356 A1 | 6/2005 | Hurwitz | |
| 2005/0149741 A1 | 7/2005 | Humbel | |
| 2006/0021006 A1 | 1/2006 | Rensin et al. | |
| 2006/0055532 A1 | 3/2006 | Li | |
| 2006/0075263 A1 | 4/2006 | Taylor | |
| 2006/0128460 A1 | 6/2006 | Muir et al. | |
| 2006/0161628 A1 | 7/2006 | Nagy et al. | |
| 2006/0253904 A1 | 11/2006 | Bhansali et al. | |
| 2006/0272020 A1 * | 11/2006 | Gardner | G06F 9/4411 726/23 |
| 2007/0234427 A1 | 10/2007 | Gardner et al. | |
| 2007/0252675 A1 * | 11/2007 | Lamar | 340/5.64 |
| 2008/0035722 A1 | 2/2008 | Feld | |
| 2008/0070631 A1 | 3/2008 | Kumar | |
| 2008/0076459 A1 * | 3/2008 | Shaju | 455/466 |
| 2008/0079581 A1 | 4/2008 | Price | |
| 2009/0249443 A1 * | 10/2009 | Fitzgerald et al. | 726/2 |
| 2009/0249460 A1 * | 10/2009 | Fitzgerald et al. | 726/7 |
| 2009/0249497 A1 * | 10/2009 | Fitzgerald et al. | 726/35 |
| 2009/0251282 A1 * | 10/2009 | Fitzgerald et al. | 340/5.31 |
| 2009/0253406 A1 * | 10/2009 | Fitzgerald et al. | 455/410 |
| 2009/0253408 A1 * | 10/2009 | Fitzgerald et al. | 455/411 |
| 2009/0253410 A1 * | 10/2009 | Fitzgerald et al. | 455/411 |

FOREIGN PATENT DOCUMENTS

| | | |
|---|---|---|
| EP | 1170969 A1 | 1/2002 |
| GB | 2338101 | 8/1999 |
| GB | 2395079 | 5/2004 |
| GB | 2425763 | 11/2006 |
| JP | 05217922 | 8/2005 |
| JP | 05223845 | 8/2005 |
| WO | 00/78057 | 12/2000 |
| WO | 01/84455 | 11/2001 |
| WO | 02/19121 | 3/2002 |
| WO | 02/084615 | 10/2002 |
| WO | 2004/008268 | 1/2004 |
| WO | 2006/102399 | 9/2006 |

OTHER PUBLICATIONS

Ultimate Theft Alert v3 for Pocket PCs; PocketPC—Live!; Sep. 3, 2007.

(56) References Cited

OTHER PUBLICATIONS

Examination Report issued by the European Patent Office on Sep. 26, 2014 for related European Patent Application No. 09728909.4.

Notification of Transmittal of the International Search Report and the Written Opinion of the International Searching Authority, or the Declaration dated Jan. 27, 2010 for related International Application PCT/IB2009/05503 issued by the European Patent Office.

Notification of Transmittal of the International Search Report and the Written Opinion of the International Searching Authority, or the Declaration dated Feb. 1, 2010 for related International Application PCT/IB2009/05553 issued by the European Patent Office.

Office Action issued by the State Intellectual Property Office of China dated Feb. 1, 2013 for related Chinese application 200980121241.9.

Office Action issued by the State Intellectual Property Office of China dated Feb. 1, 2013 for related Chinese application 200980121255.0.

\* cited by examiner

SYSTEM FOR MONITORING THE UNAUTHORIZED USE OF A DEVICE

CROSS REFERENCE TO RELATED APPLICATIONS

This application is a continuation-in-part of U.S. Utility patent application Ser. No. 12/060,863 filed Apr. 1, 2008 titled, "System For Monitoring the Unauthorized Use Of A Device," the disclosure of which is fully incorporated herein by reference for all purposes.

NOTICE OF INCLUDED COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. All trademarks and service marks identified herein are owned by the applicant.

DESCRIPTION OF THE INVENTION

Field of the Invention

The present invention relates to systems and methods for altering the function of an electronic device in response to the device being lost, stolen or used in an unauthorized manner. The altered functionality could facilitate (1) the return of the device, and/or (2) altering the operation of the device. The invention may also facilitate the monitoring of an unauthorized user of the device.

Background of the Invention

Today, the use of electronic devices is widespread. Such devices can increase a user's productivity and quality of life, but they are susceptible to loss, theft, or unauthorized use. Examples of such devices are cellular phones, portable digital assistants (PDAs), digital cameras, and laptop computers. These devices often carry private, confidential and/or difficult-to-replace data, and the loss of such data further compounds the loss of the electronic device since, while an electronic device that has been lost or stolen can be physically replaced, oftentimes the data stored on such a device is confidential and/or irreplaceable.

Additionally, the authorized user (which may or may not be the owner) of a lost or stolen device may have to deal with ramifications, such as the misuse of information if an unauthorized user (as used herein, "unauthorized user" means anyone than the authorized user or someone authorized by the authorized user to use the device) gains access to information stored on the device. Further, it is not uncommon for hours or even days to elapse before the owner or authorized user of such a device discovers the loss, and during that time, an unauthorized user may be accessing sensitive data, misappropriating information, or running up charges for goods or services on the authorized user's accounts.

SUMMARY OF THE INVENTION

Both the foregoing summary and the following detailed description are exemplary and explanatory only and are not restrictive of the invention as claimed.

Methods and systems according to the present invention provide one or more of the following functions: (1) enhancing the likelihood that the device is recovered by providing information to assist the unauthorized user in returning the device, (2) altering the function of the device (optionally including the prevention of access to information on the device), and (3) obtaining information about the unauthorized user to improve the chance that the unauthorized user will be identified and both the unauthorized user and device located. Further, a system and method of the invention may provide a rapid response to alert the authorized user that the device has either been misplaced or stolen.

BRIEF DESCRIPTION OF THE DRAWINGS

A more complete understanding of the present invention may be derived by referring to the detailed description and claims when considered in connection with the following illustrative figures.

FIGS. 26-37 depict exemplary screens and processes associated with a host server as exemplified by embodiments of the present invention.

DETAILED DESCRIPTION OF EXEMPLARY EMBODIMENTS

Figure 1:
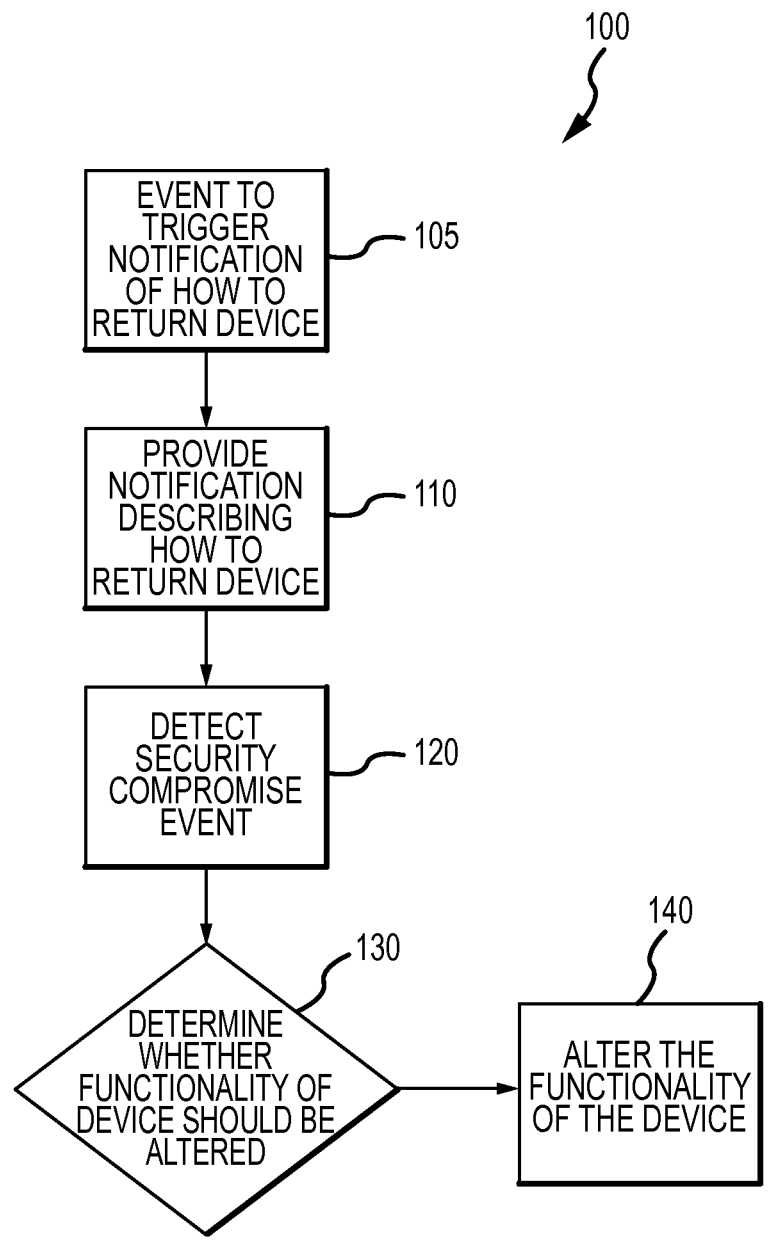
FIG. 1 is a flow diagram depicting an exemplary process of the present invention.
Figure 2:
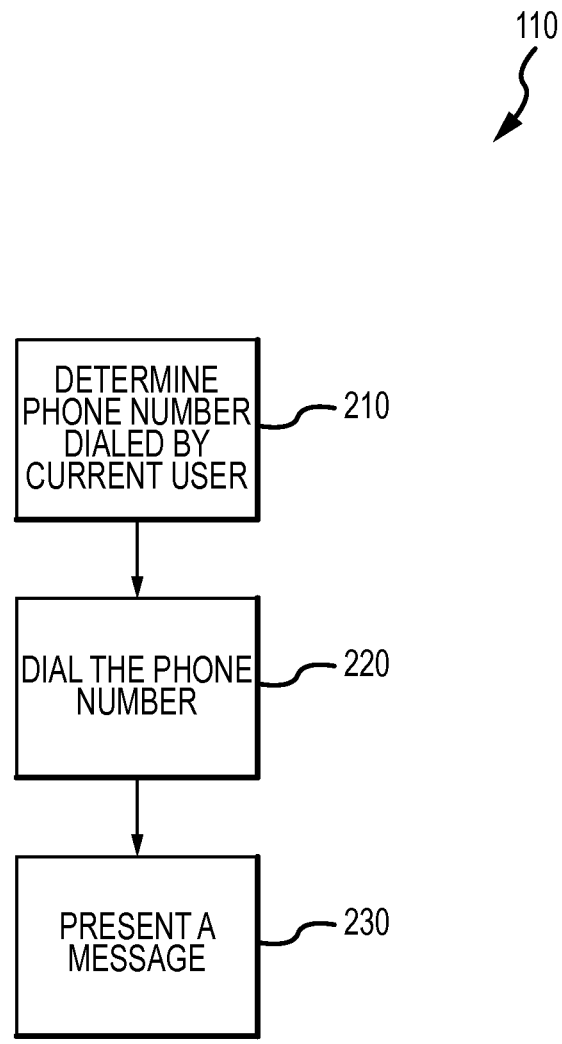
FIG. 2 is a flow diagram depicting an exemplary process of the present invention with respect to a device on which telephone calls can be made.
Figure 3:
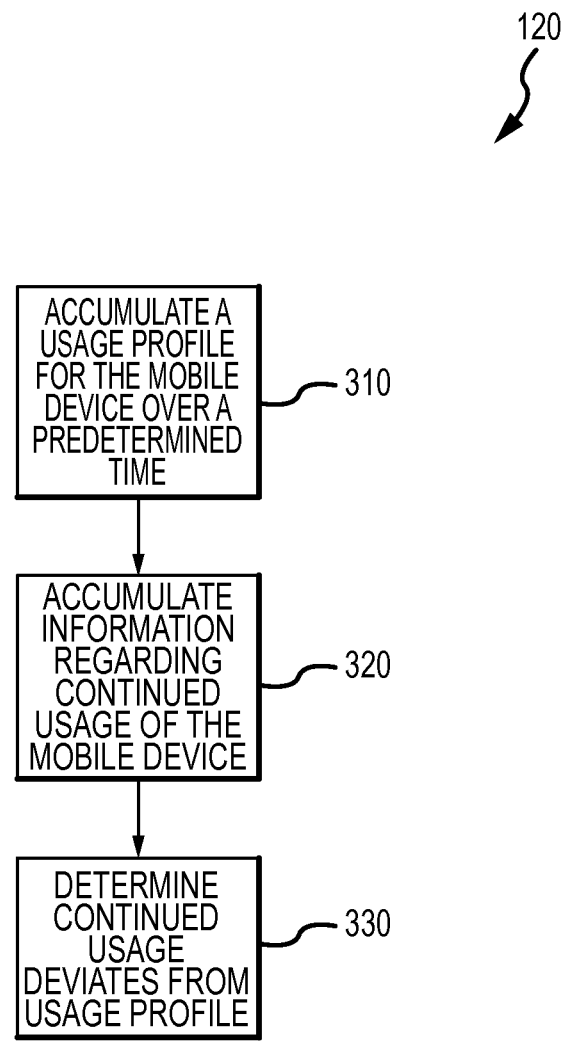
FIG. 3 is a flow diagram depicting substeps of step 120 according to an exemplary method of the invention.
Figure 4:
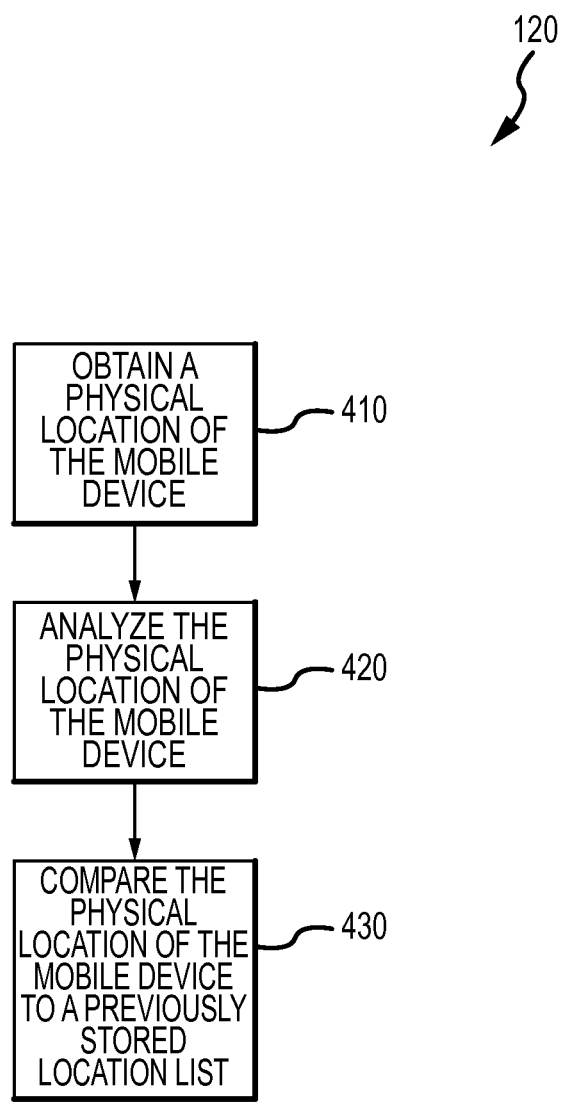
FIG. 4 is a flow diagram depicting substeps of step 120 according to an exemplary method of the invention.
Figure 5:
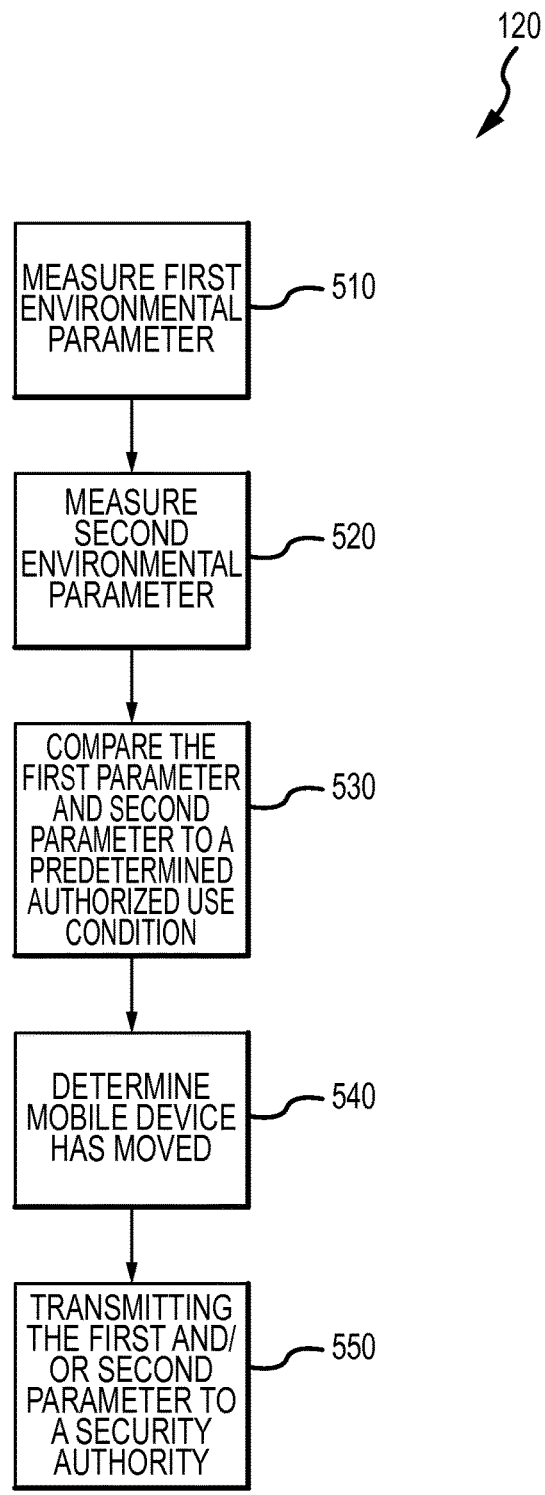
FIG. 5 is a flow diagram depicting substeps of step 120 according to an exemplary method of the invention.

As used herein, the term "mobile device," "mobile electronic device," or "device" generally refers to any electronic device capable of being lost or stolen. A mobile device may be a stand-alone device such as a laptop computer, a desktop computer, a mobile subscriber communication device, a mobile phone, a personal digital assistant (PDA), a data tablet, a digital camera, a video camera, a video game console, a media player, a global positioning system (GPS), Universal Serial Bus (USB) keys, mobile weapons, and combinations thereof. A mobile electronic device may also be any electronic device integrated with another system or device. For example, a stereo, global positioning system, or other electronic device contained within a vehicle may be monitored and protected in accordance with the present invention. Software to implement methods of the present invention can be (1) installed on, or (2) downloaded onto a mobile device indirectly or directly at any time by an authorized user through the Internet, SMS text message, or in any other suitable manner and at any suitable time for carrying out a method according to the invention. For example, the software may be installed on the device when purchased or downloaded after the device is purchased, or even after the device is lost or stolen. The mobile device may be insured against loss or theft, and systems and methods of the present invention may operate as part of, or in addition to, an insurance policy on the mobile device.

An authorized user of a mobile device may qualify for a lower insurance premium if the insured mobile device is protected by a lockout or recovery service as provided by embodiments of the present invention. In another embodiment, an insurance company may mandate recovery or lockout services be provided with an insured device where a claim against the policy may result in replacement for lost or stolen mobile devices. Therefore, embodiments of the present invention assist with preventing insurance fraud. For example, if a parent buys a new phone and insures the phone against loss or theft, the parent may desire to give the insured phone to one of his/her children and file an insurance claim to replace the donated phone, claiming it as a lost or stolen device, thus avoiding the cost of purchasing a new phone. The present invention may be used to prevent such a fraudulent claim, by, for example, disabling use of the alleged lost or stolen phone, detecting attempted use of the alleged lost or stolen phone, or tracking location or users of the alleged lost or stolen phone.

In one embodiment, a mobile device operating in conjunction with the present invention includes a wireless transceiver to communicate with other systems and devices through a wireless system such as a wireless mobile telephony network, General Packet Radio Service (GPRS) network, wireless Local Area Network (WLAN), Global System for Mobile Communications (GSM) network, Personal Communication Service (PCS) network, Advanced Mobile Phone System (AMPS) network, and/or a satellite communication network. Mobile devices operating in conjunction with the present invention may also communicate with other systems and devices through any other type of connection, such as a wired Internet connection, a wireless Internet connection, a cellular telephone network connection, a wireless LAN connection, a wireless WAN connection, an optical connection, a USB connection, a mobile device synchronization port connection, a power connection, and/or a security cable.

Systems and methods of the present invention may be employed as part of a subscriber-based service to help protect and recover a wide variety of different mobile devices. Authorized users can be linked to multiple mobile devices using a unique identifier for each device. Any suitable identifier may be provided, such as the serial number of the mobile device (or a component thereof), or a numeric, alphabetic, alphanumeric, or other identifier. The identifier can be used to verify the identity of authorized users associated with the device, as well as to monitor the mobile device and provide for its recovery should it be lost or stolen. In one embodiment of the present invention, for example, the identifier and information for associated authorized users may be stored in a storage medium (such as a memory on the mobile device or a central server) for future reference.

Moreover, a system and method according to the invention may have a different response for different inputs or conditions, including the sensing of varying threat levels. For example, a laptop sensing that it is in a prohibited area (such as outside of a building to which it is assigned or in a foreign country) might prevent access with one or more encryption techniques, delete data or corrupt the hard drive to make data retrieval difficult or impossible. The same laptop, upon receiving a signal that it is lost within a building to which it is assigned could simply provide notification describing how to return the laptop.

Any combination and/or subset of the elements of the methods depicted herein may be practiced in any suitable order and in conjunction with any suitable system, device, and/or process. The methods described and depicted herein can be implemented in any suitable manner, such as through software operating on the mobile device and a host server. The software may comprise computer-readable instructions stored in a medium (such as the memory of the mobile device or host server) and can be executed by one or more processors to perform the methods of the present invention.

Turning now to the figures, where the purpose is to describe preferred embodiments of the invention and not to limit same, exemplary methods according to various aspects of the present invention are depicted in FIGS. 1-7.

In method 100 illustrated in FIG. 1, a notification is provided by a mobile device to an authorized user (110) describing how to return the mobile device. As used herein, "unauthorized user" means any person other than the authorized user. The notification can be provided in any number of ways and be triggered by any suitable event. For example, the notification may be a visual display or an audio signal, such as a voice. The notification should provide adequate information to the unauthorized user to enable the unauthorized user to return the device, and could include one or more of a phone number, address or email address. The notice could also offer a reward for return of the device.

The notice could be triggered in any suitable manner. For instance, the authorized user could send a signal to the device to display the notice, or the authorized user could contact a service that would send a signal to the device to activate the notice. The notice could also be displayed automatically, for example, if the wrong password were keyed in a predetermined amount of times or if the device sensed it was in a certain geographical area. Any other suitable self-triggering event could also be utilized.

Another and optional feature of the device is detection of a security compromise event (120) and a determination (130) of whether the function of the device should be altered in response to the security compromise event. If appropriate, the functionality of the device is altered (140) if a security compromise event (including the device being lost or stolen).

Providing Notification Describing how to Return the Mobile Device

In an exemplary process 100 according to the present invention depicted in FIG. 1, an event 105 triggers a notification to be provided 110 by the device describing how to return the device. The notification may be provided in any manner, such as by using a display, microphone, or other user interface feature(s) of the mobile device. The notification may include any symbols, characters, numbers, graphics, sounds (including recorded voice messages and/or music), and/or any other indicia to aid in describing how to return the device (for example a message displayed on a screen).

The notification may include, for example, one or more of a telephone number for a service providing recovery instructions or the telephone number of the authorized user, a turn-in location or address, instructions to activate a feature of the mobile device to initiate a return process, a web address for a service providing recovery instructions, and/or a clickable link to a website comprising recovery instructions. The notification may also include a message that a reward is available for turning in the device to a recovery service. In one embodiment of the present invention, the notification is displayed on the login screen (including the mechanism for returning the device) such that it is the first information seen by a user before the user can access the device. If an authorized user (such as the owner) fears they have lost control of the device they can remotely activate the application on the mobile device and make sure that access is restricted to only showing a notification and details on how to return the device. One benefit of this approach is the preservation of the confidential nature of the information located on the mobile device, essentially protecting sensitive information from unauthorized access. An innocent finder of the mobile device is also able to return the device without having to bypass or break the password on the mobile device to determine the identity of the authorized user.

When the notification is provided a separate signal or message that the mobile device has been lost or stolen. The notification can help an unauthorized user of the mobile device return it to its authorized user, and the notification is likely to increase the probability that the unauthorized user will do so, since he/she is provided with the appropriate instructions or information. Additionally, the conspicuousness of the notification may also deter an unauthorized user who is a thief from stealing the mobile device or attempting to keep, use, or sell the mobile device.

The notification may be provided to any person (such as the unauthorized person currently in possession of the mobile device), as well as other individuals, systems, and devices in communication with the mobile device. In one exemplary embodiment of the present invention, referring to FIG. 2, providing a notification (110) describing how to return a mobile device (such as a mobile phone) may include: determining a phone number (210) dialed by the current unauthorized user of the mobile device, calling the phone number (220), and presenting a message (such as pre-recorded, text or message from a live person) (230). The message may include any desired information, such a notice that the mobile device has been reported lost or stolen, and/or instructions to assist in initiating return of the mobile device.

Alternate embodiments may include presenting an SMS text message, an email message (e.g., sent to an email address of the current user), a sequence of dual-tone multi-frequency (DTMF) tones, and/or any other message type. This allows the mobile device to alert the unauthorized user in possession of the mobile device that he/she is not authorized to use the device and/or provides instructions on how to return the device. This may expedite the return of the mobile device, as well as to deter individuals from stealing or withholding the device from its rightful owner.

The notification may be provided using some or all of the user interface capabilities of the mobile device. For example, a notification for a laptop computer may include a large, message on the screen to draw the attention of observers that it is protected, and/or one or more sounds (including music, pre-recorded speech and alarm) played through the laptop's speaker. Similarly, a cell phone could present a text display and/or emit sounds to instruct the unauthorized user how to return the device or an alarm sound to attract attention to the unauthorized user and make it undesirable to keep the device. The notification may be presented through one or more of any other user interface feature(s) integrated with, or in communication with, the mobile device, such as a printer.

Detecting a Security Compromise Event

In the exemplary method shown in FIG. 1, the mobile device detect that a security compromise event (120) has occurred. As used herein, a "security compromise event" generally refers to any situation where the mobile device (or any physical or functional portion thereof) is (or may be) outside the exclusive control of an authorized user, and a device may be able to detect multiple types of security compromise events, in which case the device may have different responses for different types of security compromise events.

The mobile device may in various embodiments include a removable or interchangeable SIM card. In an implementation of methods of the present invention, detecting that a security compromise event has occurred further comprises detecting that a SIM card associated with the mobile device has been exchanged. Detecting the exchange may be by any method, such as detecting that an access door to a SIM card storage area has been opened, detecting that an identifier within the SIM card does not match a stored identifier corresponding to a previous SIM card in use by the mobile device, or detecting the failure of an authorization protocol between the SIM card and the mobile device.

In one embodiment, detecting that a security compromise event has occurred further comprises obtaining from the authorized user a set of criteria indicating unauthorized use of the mobile device; and determining that at least one of the criteria indicating unauthorized use has occurred. The criteria may comprise any information specified by the user that may indicate conditions or limits indicating that the device is not being used in an authorized manner. For example, the criteria indicating unauthorized use of the mobile device may comprise at least one of: a maximum number of calls that may be placed to numbers not included in a pre-stored authorized number list; a maximum number of calls that may be received by numbers not included in the pre-stored authorized number list; and a call being placed to a country code not included in the pre-stored authorized number list. In one embodiment, the set of criteria indicating unauthorized use of the mobile device are stored in the mobile device. In another embodiment, the set of criteria indicating unauthorized use of the mobile device are stored in a database associated with a security authority.

The mobile device may include a read-only memory. For purposes of the present application, a read only memory (also known as a "ROM") includes not only non-modifiable memories such as mask ROMs and one-time programmable PROMs, but also persistent memories that may not be directly or indirectly modified through the user interface of a mobile device. Such persistent memories may include such storage devices such as field programmable ROMs, EPROMs, EEPROMs, FLASH memory, magnetic storage devices, optical storage devices, or other storage devices. In various embodiments of the present invention, an application may reside in a read-only memory of the mobile device detects that a security compromise event has occurred. In selected instances, the application may not be terminated by a current user of the mobile device if the current user is not the authorized user, providing additional security to prohibit unauthorized users from tampering with security protocols.

A security compromise event may be actual (e.g., the mobile device has actually been stolen), or perceived (e.g., an authorized user is uncertain as to the status of the mobile device, but believes it may be lost or stolen). A security compromise event may include the loss of control of the mobile device by the authorized user, the theft of the mobile device, a loss of knowledge as to the whereabouts of the mobile device, the intrusion of an electronic threat (e.g., an electronic virus, an electronic worm, and/or an electronic trojan horse), the unauthorized access or attempted unauthorized access to private information in the mobile device, use of the mobile device in a manner not authorized by a wireless service provider, the device sensing it is in an unauthorized location, entering an incorrect password multiple times, any other event where compromise of the ownership or security of the mobile device is indicated.

A security compromise event may be detected by the mobile device itself, and may be also be reported by an authorized user directly to the device or indirectly such as through a security authority or other entity, system or device in communication with the mobile device.

The mobile device may detect a security compromise event in any manner, such as by receiving a message from an authorized user or a security authority (such as a governmental law enforcement organization, private security firm, and/or insurance agency), and in response to the message determining that a breach of security has occurred. The security authority may communicate with the mobile device in any desired manner, such as through software operating on a host server in communication with a database. As an example, an authorized user can report his/her mobile device is missing to the security authority and instruct the security authority to signal the mobile device of a security threat (i.e., the user believes the mobile device has been lost, stolen, or may otherwise be subject to unauthorized access). The functionality of the mobile device can then be altered as a result (140), as discussed further below.

The mobile device may authenticate the validity of a message from a security authority, such as by computing a digest of the message and comparing the digest value to a previously stored authorization digest value. The computed digest value may be produced by providing the received message to a hashing algorithm such as the MD5 or SHA-1 Secure Hashing Algorithm as specified in National Institute of Standards and Technology Federal Information Processing Standard Publication Number 180-1, the disclosure of which is incorporated by reference herein in its entirety. The authorization digest value can be any number, code, value, or identifier that allows a received message to be identified as a valid transmission from a security authority. The stored authorization digest value can be provided to the mobile device upon activation of a loss/theft recovery service, as well as in any other desired manner. Unless the authorization digest value matches the stored digest value, the message will not be authenticated and can be disregarded (if desired). A mobile device acting on a message from a security authority need not necessarily be predicated upon successful authentication of the message, however. The mobile device may authenticate the validity of the message in any other desired manner.

The mobile device may also authenticate the validity of a message from a security authority or other source by decrypting at least part of the message with a public key associated with the sender of the message as part of an asymmetric encryption algorithm. Asymmetric encryption algorithms and techniques are well known in the art. See, for example, RSA & Public Key Cryptography, by Richard A. Mollin, CRC Press, 2002, and U.S. Pat. No. 4,405,829, issued Sep. 20, 1983, the disclosures of which are fully incorporated by reference herein. In an illustrative example, if two parties (for example, "Alice" and "Bob") wish to communicate securely using public key cryptography, each party begins by generating a unique key pair, where one of the keys is a private key that is kept in confidence by that party, and the other key is a public key that may be publicly distributed, published only to a message recipient, or made available through a public key infrastructure. The key generation step need be done by a party only once, provided that the party's private key does not become compromised or known by another party. If Alice wants to send a message confidentially to Bob, she may use Bob's public key to encrypt the message, and once sent, only Bob can decrypt and view the message using Bob's private key. But if Alice also wanted Bob to have assurance that the message was in fact coming from her, she could further encrypt the message with her private key before sending, then when Bob's private key and Alice's public key are used to decrypt the message, Bob knows for certain that he was the intended recipient and that Alice was the one who originated the message, and Alice knows that only Bob will be able to decrypt and read her message.

Such a scheme may be utilized with embodiments of the present invention. In an embodiment, full two-way public encryption is used to authenticate that the sender is in fact the security authority (for example) and that the recipient of the message indicating a security compromise event has occurred is in fact the intended recipient. Alternatively, messages may be encrypted with only the private keys of the sending entity, and decrypted with the public keys to expedite processing time. Such encryption schemes assist with validation of security compromise event communications, both in providing validation of the source and destination of messages, as well as providing a means to security transmit commands to a compromised mobile device.

In alternate embodiment, encrypted or unencrypted data can be transmitted to and from the mobile device through an encrypted transmission protocol, such as the wireless encryption protocols (WEP, WPA and WPA2) associated with the IEEE 802.11 wireless protocols. Any number of other encryption methods can be used to encrypt data communicated to and from the mobile device in conjunction with the present invention.

A mobile device operating in conjunction with the present invention may receive information that a security compromise event has occurred from a security authority or other source using any number of messages in any format. For example, embodiments of the present invention may receive information in an SMS text message, a voice mail message, an email message, and/or a predetermined sequence of one or more DTMF tones. The message can be of any desired format. For example, the message can be included in a file having a tokenized format such as standard ASCII text format, or any other suitable standardized file format, such as an MS Word document, MS Excel file, Adobe PDF file, or binary picture file (JPEG, bitmap, etc.). The data within such a file can be ordered in any manner and have any suitable delimiters, notations, or other features. The message may also have a unique and/or propriety format.

In one embodiment, the message indicating a security compromise event occurred may be encoded in files such as binary picture files via steganographic techniques, so that any person viewing the file or picture may see an acceptable image while a hidden message is encoded in the data in the file and may be accessed by appropriate software techniques.

For example, by sending a graphic image in a file that is named in a manner to solicit a user to open the message/file (for example, "HotJessica.JPG"), then the current user of the mobile device may open the file which then triggers software on the mobile device to scan the image file, thereby extracting and decoding the steganographically encoded data from the image file. The mobile device may then interpret the decoded data, and if a lockdown event is indicated, the device may take predetermined actions to partially or completely disable use of the device in any of the manners described herein. The software on the mobile device may execute surreptitiously, whereby the application may execute forensic evidence gathering features such as taking a picture of the current user's face while the user is looking at the image file just opened while the current user is unaware that he/she is being photographed or otherwise logged. Other commands may be sent via encoded or concealed messages, such as commands resetting the password of the device to an alternate or more secure password.

The format of the message can also be based on the method by which the message is transmitted to the mobile device. For example, where the message is transmitted to the mobile device using a wireless telephone connection, the message can be formatted as an SMS text message. Similarly, the message may be formatted as an XML record, email, and/or facsimile. The message can include multiple formats and/or multiple messages, and may be formatted having different formats for transmission in a variety of methods or to a variety of different mobile devices. A message received from a security authority, host server, authorized user, or other source may also include other information, such as instructions for altering the functionality of the mobile device as discussed further below.

In one embodiment of the present invention, a mobile device may be configured to assume a low-power, quiescent, or standby state, whereby the device may receive notifications from an authorized user or server such as a server administered by a security authority. Upon receiving such notification, the mobile device may take action at an appropriate time, based on contents of the notification. The mobile device may transition from a standby state to poll a server to determine whether a notification is waiting, and if so, downloads and acts upon the contents of the notification. Additionally or alternatively, the mobile device has a buffering provision that is capable of receiving notifications transmitted by a server or security authority, and acting upon the contents of the message at an appropriate time, such as when the message is received or at a predetermined time interval.

A mobile device may also detect a security compromise event by determining that the mobile device has been disassociated from a designated companion device. The mobile device may be associated with any desired type of device(s). For example, a mobile telephone may be a companion device to another mobile telephone. The two mobile telephones may be associated through a wireless connection (such as a Bluetooth connection), and the loss of the wireless connection may be used to trigger a security compromise event. Similarly, a security compromise event can be triggered when a mobile device is separated from a plurality of companion devices.

The mobile device may determine that it has been disassociated from the companion device in any desired manner, such as by measuring a power level of a wireless signal transmitted by the companion device, and determining that the measured power level has decreased below a predetermined threshold level.

Additionally, the mobile device can determine it has been disassociated from the companion device by transmitting a message to the companion device and determining that a message was not received from the companion device that satisfies a predetermined confirmation criterion (e.g., an expected acknowledgement transmission). Additionally, the mobile device can determine it has been disassociated from the companion device where it is unable to establish a communications link with the companion device, or where the companion device sends a signal to the mobile device indicating that access to the mobile device should be restricted. The mobile device may determine it has been disassociated from the companion device when an amount of incident light illuminating at least one surface of the mobile device has varied from a predetermined threshold range. For example, if the mobile device is removed from a companion device such as a purse, carrying case, holster or briefcase, the increase in ambient light on at least one surface of the mobile device could be detected by an included sensor, indicating the device has been removed from a desired location. Similar approaches may include activating a security event check when, a case enclosing the mobile device is opened or if a light sensor in a mating surface between the mobile device and its companion device suddenly detects light when the two devices are disconnected or undocked.

Other embodiments for determining that the mobile device has been disassociated from the companion device are provided, including measuring a current power level of a wireless signal transmitted by the companion device; and determining that the measured current power level has decreased by a predetermined amount. A plurality of power levels of the wireless signal transmitted by the companion device may be measured; and from these measurements steps may include computing an average power level from the plurality of measured power levels; measuring a current power level of a wireless signal transmitted by the companion device; determining that the measured current power level has varied from the average power level by a predetermined amount. In yet another embodiment, determining that the measured current power level has varied from the an average power level by a predetermined amount further comprises: computing a standard deviation of the plurality of measured power levels; and determining that the current power level exceeds an allowed signal range determined by a predetermined constant times the standard deviation of the plurality of measured signals. One or more standard deviations may be desirable, based on the desired sensitivity of the system to fluctuations in signal strengths. For instance, in an electronically noisy environment or when the mobile device by necessity needs to move small distances with respect to the companion device, the predetermined range or standard deviations may be set to a higher level, such as plus or minus three standard deviations.

In another embodiment, determining that the mobile device has been disassociated from the companion device comprises: measuring a plurality of power levels of a wireless signal transmitted by the companion device; computing an average power level from the plurality of measured power levels; measuring a plurality of current power levels of a wireless signal transmitted by the companion device; determining that for a predetermined number of times within a predetermined time period, one of the plurality of current power levels has varied from the average power level by a predetermined amount. In such an embodiment, for example, it is the relative change of signal power levels compared to a measured average that determines when a security event is triggered, so the system adapts over time to changes in the signal environment and relative motions of the mobile device and the companion device.

The mobile device may be associated with a companion device in any desired manner, such as by pairing the mobile device with the companion device via a wired link and/or a wireless link. Any desired wireless link and communications protocol may be used to pair a mobile device with a companion device. For example, a wireless link may include an ISO 14443 protocol, an ISO 18000-6 protocol, a Bluetooth protocol, a Zigbee protocol, a Wibree protocol, an IEEE 802.15 protocol, an IEEE 802.11 protocol, an IEEE 802.16 protocol, an ultra-wideband (UWB) protocol; an IrDA protocol, and combinations thereof. Likewise, a wired link may be implemented to pair a mobile device with a companion device, such as by using a computer network connection, a USB connection, a mobile device synchronization port connection, a power connection, and/or a security cable.

In various embodiments, when the companion device is disassociated from the mobile device, the mobile device is further configured to format a message for transmission to a security authority, the message comprising information regarding the disassociation of the mobile device with the companion device; wherein the message is formatted by the companion device. The formatted message may comprise any desired information and may be transmitted to the security authority by wired or wireless means, such as by a cell phone link, or a wired or wireless network interface. The information regarding the disassociation of the mobile device with the companion device comprises, for example: a date that the companion device and the mobile device were disassociated; a time that the companion device and the mobile device were disassociated; a location that the companion device and the mobile device were disassociated; an identifier corresponding to the mobile device; an identifier corresponding to the companion device; and an identifier corresponding to a current user of the mobile device.

A security compromise event may be associated with a change in the hardware of the mobile device. For example, a security compromise event may be determined when an identifier of a hardware identity module (such as a universal subscriber identity module and/or a removable user identity module) in communication with the mobile device does not match one or more predetermined authorized identifiers. Any desired identifier may be used in conjunction with the present invention, such as an electronic serial number, a local area identity identifier, an integrated circuit identifier, an international mobile subscriber identifier, an authentication key identifier, and/or an operator-specific emergency number identifier.

The hardware identity module identifier may be transmitted to a host server, stored in a storage medium (such as the memory of the mobile device or host server), or processed in any other desired manner. For example, the identifiers associated with hardware of a mobile device (e.g., hard drive, SIM card, or other hardware) can be used to determine whether an unauthorized user is attempting to circumvent software or hardware security protocols protecting the mobile device. The hardware identity module identifier (as well as any other data used in conjunction with the present invention) may be stored in any suitable manner, such as by using a memory storage device integrated with, or in communication with, the mobile device. The hardware identity module may also be encrypted, hidden, or protected in any other desired manner.

A security compromise event can be based on a change in a single hardware component of a mobile device, as well as on an overall hardware configuration of the mobile device. For example, the hardware configuration for a mobile device such as a laptop computer may include the identities of a particular hard drive, battery, RAM, BIOS, and other components of the laptop. The hardware configuration for the laptop can be stored (e.g., by a central server and/or the mobile device) and then compared against the current hardware configuration for the laptop (e.g., periodically and/or upon the occurrence of an event, such as a change in a hardware component). If the current hardware configuration has changed from the stored configuration beyond a predetermined threshold (e.g., more than two individual components are different), a security compromise event can be triggered. This allows a security compromise event to be issued where a thief may be swapping out components of a stolen mobile device in an attempt to circumvent security measures associated with (or stored on) the swapped components. Changes in the hardware configuration of a mobile device (such as changes in SIM card) can be tracked over time and reported to a security authority or authorized user to help locate the mobile device.

A security compromise event may be determined based on the use of the mobile device and/or the behavior of the current user. For example, referring to FIG. 3, determining a security compromise event (120) may include accumulating a usage profile of the mobile device over a predetermined time period (310), accumulating information regarding continued usage of the mobile device (320), and determining that the continued usage deviates from the usage profile by a predetermined threshold (330).

The usage profile and the accumulated information may include any desired information about how the mobile device is used, such as a ratio of the number of calls placed from numbers residing within a contact list stored in the mobile device to numbers not residing within the contact list, the time of day that one or more calls were placed by the mobile device, a mean time interval between button presses, a pressed button type, a mean pressure exerted when pressing buttons, a number of times within a predetermined time interval that a password was input incorrectly, a number of consecutive times that a password was input incorrectly, and combinations thereof. The usage profile of an authorized user can then be compared to the accumulated information in order to determine whether or not the authorized user is still in control of the device. The mobile device may take any desired action to verify the current user is authorized to use the mobile device, such as prompting the current user to enter a password, and preventing further use of the device until the password is correctly entered.

The usage profile can be compiled over any desired time period(s). The time period may include a fixed period of time, or may be dynamically determined (e.g.—shifting in time as the mobile device is utilized). The predetermined time period can be specified by an authorized user of the mobile device, as well as determined by the mobile device itself. The predetermined time period can be based on any desired criteria, such as the manner in which the device is used and/or on the amount of information needed to compile the usage profile. Likewise, the period of time in which information about the continued usage of the mobile device can be accumulated may be specified in the same manner as that of the usage profile.

The accumulated continued usage information and the usage profile may be compared to determine the degree to which the continued usage deviates from the usage profile.

A predetermined threshold may be selected according to any desired criteria to determine whether the continued usage is indicative of unauthorized use. For example, if the continued usage includes a significant number of calls outside the time range calls are usually made in the usage profile, the continued usage may be indicative of unauthorized use. Similarly, the time interval between button presses (i.e., the speed the current user is using the mobile device), the types of buttons pressed, the pressure exerted when pressing the buttons, the number of times (including consecutive times) a password is input incorrectly, and other events may be indicative (alone or in combination) of unauthorized use.

A combination of events may be weighted such that the occurrence of a security compromise event is based on a predetermined voting threshold. Individual events may be given more significance than other events, such that only a repeated occurrence of a particular event deviates from the predetermined threshold, while a single occurrence of another event deviates from the threshold. For example, a call outside the usage profile's normal time range may need to occur a total of four times before the predetermined threshold is exceeded, while the entering of an incorrect password two times in succession deviates from the threshold. Similarly, an incorrect password entry in combination with two calls outside the normal time range in the usage profile can deviate from the predetermined threshold. Events may be weighted or scored for the predetermined voting threshold in any desired manner.

A security compromise event may be determined based on the failure of a user to provide the proper biometric data. In one embodiment of the present invention, for example, a biometric measurement of a current user of the mobile device is obtained, and the biometric measurement is compared to a previously stored reference value. A security compromise event can then be determined where the biometric measurement exceeds a predetermined threshold variance from the previously stored reference value. The security compromise event may be based on any number of biometric measurements from the current user of a mobile device, such as a fingerprint scan, an iris scan, a retina scan, a voice sample, a breath sample, and/or a photograph of a portion of the body of the current user of the mobile device.

A security compromise event may be determined based on the location of the mobile device. For example, referring now to FIG. 4, determining a security compromise event (120) may include obtaining a physical location of the mobile device (410), analyzing the physical location of the mobile device to determine that the device is located in an unauthorized area (420), and comparing the physical location of the mobile device to a previously stored location list (430).

The physical location of the mobile device may be obtained in any manner. For example, the location of the mobile device may be ascertained using a global positioning system (GPS), through the triangulation of a signal emitted by the mobile device, through an Internet protocol (IP) address and/or traceroute, or in any other manner. A global positioning system may include, for instance, a receiver that detects signals transmitted by transmission sources with known transmission timing and/or known location, and through analyzing the received time-encoded signals at the mobile device. The mobile device may also ascertain its location with respect to the transmission sources. The transmission sources may be terrestrial, mobile, space-based, airborne, or any combination thereof. In one embodiment, the mobile device may ascertain its location on the surface of the earth by receiving and interpreting geolocation signals received from satellites in orbit about the earth. In another embodiment, the global positioning system may include a collection of terrestrial antennas and receivers that receive a signal transmitted from the mobile device, and by analyzing the angle of arrival, time of arrival, and/or time differential of arrival of the mobile device's signal, the location of the mobile device may be ascertained via conventional multilateration approaches. Alternatively, the mobile device may receive one or more signals from known terrestrial transmitting sources such as cellular base station antennae, and through analyzing the received signals, compute its location with respect to the known terrestrial transmitting sources.

The area a mobile device is authorized to operate in may be defined in any manner. For example, the area may be a geographical area defined by a boundary, an area corresponding to a postal code, and/or an area corresponding to a telephone area code. The area may include any number of separate individual areas. An area may be defined based on where the mobile device may operate (i.e. "whitelisting"), as well as on where the mobile device may not operate (i.e. "blacklisting").

The location of the mobile device may be compared to a list that defines one or more locations where the mobile device is authorized to be operated, one or more locations where the mobile device is not authorized to be operated, one or more locations where functionality of the mobile device is at least partially restricted, and/or combinations thereof. The list may be defined by an authorized user of the device and/or a security authority. In one exemplary embodiment of the present invention, a central server (such as host server 860 depicted in FIG. 8) monitors the location of the mobile device and compares the device's location to a location list previously stored in a database to determine if a security compromise event has occurred based on the location of the mobile device, and if the functionality of the device should be modified as a result. Among other things, this embodiment allows employers, parents, and other "super-users" of mobile devices to define boundaries in which the mobile devices should operate when in the hands of employees or children.

A security compromise event may be determined based on the location of the mobile device. For example, referring now to FIG. 5, determining a security compromise event (120) may include measuring a first environmental parameter at a first time point (510), measuring a second environmental parameter at a second time point (520), comparing the first environmental parameter and second environmental parameter to a predetermined authorized use condition (530), determining that the mobile device has been moved from a first location (540), and transmitting at least one of the first and second measured environmental parameter to a security authority (550).

As used herein, an "environmental parameter" generally includes any parameter pertaining to the mobile device's environment. The mobile device can measure any desired environmental parameter in any desired format, such as an image taken by the mobile device. Digital cameras (including cameras inside other devices, such as mobile phones), and other devices with imaging capability may thus be used to take an image of the mobile device's environment, including physical objects and people around the mobile device. Such images can then be used to identify the location of the mobile device and/or the individual(s) responsible for taking or withholding the mobile device from its authorized user(s).

An environmental parameter may also include information from or about systems and devices in communication with the mobile device. In one embodiment of the present invention, for example, a wireless receiver in communication with the mobile device can be activated and used to sense one or more wireless network addresses from one or more signals received by the mobile device at different points in time. The network addresses sensed at different points in time can be compared to determine whether the sensed network addresses differ, and thus determine if the mobile device has moved.

An environmental parameter may further include geolocation information. The geolocation information may be measured from a global positioning system (GPS) in communication with the mobile device, as well as from any other desired source. In one exemplary embodiment of the present invention, the mobile device may receive a signal comprising geolocation information and decode location signals received at the different points in time. The locations corresponding to the signals measured at different times may be compared to determine whether the location of the mobile device has changed, as well as whether the distance between two sampled locations exceeds a predetermined threshold. Any number of location samples can be similarly measured and compared, either to an initial location or to subsequently-measured locations. The predetermined threshold distance can be configured by a user, a security authority, and/or automatically by the mobile device. This embodiment thus allows the movement of a mobile device to be monitored and a security compromise alert issued if it moves more than a predetermined distance.

In various embodiments of the invention, security compromise events may be detected when an unauthorized user attempts to tamper with a security provision of the mobile device. For example, conditions leading to a determination of tampering may include determining that an unauthorized user attempted to mask the reported location of the mobile device; attempted to re-route an electronic address in the mobile device; attempted to bypass a password prompt provided by the mobile device; attempted a brute force password attack on the mobile device; attempted to install applications intended to thwart operation system security, and combinations thereof.

Altering the Functionality of the Mobile Device

Figure 6:
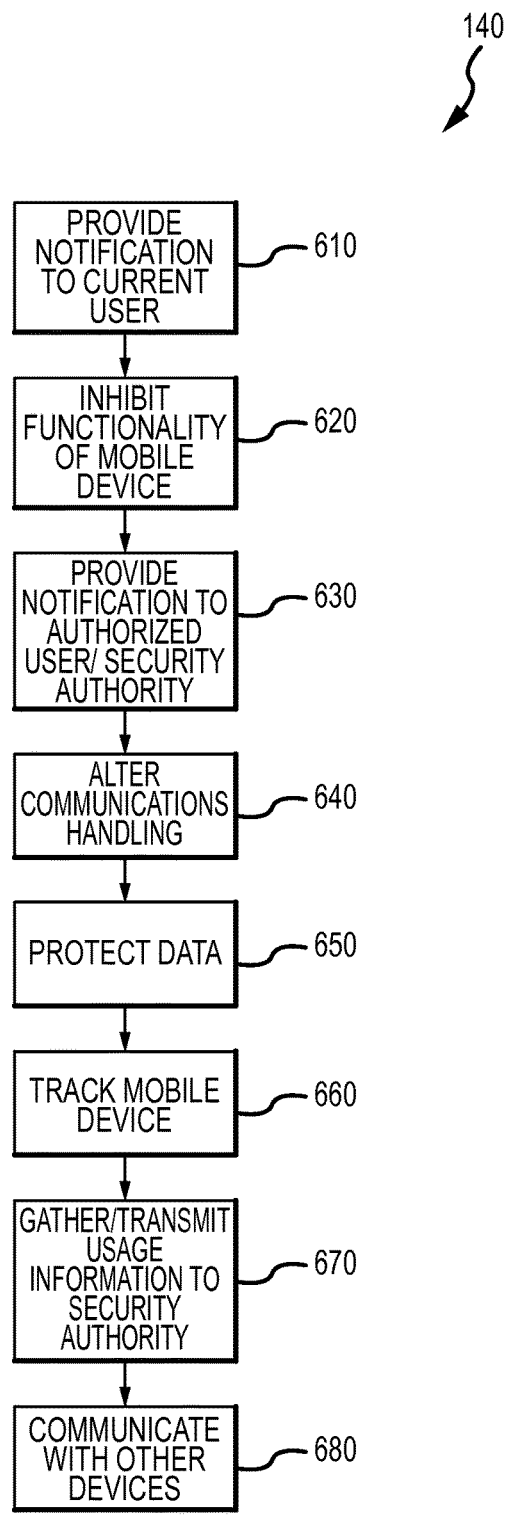
FIG. 6 is a diagram showing various functionalities of the invention, one or more of which may be included in step 140.
Figure 7:
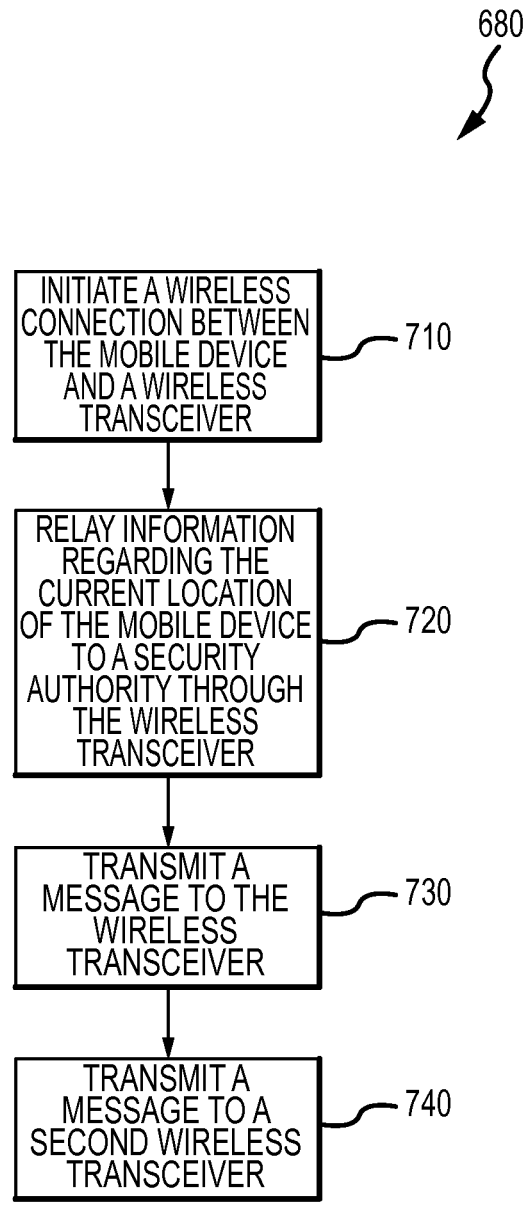
FIG. 7 is a diagram depicting various functionalities of the invention, one or more of which may be included in step 680.

In the exemplary process depicted in FIG. 1, a determination is made as to whether the function of the device should be altered in response to the security compromise event (130), and the functionality of the mobile device altered accordingly (140). The functionality of a mobile device can be altered in any manner and to achieve any purpose, such as to mitigate the harm arising from the compromised status of the device, gather evidence to apprehend and convict a thief, as well as to encourage/incentivize the return of the device to the proper owner. Referring to FIG. 6, altering the functionality of the mobile device (140) may include providing a notification to the current user (610), inhibiting the functionality of the mobile device (620), providing a notification to an authorized user and/or security authority (630), altering the manner in which communications to and from the mobile device are handled (640), protecting data in the mobile device (650), tracking the mobile device (660), gathering and transmitting information on the usage of the mobile device to a security authority (670), and communicating with other devices (680).

The functionality of a mobile device can be altered in any manner in response to a security compromise event, including partially or completely disabling features of the device and/or providing functionality not available prior to the security compromise event. In one embodiment of the present invention for example, the functionality of the mobile device can be altered to present an automated message to the current user of the mobile device (610). The automated message may be in any format and may contain any desired information. For example, the automated message may notify the current user that the mobile device has been lost or stolen, that a reward is offered for the prompt return of the mobile device, and/or provide instructions for returning the mobile device to the authorized user. The automated message may also notify the current user that any button may be depressed on the mobile device to initiate the recovery process, and/or that a phone number need not be entered to contact a party to return device to its rightful owner. In such an instance, the mobile device may accept a single button press to initiate contact with a security authority or the authorized user to begin the recovery process. The message may be presented in any manner, such as an audio message, a textual message, and/or a video message. In one embodiment of the present invention, for example, an SMS text message is transmitted by a security authority to a mobile device. The text message is decoded and a command sent to an application residing on the mobile device, such as a web browser, a text editor, graphic image displayer, a message screen, or a bitmap displayer and/or any other application capable of displaying a notification. The command may, for example, display a pre-stored message or image, instructing the user in regards to returning the device to the authorized user. The application may reside on a hardware component within the mobile device, such as a SIM card installed in a mobile phone or laptop computer. The message may also be presented at any desired time or in response to any desired event, such as when the current user is attempting to utilize the mobile device (e.g., by placing a call on a mobile telephone). For example, the message may be presented upon startup of the device. In this manner, a user that has found a lost device may obtain information regarding returning the device even where the device has not established a connection to a host server such as one operated a security authority.

The functionality of the mobile device may be altered to inhibit a user's ability to utilize the mobile device (620). For example, a sequence of DTMF tones (e.g., for a mobile telephone) or an unpleasant sound may be played over a speaker in the mobile device while the current user is attempting to use the mobile device. Additionally, the illumination level of a display on the mobile device may be altered to frustrate the use of the mobile device (e.g., by decreasing the illumination level) and/or to draw attention to the mobile device (e.g., by increasing the illumination level) so that bystanders may notice the device or its unauthorized use.

A predetermined set of features of the mobile device can be inhibited in response to a security compromise event, such as when the mobile device is reported stolen or lost by the authorized user. In one embodiment of the present invention, for example, the functionality of the mobile device is modified based on a list of features to be restricted upon occurrence of the security compromise event. The list of features may be defined in any manner, such as by an authorized user accessing a web interface and selecting features to be disabled if the mobile device is lost or stolen. The list of features may then be transferred to, and stored by, the mobile device. One or more specifically configured lists of features for various security compromise events may be provided to the mobile device, for example one list may indicate that or more of the features on the list could be disabled if the phone is reported stolen, while a less restrictive list may be provided for when the phone is reported as misplaced. In this manner, multiple feature modification lists for the mobile device may provide for event-appropriate responses based on the type of security compromise that has occurred. In another embodiment, a default security compromise action list is executed by the mobile device if the mobile device detects a security compromise event and no other list of restricted features has been transferred to the mobile device by the authorized user or a verified security authority. For example, but not by way of limitation, a default security compromise action list defines common features of a mobile device that need to altered when control of the mobile device is lost. Alternately, the list of features may be identified by a user through a software interface on the mobile device itself.

The functionality of the mobile device may be modified from a first set of features to a second set of features based on the occurrence of a security compromise event. The differences between the first feature set and second feature set can be based on any desired criteria, such as the context of use of the mobile device. For example, the feature sets may be based on a level of security desired for the mobile device, an application the mobile device is being used for, the location of the mobile device, or any other contextual factor(s).

The functionality of the mobile device may be inhibited in any other desired manner. For example, a mobile phone may be prevented from placing phone calls, sending emails or text messages, or engaging in other forms of communication. In the case where the mobile device comprises a mobile telephone, the phone numbers that may be called from the mobile device can be restricted to a predetermined list of numbers, or to only one or more predetermined numbers within a contact list on the mobile phone. For example, a mobile device may be restricted to only allow emergency calls to be placed, and/or to place a call to a security authority (for example, a user may press a single key to place a call to the security authority). Additionally, DTMF tones can be played on a loudspeaker of the mobile device while the mobile phone is in use to interfere with the current user using the mobile phone. Similarly, frequent messages (e.g. a text message and/or audio message) can be provided, instructing the current user of a mobile device to contact a security authority to initiate return of the mobile device to the authorized user. The subscriber identity module (SIM) of a mobile phone can also be locked out until the user enters a personal unblocking code. The unblocking code may be known to the authorized user(s) prior to the occurrence of the security compromise event, or can be provided to the authorized user(s) by a security authority. Additionally, an authorized user(s) may unlock the mobile device through a host server such a server operated by a security authority. Any other functions of a mobile device can be disabled (in part or in whole), or interfered with, to diminish the usefulness of the mobile device to an unauthorized user.

The functionality of the mobile device can be inhibited by requiring entry of a password before the mobile device may be used by a current user. Where an invalid password is entered, a delay may additionally be introduced before entry of another password may be attempted by the current user. In conjunction with requiring the password, selectable indicia (e.g., a web link and/or button on a display) may be provided that give instructions on how to return the mobile device. The instructions can be provided without the current user needing to enter a valid user id and password. Additionally, the current user may be prompted to enter his or her identification information, which is stored on the mobile device and transferred to a security authority when the mobile device has an opportunity to make a communications connection to the security authority. This may allow a security authority to locate an innocent finder of the device, as well as someone who stole the device. For example, but not by way of limitation, the prompt can include a message that notifies the current user of the device that they have won a substantial prize and need to take an action to redeem the prize offer. In such a case, the current user of a device may be solicited to provide information that could be used to redeem the spurious prize, but in fact is used to locate and or apprehend current user. Alternatively, or in combination, the current user of the mobile device may be sent a graphical image with a name or image that encourages the current user to open a message or file, and while looking at the file or image, a command is decoded from the image via steganographic techniques, whereby the command may be executed by the mobile device to mitigate the loss of control of the mobile device.

The mobile device can be significantly disabled or entirely shut down to prevent its use and help prevent an unauthorized user from attempting to circumvent security protections on the mobile device. In some cases, such as when information stored on the mobile device is sensitive, or when there is a very small likelihood of recovering the mobile device (or its data), it may be desirable to command the mobile device to perform a destructive function that renders the mobile device inoperable. The destructive function may include erasing and/or overwriting data and software stored on the mobile device. The destructive function may also include physically damaging the hardware of the mobile device, such as by commanding the mobile device to deliver an electric charge or current to damage an electronic component of the mobile device.

The functionality of the mobile device may be altered to send a message to an authorized user of the device, a security authority, or other recipient (630). The message may include any desired information, such as a phone number called by the mobile device, the current operational status of the mobile device, the location of the mobile device, a statement indicating that the mobile device has been removed from a predetermined location and/or is in motion, a date and time stamp indicating when the device was first used after occurrence of the security event, and/or instructions to call a security authority to initiate a recovery process. The mobile device can thus provide information on its use and location to aid a security authority or authorized user in finding the mobile device.

The authorized user(s) of the mobile device may not necessarily be aware that a security compromise event has occurred. In order to alert an authorized user that a security compromise event has occurred, a theft notification record for an authorized user can be stored at a central server as well as on the mobile device itself to allow the authorized user to be contacted and notified. The theft notification record can include any desired information regarding the authorized user, such as the authorized user's contact information and information that can be used to validate the authorized user's identity. A message to the authorized user may be in any format and may include any desired information. For example, a phone call can placed to a phone number specified in the theft notification record, whereupon audio instructions (from a live operator or pre-recorded) are provided to the authorized user regarding how to contact the current user of the mobile device to recover the mobile device. Likewise, a text message can be sent electronically, or a printed message may be sent by conventional mail, to an address specified in the theft notification record regarding how to contact the current user of the mobile device to recover it. The message may be provided by any system, device, or individual, such as a security authority monitoring the mobile device and/or the mobile device itself.

The functionality of the mobile device may be altered with regards to the handling of communications to and from the mobile device (640). In addition to prohibiting or restricting communications to and from the device as discussed above, communications from the device by an unauthorized user can be intercepted and forwarded to a security authority, an authorized user, or other recipients to aid in identifying the unauthorized user and the location of the mobile device. In this manner, the present invention will route calls that were directed to the authorized user's lost or stolen device to an alternate number designated by the authorized user; the authorized user will then be able to receive calls that would have otherwise been missed. In the case where the mobile device comprises a mobile telephone, telephone numbers dialed by the unauthorized user can be logged and transmitted to the security authority and/or authorized user, and authorized user and/or security authority can be alerted as the mobile device is engaging in a telephone call. A third party (such as a security authority) may request to access the telephone call, and then establish a conference connection to the telephone call. The third party may actively participate in the conversation or listen to the conversation surreptitiously.

The data stored on a mobile device may be protected (650) in any desired manner, such as by encryption. Any portion of the stored data may be encrypted, such as files or other data elements designated (e.g., by a list, flag on the file, location of the file, or other method) to be encrypted upon the occurrence of a security compromise event. Alternatively, files and data elements may be encrypted as they are created so that they cannot be viewed by an unauthorized user even before a security compromise event has been determined. An authorized user may designate individual files to be encrypted, as well as types of files to encrypt. In addition to, or as an alternative to, encryption, files may be hidden from the file system of the mobile device to prevent their access by an unauthorized user. Authorized users can gain access to such files through, for example, a software application independent of the operating system of the mobile device that verifies the user is authorized to access the files.

Designated files can be encrypted independent of the mobile device's operating system, such as through an independent software application that encrypts/decrypts files and allows a user to access them. The operating system is thus blocked from accessing such files, preventing an unauthorized user from exploiting security flaws in the operating system to view protected files. Operating system calls to open such files can be intercepted and the files opened and decrypted if the current user is authorized to access the files. Similarly, operating system calls to close such files can be intercepted and the files closed and decrypted by the independent software application. Files stored on the mobile device may be encrypted and decrypted in any desired manner, such as with a password known by a security authority and/or the authorized user.

In one embodiment of the present invention for example, to increase the level of protection for data stored on the mobile device, a password on the mobile device can be modified to utilize a password that is more secure, for example, by using a longer and/or more complex password code, or setting a password where the mobile device was not protected by a password. Normally, these more secure or enhanced-strength passwords are considered less user friendly and are often not used as primary passwords by the authorized users. Therefore, embodiments of the present invention may adaptively modify the strength of passwords on mobile devices depending on the security state and context of a mobile device.

Some or all of the data stored on the mobile device may be erased in response to a security compromise event to protect it from unauthorized access. Any desired files of other data elements can be erased. For example, an authorized user may specify a list of data elements to be deleted upon occurrence of the security compromise event. Additionally, deleted data elements may be overwritten with other data to prevent forensic recovery of the data. Deleted data may be overwritten any desired number of times, and with any desired data (such as random data, alternating data values, predetermined data patterns, and a combination thereof).

Some or all of the data stored on the mobile device may further be archived to allow an authorized user to recover the data, even if the mobile device is not recovered. As with files marked for encryption and/or deletion, an authorized user may specify particular files or other data to be archived in any desired manner. The authorized user may also specify one or more destinations to which the archived data should be transmitted to in the event of a security compromise event, such as a security authority, host server, or an alternate device accessible by the authorized user (e.g., another mobile device of the same type or a central data server). The archived data may be transmitted from the mobile device to a specified destination in conjunction with the encryption or deletion of the data upon a successful transfer. An authorized user may then retrieve the archived data to a replacement mobile device, or may instruct that the archived data be delivered to any other desired destination. For example, the authorized user may specify a destination address (such as an email address or physical mailing address) to which an electronic copy or physical copy (e.g., the archived data stored on a portable storage medium) can be delivered. Any type of data stored on the mobile device may be archived, such as documents, email or telephone contact information, software applications, media files, and/or pictures. Additionally, licensing information pertaining to one or more data elements may be archived.

Data may be archived at any time, including, upon occurrence of a security compromise event, according to a predetermined schedule, and or at a time specified by an authorized user, security authority, or other authorized entity.

Systems and methods of the present invention may store sensitive data in a specified location for special processing upon the occurrence of a security compromise event. The specified location may be a physical location in a memory, as well as a location designated through the file system of the mobile device. For example, an authorized user may store sensitive data elements in a special folder on the file system of the mobile device. When a security compromise event occurs, one or more functions can be executed on the data elements within the folder, such as encrypting one or more of the sensitive data elements with a password known to the authorized user and/or a security authority, deleting one or more of the sensitive data elements, multiply overwriting one or more of the sensitive data elements, and/or transmitting one or more of the sensitive data elements to an address specified by the authorized user. The special designation of files allows, among other things, important data to be quickly protected, archived, and/or destroyed before handling less sensitive data in the event of a security compromise event.

The functionality of the mobile device may be altered to aid in tracking the device (660) following the occurrence of a security compromise event. For example, the mobile device may determine a network address (including a wireless network address) assigned to the mobile device, as well as wireless access point identifiers from signals received by the mobile device. The mobile device can store and transmit the address(es) and identifier(s) to a security authority. The security authority may then determine, based on the network addresses and wireless access point identifiers, a location of the mobile device.

Similarly, the mobile device may receive a signal from a GPS or other source providing geolocation information. The geolocation information from the signal can be stored and transmitted to a security authority. A security authority or authorized user receiving location information from the mobile device can present the location on a map overlay to track the current position of the mobile device, as well as the date and time of any changes in the mobile device's position. The map of the mobile device's position can be provided through a web site over the Internet to allow police officers or other security authority members to locate the mobile device.

The functionality of a mobile device may be altered to gather information on how the mobile device is being used by an unauthorized user and provide that information to an authorized user or security authority to aid in locating the device and/or unauthorized user (670). For example, phone numbers and email addresses to which messages are sent after occurrence of the security compromise event may be stored by the mobile device and transmitted to a security authority. Data-capturing equipment onboard a mobile device (such as a digital camera or microphone) can also be used to gather information on the user of the mobile device, mobile device's present environment. A camera in communication with the mobile device, for example, can be activated to capture a still image or video clip, which can be stored in the mobile device and transmitted to a security authority. Similarly, a microphone may be used to capture audio clips. Data-capturing equipment such as the camera and microphone can be used to take continuous samples of data to help locate the device, inhibit use of the data capture device by the unauthorized user, and/or to wear down the battery of the mobile device to diminish it's usefulness to the unauthorized user. Alternately, the data capture device may be disabled to preserve battery life and/or to prevent its use by the unauthorized user.

In order to help capture an image of the face of an unauthorized user, the mobile device may prompt the user to undertake an activity that involves looking at the mobile device, such as prompting the user to enter a password, playing an audio sequence on the mobile device, strobing a light source on the mobile device, announcing that the current user has won a prize and instructing him/her to watch for prize redemption details, and/or displaying a video sequence. While the current user's attention is focused on the mobile device, the camera may be used to capture an image of his/her face for transmittal to a security authority. Similarly, a camera or microphone in communication with the mobile device can be activated in conjunction with initiating a surreptitious communication session with a security authority. Still images, video, and audio data captured by the mobile device can then be transmitted to the security authority. The security authority can use images/video of the unauthorized user to identify him/her (e.g., through comparing the images/video to police booking photos), and can also use the images/video to identify the surroundings of the mobile device. The unauthorized user may also be identified from samples of the unauthorized user's voice (taken from captured audio clips).

As discussed previously, messages sent to and from the mobile device may be intercepted and/or rerouted to a security authority to prevent unauthorized use of the device and to help identify an unauthorized user and/or the location of the mobile device. In addition, the mobile device may be configured to maintain a record of each key depressed on the mobile device, and transmit that log to an authorized user or security authority. The logging of keystrokes in this manner may further aid in identifying the unauthorized user by capturing usernames, passwords, contact entries, and other information entered by the unauthorized user.

In addition to passively receiving data from the mobile device, an authorized user or security authority may actively access or command the mobile device in accordance with the present invention. A security authority or authorized user may transmit commands to the mobile device to execute various functions, as well as to provide software updates, applets, sections of executable code, interpretable scripts, or data elements to be processed by the mobile device. The mobile device may thus be provided with software to perform various tasks upon the occurrence of a security compromise event, as well as at any other desired time.

In one exemplary embodiment of the present invention, a security authority and/or the authorized user may log into a remote access service configured to communicate with the mobile device and activate an application programming interface in the mobile device to forward to the remote access service the current status of the mobile device, the current location of the mobile device, an image taken by a camera in communication with the mobile device, a real-time video captured by a camera in communication with the mobile device, a list of keys pressed on the mobile device, and/or a list of services currently running on the mobile device. Additionally, an authorized user or security authority may issue a command to the mobile device to initiate a chat session and provide an interface on the mobile device for enabling a text-based interaction with the current user.

The functionality of the mobile device may be altered to communicate with other devices to assist in locating and recovering the mobile device (680). For example, referring now to FIG. 7, communication with other devices (680) may include initiating a wireless connection between the mobile device and a wireless transceiver (710), relaying information regarding the current location of the mobile device to a security authority through the wireless transceiver (720), transmitting a message to the wireless transceiver (730), and transmitting a message to a second wireless transceiver (740).

A mobile device can initiate a connection between any device, system, or person through a wireless transceiver, and may connect to the wireless transceiver using any desired communication protocol. The mobile device may connect to any number of wireless transceivers. Once connected to a wireless transceiver, the mobile device may relay any desired information regarding the current location of the mobile device to a security authority, as well as files and data stored on the mobile device. For example, a mobile device that initiates a connection with a wireless access point (WAP) connected to the Internet may send an email to a security authority that includes text and attachments to aid the security authority in locating the device and apprehending an unauthorized possessor of the device. Similarly, a mobile device initiating a connection with a cellular telephone network may dial the security authority and provide information regarding the location of the mobile device through an audio message and/or DTMF tones.

The mobile device can provide any other desired information to (or through) a wireless transceiver it initiates contact with. For example, in one embodiment of the present invention the mobile device can transmit a message to a wireless transceiver indicating that a lost or stolen device is present within a signal range accessible by the wireless transceiver. Similarly, a mobile device may determine the signal strength of its wireless connection with the wireless transceiver, and obtain identifying indicia (such as a device name, IP address, or other identifier) for the wireless transceiver and transmit a message to a different wireless transceiver including the identification and signal strength information. The signal strength and identification information for multiple wireless transceivers can then be used to triangulate the location of the mobile device. Additionally, where the wireless transceiver (or device in communication thereto) is capable of determining its own physical location, the mobile device may request that the wireless transceiver provide its physical location, which in turn can be provided to a security authority.

The mobile device may transmit any other desired information to any number of wireless transceivers. In one embodiment of the present invention, for example, a message to a wireless transceiver may include a request for a response that includes the physical location of a wireless transceiver in communication with the mobile device, a request that a person in communication with the wireless transceiver report that a lost or stolen device is within its communication range, a phone number for the authorized user, a phone number for a security authority, and/or a request to place a call to a security authority.

Exemplary System

Figure 8:
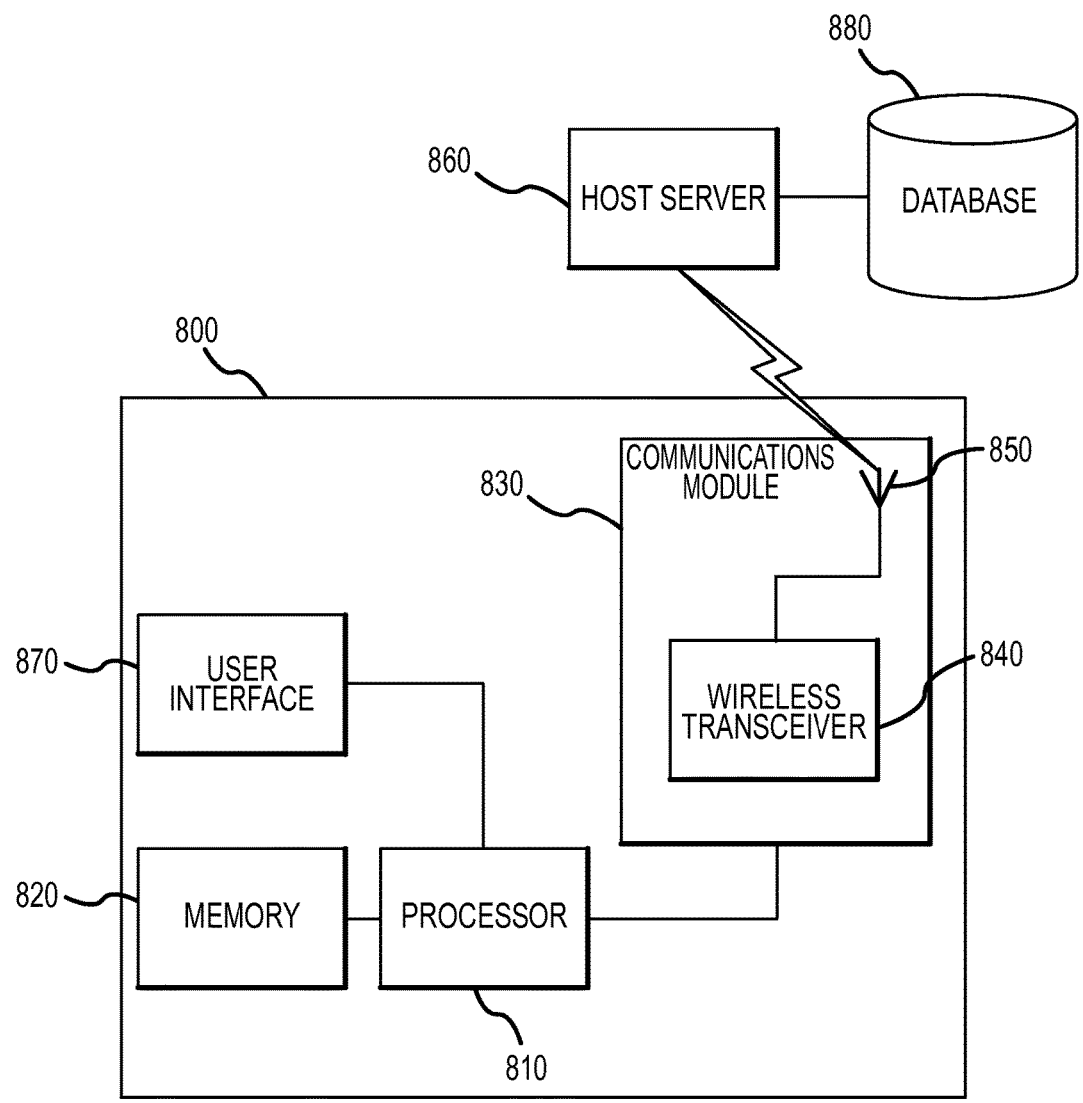
FIG. 8 is a block diagram depicting an exemplary system according to various aspects of the present invention.

An exemplary system for use in conjunction with the present invention is depicted in FIG. 8. This system may be used in conjunction with the methods described in FIG. 1-7, as well as with any subset or combination of the elements thereof. The system shown in FIG. 8 may also be used in conjunction with any other suitable embodiments of the present invention.

The exemplary system depicted in FIG. 8 comprises a mobile device 800 that includes a processor 810 coupled to a memory 820 which may include volatile memory, non-volatile memory or a combination thereof. A communications module 830 comprises a wireless transceiver 840 for wirelessly communicating with one or more servers 860 and other entities through antenna 850. The mobile device also includes a user interface 870 coupled to the processor 810. The mobile device 800 may include any suitable power source, such as a battery (not shown). The mobile device 800 may include any other desired components, such as a global positioning system (GPS) to provide geolocation information for locating the mobile device. Some or all of the components of the mobile device 800 may include (or be in communication with) a hardware identification module (not shown) such as a universal subscriber identity module and/or removable user identity module. The hardware identification module may be coupled to the processor 810 and may include an identifier that can be compared to a predetermined identifier to determine whether the hardware of the mobile device 800 has been altered and whether a security compromise event has occurred as a result. The hardware identification module (and predetermined identifier) may include any suitable identifier, such as an electronic serial number, a local area identity identifier, an integrated circuit identifier, an international mobile subscriber identifier, an authentication key identifier, and/or an operator-specific emergency number identifier. The identifier may be stored in the memory 820 and transmitted to the host server 860 for comparison to a predetermined identifier.

The functionality of the mobile device 800, including the methods depicted in FIGS. 1-7 (in whole or in part), may be implemented through the processor 810 executing computer-readable instructions stored in the memory 820 of the mobile device 800. The memory 820 may store any computer-readable instructions and data, including software applications, applets, and embedded operating code. In one exemplary embodiment, a software application performing methods of the present invention includes a terminate and stay resident (TSR) application (or equivalent) configured to remain loaded in memory whenever the mobile device is in operation, which can help prevent the inadvertent or intentional deletion of the TSR. The software application may also be hidden (i.e., not viewable in an application list or task list) and/or protected from being stopped or deleted by a user or other software process. Aspects of embodiments of the present invention provide for tamper-resistant applications to prevent unauthorized users from disabling or otherwise removing the applications from operational status. In one exemplary embodiment, applications may be installed on mobile devices running the Symbian operating system, whereby applications that are running may not be unloaded or disabled.

Additionally, the software application may be configured to operate with minimal underlying hardware functionality. For example, the application may be initiated before the mobile device establishes a network connection. Such a situation may be provided, for instance, when the software application is installed on a SIM card in the mobile device, and the application launches before other software in the mobile device operating system. Alternately or in addition, a data element such as a link or a URL (universal resource locator) may reside on the SIM card, and by launching an application such as a browser with the URL or link, an application referenced by the link or URL may be loaded into the mobile device from a remote server and/or executed directly from on the remote server.

Software performing methods of the present invention may be provided with the device or downloaded onto the mobile device by an authorized user. The functionality of the mobile device 800 may also be implemented through various hardware components storing machine-readable instructions, such as application-specific integrated circuits (ASICs), field-programmable gate arrays (FPGAs) and/or complex programmable logic devices (CPLDs). Systems according to aspects of the present invention may operate in conjunction with any desired combination of software and/or hardware components.

The processor 810 retrieves and executes instructions stored in the memory 820 to control the operation of the mobile device 800. Any number and type of processor such as an integrated circuit microprocessor, microcontroller, and/or digital signal processor (DSP), can be used in conjunction with the present invention. The memory 820 stores instructions, data, messages transmitted from (or received by) the mobile device 800, and any other suitable information. A memory 820 operating in conjunction with the present invention may include any combination of different memory storage devices, such as hard drives, random access memory (RAM), read only memory (ROM), FLASH memory, or any other type of volatile and/or nonvolatile memory. Data can be stored in the memory 820 in any desired manner. In one embodiment of the present invention, for example, data stored within the memory 820 is partitioned into one or more logically disjoint groups. Each of the data groups are encrypted with a respective unique encryption key to prevent all the data on the mobile device from being accessed if a single encryption key is compromised. This also increases the time it will take a "brute force" attempt to try all possible encryption keys to succeed. The groups of data can be partitioned across a plurality of physical storage media, such a RAID array.

The communications interface 830 communicates with one or more servers 860 or other suitable entities. Any suitable communications device, component, system, and method may be used in conjunction with the present invention. For example, the wireless transceiver 840 may be configured to communicate using any number and type of cellular protocols, such as General Packet Radio Service (GPRS), Global System for Mobile Communications (GSM), Enhanced Data rates for GSM Evolution (EDGE), Personal Communication Service (PCS), Advanced Mobile Phone System (AMPS), Code Division Multiple Access (CDMA), Wideband CDMA (W-CDMA), Time Division-Synchronous CDMA (TD-SCDMA), Universal Mobile Telecommunications System (UMTS), and/or Time Division Multiple Access (TDMA). A mobile device operating in conjunction with the present invention may alternatively (or additionally) include wireless transceiver(s) (and related components) to communicate using any other method of wireless communication protocol, such as an ISO 14443 protocol, an ISO 18000-6 protocol, a Bluetooth protocol, a Zigbee protocol, a Wibree protocol, an IEEE 802.15 protocol, an IEEE 802.11 protocol, an IEEE 802.16 protocol, an ultra-wideband (UWB) protocol; an IrDA protocol, and combinations thereof. The antenna 850 may be configured to transmit and receive any wireless signal in any format, and may comprise a plurality of different antennas to transmit and receive using different wireless protocols.

The communications module 830 can communicate with the server 860 or another device using any other form of connection, such as a wired Internet connection, a wireless Internet connection, a cellular telephone network connection, a wireless LAN connection, a wireless WAN connection, an optical connection, a USB connection, a mobile device synchronization port connection, a power connection, and/or a security cable. The communications module 830 can be used to communicate with one or more companion devices to monitor the position or status of the mobile device 800 (e.g., by monitoring whether a communication link between the mobile device and companion device is intact), as well as with any number of other devices to help track/locate a lost or stolen mobile device 800.

The mobile device 800 includes a user interface 870. The user interface 870 may include any number of input devices (not shown) to receive commands, data, and other suitable input from a user, as well as any number of output devices (not shown) to provides the user with data, notifications, and other suitable information from the mobile device 800.

Any number of input devices may be included in the user interface 870 such as a touch pad, a touch screen, and/or an alphanumeric keypad to allow a user to enter instructions and data into the mobile device 800. The user interface 870 may be configured to detect pressure exerted by a user on the keys of a keypad, as well as the time interval between key presses in order to determine if the current user is authorized to use the device. The user interface may also include a microphone to allow the user to provide audio data to the mobile device 200, as well as a camera to allow the mobile device to capture still or video images. The mobile device 200 may include speech recognition software to process verbal input through the user interface 870. The user interface 870 may also include any number of suitable output devices, such as a display screen to visually display information (such as video and text), and/or a speaker to provide auditory output. The mobile device 800 may be configured to provide words, phrases, tones, recorded music, or any other type of auditory output to a user through the speaker. As discussed previously, the user interface 870 can be activated to provide information and/or hinder the operation of the mobile device 800 when an unauthorized user attempts to use the mobile device 800. For example, the illumination level of the display may be modulated to draw attention to the mobile device, and unpleasant and/or loud sounds can be played over the speaker.

The mobile device 200 may include one or more biometric devices configured to receive biometric information, such as a fingerprint scanner, an iris scanner, a retinal scanner, and/or a breath analyzer. Input devices such as a microphone or camera may also be utilized to perform biometric analyses, such as a voice analysis or facial recognition.

Information provided or received by the user interface 870 may be in any appropriate format. For example, a user interface that communicates information to a user in an auditory format may first provide a data header followed by a data value to identify the data to the user. The user interface 870 may provide information in any number of desired languages, regardless of whether the information is provided audibly or visually.

The user interface can also provide/receive information to a user in a machine-readable format. In one exemplary embodiment of the present invention, for example, the user interface 870 of a mobile device 800 may send and receive messages using dual-tone multi-frequency (DTMF) tones. The mobile device 800 can be configured to send, receive, and process machine-readable data can in any standard format (such as a MS Word document, Adobe PDF file, ASCII text file, JPEG, or other standard format) as well as any proprietary format. Machine-readable data to or from the user interface may also be encrypted to protect the data from unintended recipients and/or improper use. In an alternate embodiment, a user must enter a passcode to enable use of some or all of the functionality of the mobile device 800. Any other user interface feature may be utilized to allow a human or non-human user to interact with one or more devices operating in conjunction with the present invention.

The mobile device 800 may include any other suitable features, components, and/or systems. For example, the mobile device 800 may be configured to preserve the life of its battery by shutting off some or all of its components, such as a camera or microphone. Components can be selectively shut down in response to a security compromise event, as well as in response to a command from an authorized user or security authority. Alternately, the mobile device 800 can be configured to use its components excessively to drain the battery as quickly as possible, to, for example, limit the usefulness of the mobile device 800 to an unauthorized user.

The mobile device 800 may be configured to implement one or more security measures to protect data, restrict access, or provide any other desired security feature. For example, a mobile device 800 may encrypt transmitted data and/or data stored within the device itself. Such security measures may be implemented using hardware, software, or a combination thereof. Any method of data encryption or protection may be utilized in conjunction with the present invention, such as public/private keyed encryption systems, data scrambling methods, hardware and software firewalls, tamper-resistant or tamper-responsive memory storage devices or any other method or technique for protecting data. Similarly, passwords, biometrics, access cards or other hardware, or any other system, device, and/or method may be employed to restrict access to any device operating in conjunction with the present invention.

The host server 860 communicates with mobile devices 200, authorized users, unauthorized users, security authorities, and other entities to monitor and protect the mobile devices 200 from unauthorized use and to mitigate the harm associated with a security compromise event. The host server 860 may comprise any number of separate computer systems, processors, and memory storage devices, as well as human operators (e.g., to answer calls from authorized users reporting the loss/theft of a mobile device) and any other suitable entity. The host server 860 may include, or be in communication with, one or more databases 880 storing information regarding authorized users and mobile devices 200 in order to monitor and track the mobile devices 200 and provide instructions to the mobile devices 200 in the event a security compromise event occurs.

For example, a database 880 may store a usage profile for a mobile device to allow software on the host server 860 to detect whether continued usage of the mobile device deviates from the usage profile by a predetermined threshold. The host server 860 may also receive, process, and store (e.g., in the database 880) information from the mobile device 800. The host server 860 may handle any type of data in any format to achieve any purpose, such as receiving and processing environmental parameters captured by the mobile device to track the position and location of the mobile device 800 as discussed previously. The database 880 may also store location information that can be used to determine whether the mobile device 800 is operating in a valid location (e.g., "whitelisting" and "blacklisting" as discussed previously).

Databases 880 in communication with the host server 860 may also store archived data from mobile devices 800 for recovery in the event the mobile devices 800 are lost or stolen, or the data on the mobile devices 800 is destroyed (e.g., by a virus or other malicious program). The functionality of the host server 860 may be performed automatically or semi-automatically, such as through software/hardware operating on one or more computer systems, and/or by one or more human operators.

The host server 860 may include one or more system processors that retrieve and execute computer-readable instructions stored in a memory to control (at least partially) the operation of the host server 860. Any number and type of conventional computer, computer system, computer network, computer workstation, minicomputer, mainframe computer, or computer processor, such as an integrated circuit microprocessor or microcontroller, can be used in conjunction with the present invention. Computer systems used in accordance with aspects of the present invention may include an operating system (e.g., Windows NT, 95/98/2000/XP/Vista, OS2, UNIX, Linux, Solaris, MacOS, etc.) as well as various conventional support software and drivers typically associated with computers. In certain embodiments, dedicated applications may be entirely or partially served or executed by the system processor to perform methods of the present invention The host server 860 may be accessed in any desired manner, such as through a website on the Internet, and/or through a telephone network. The host server 860 may include any number of human operators, computer systems, mobile telephones, mobile computing devices, interactive voice response (IVR) systems, and any other suitable system and device for communicating with a user, security authority, computing device, or other entity. In one exemplary embodiment of the present invention, authorized users wishing to subscribe to a service providing monitoring and protection of their mobile devices can access a web site hosted by the host server 860 to create an account, pay for the service, identify one or more mobile devices to be protected, select options for the service, identify how the functionality of the device should be altered (e.g. features to implement or restrict) in the event the mobile device is lost or stolen, select an alternate caller identification indicia such as text to delivered in a caller ID data stream, report a security compromise event (such as the loss/theft of the device), and/or download software to operate on their mobile device to aid in monitoring and protecting the mobile device. Alternately, authorized users may interface with an automated IVR system and/or human operator over a telephone network. In the event a mobile device is lost or stolen, authorized users may interface with the host server 860 to report the security compromise event (i.e., the loss/theft of the device), track the status/location of the mobile device, recover data archived from the mobile device and stored by the host server 860, and/or to provide information on a security compromise event (such as reporting that the device has been located by the authorized user). Communications to and from the host server 860 may be protected (e.g., through encryption) as discussed above, or in any other manner.

The host server 860 can communicate with unauthorized users of a lost or stolen mobile device, both through the mobile device or through other communication methods. The host server 860 may notify the unauthorized user that the mobile device is lost or stolen, provide recovery information (such as a shipping address) to the unauthorized user, and facilitate the delivery of a reward to an unauthorized user who returns the mobile device. The host server 860 also communicates with the mobile device 800 to provide software updates, receive data for archival, identify files and other data to be protected, and to perform any other aspect of the present invention.

The host server 860 may be controlled by, or operate in conjunction with, an authorized user, telecommunications service provider, mobile device monitoring/tracking service provider, security authority, and/or any other desired entity. For example, authorized users and security authorities may communicate with or through the host server 860 to monitor a mobile device 800 and to recover the mobile device 800 if it is lost or stolen. The host server 860 may be configured to provide notifications on how to return a lost/stolen mobile device 800, detect a security compromise event, and determine whether a mobile device's functionality should be altered and (if so) determine the manner in which the functionality of the mobile device 800 should be altered, as depicted in FIGS. 1-7 and discussed previously. The host server 860 may operate in conjunction with any other desired systems, devices, human operators, or other entities.

Operation

Figure 9:
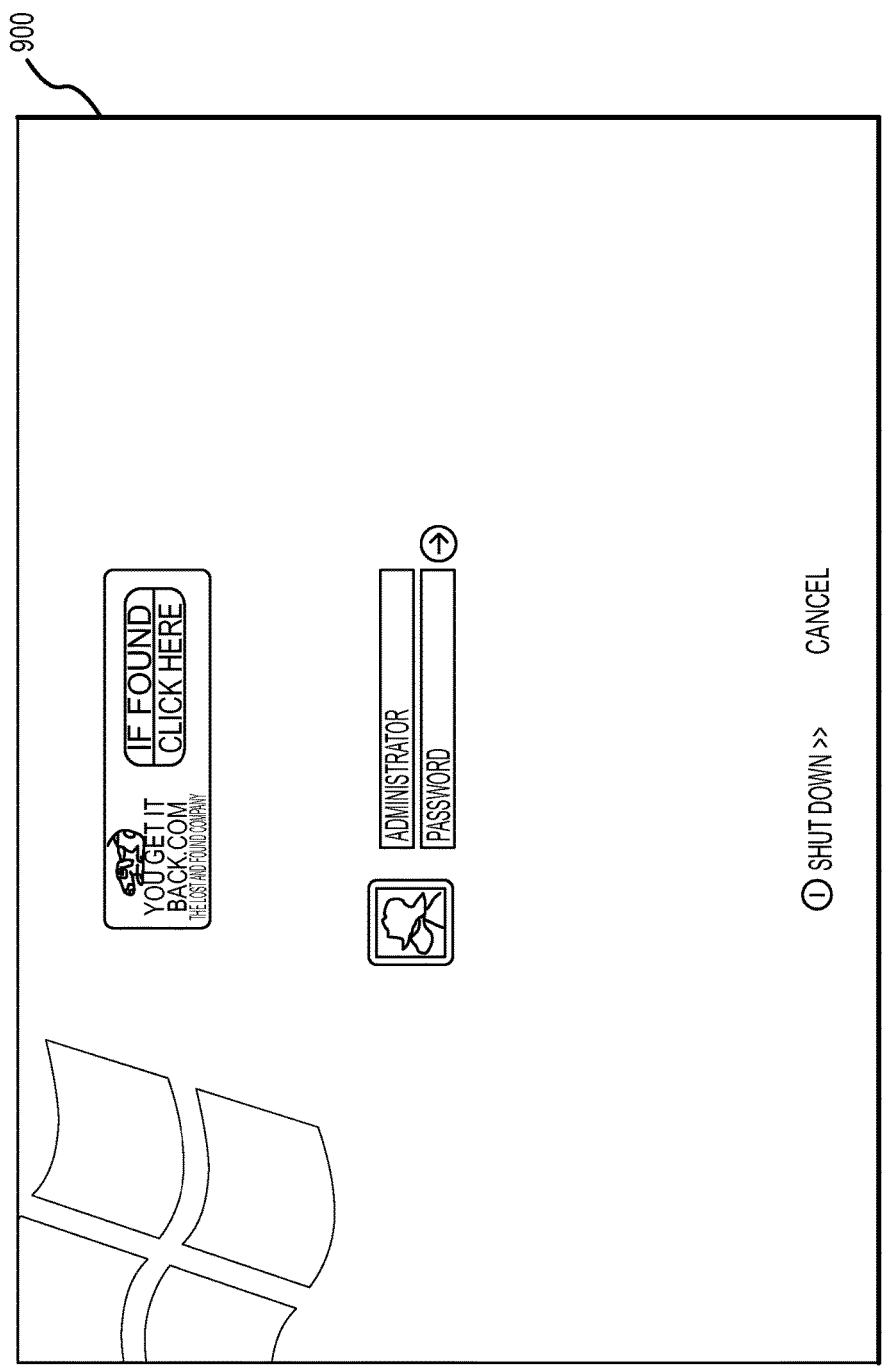
FIGS. 9-16 depict exemplary notification measures that can be provided on a mobile computing device such as a laptop computer in accordance with the present invention.
Figure 10:
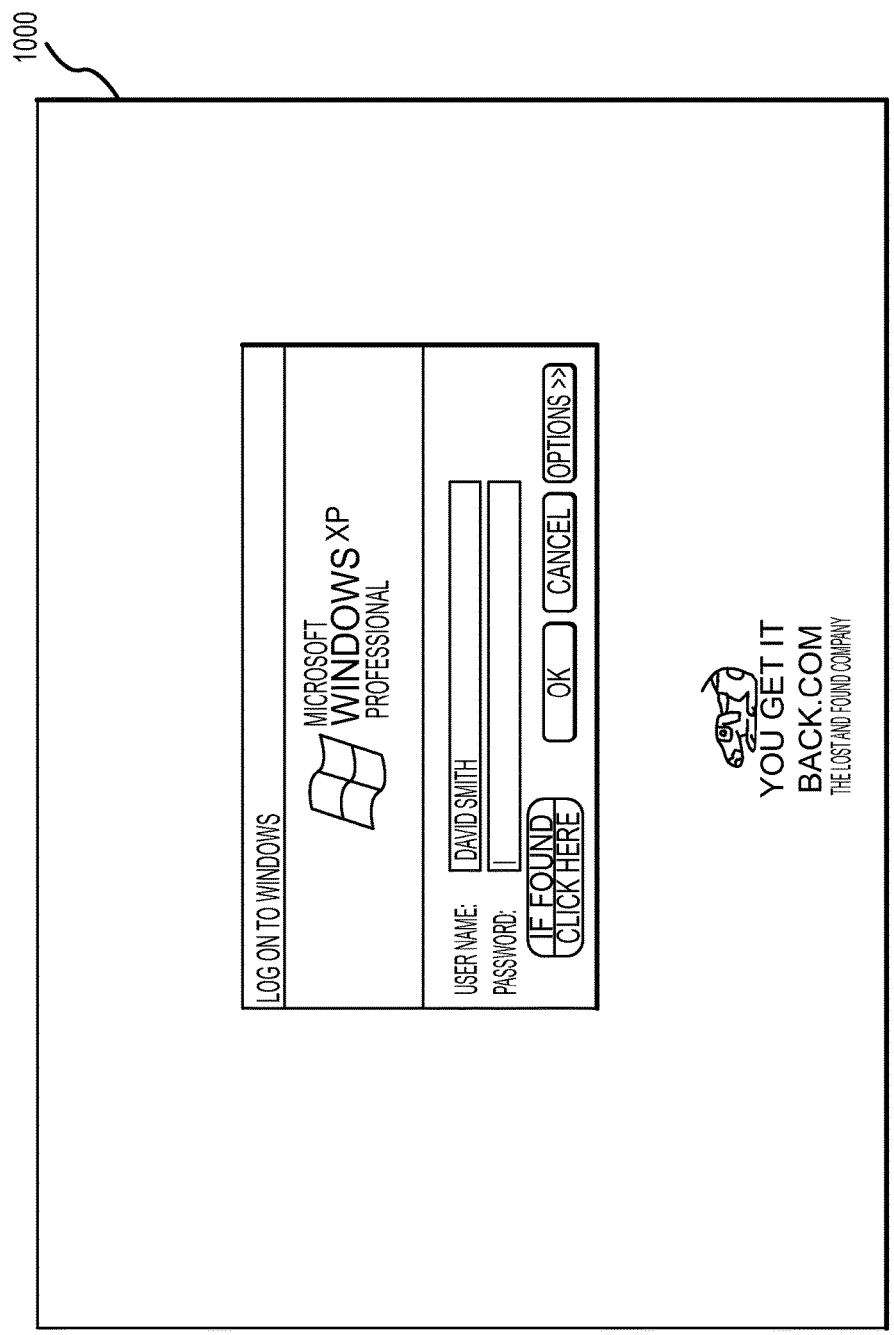
Figure 11:
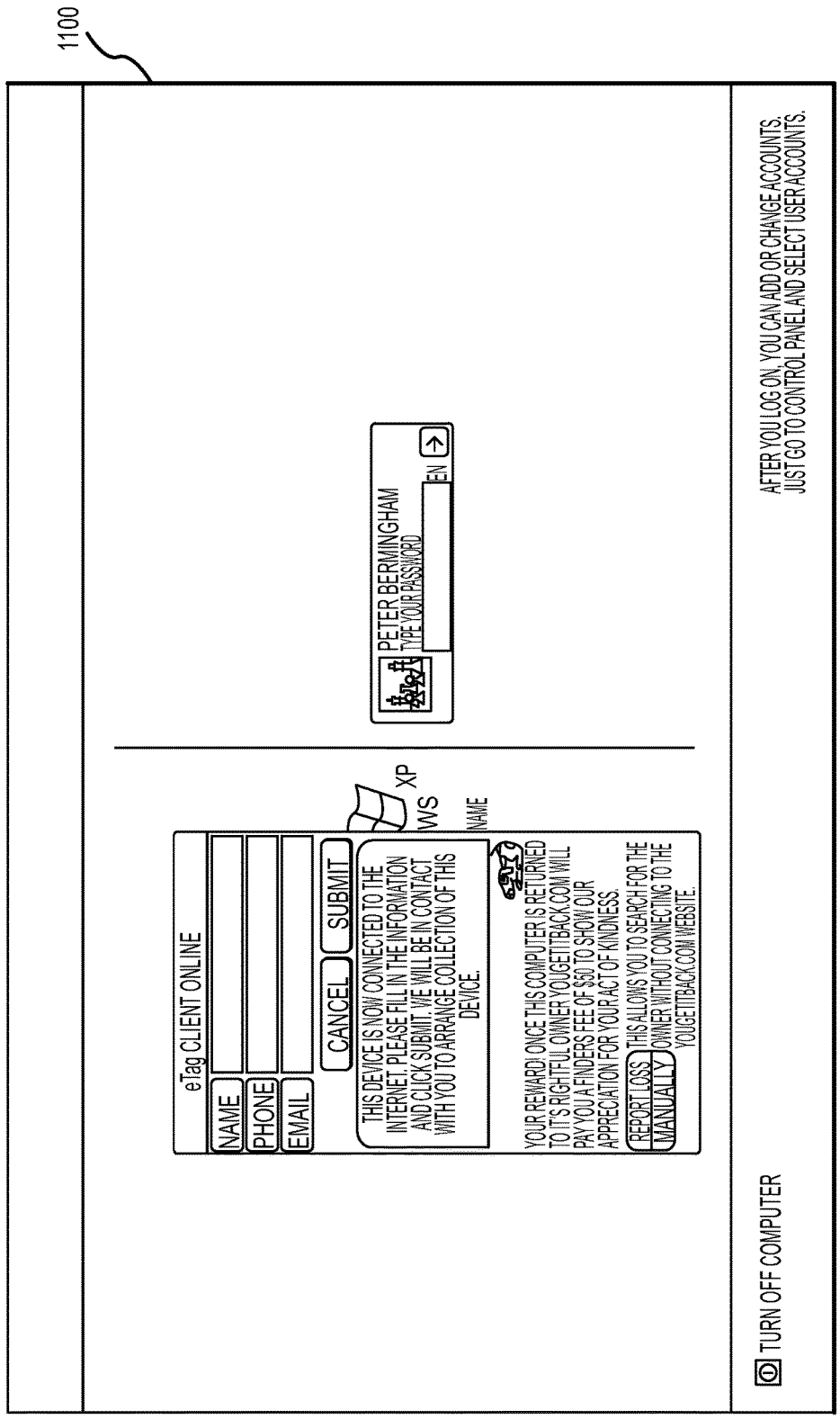
Figure 12:
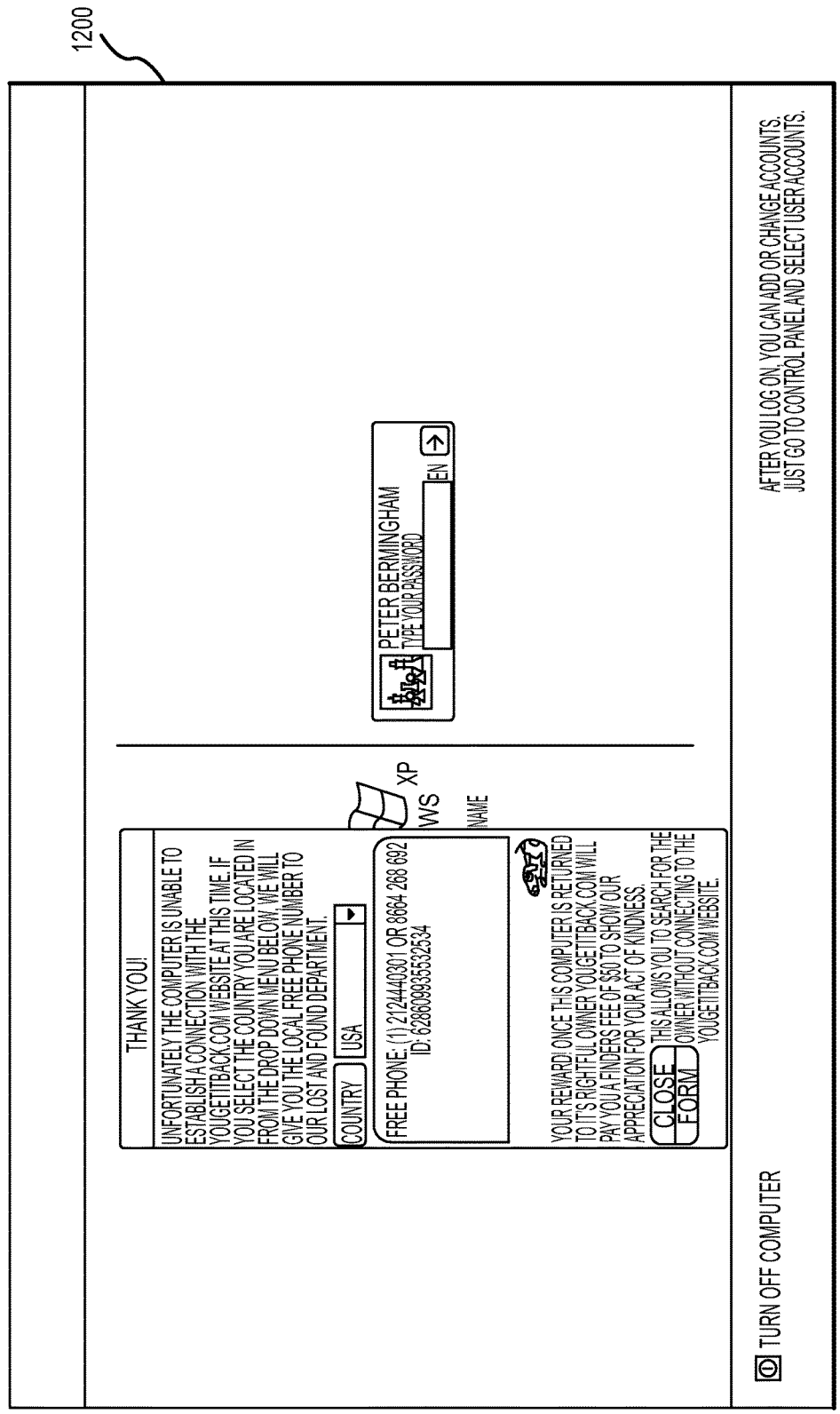
Figure 13:
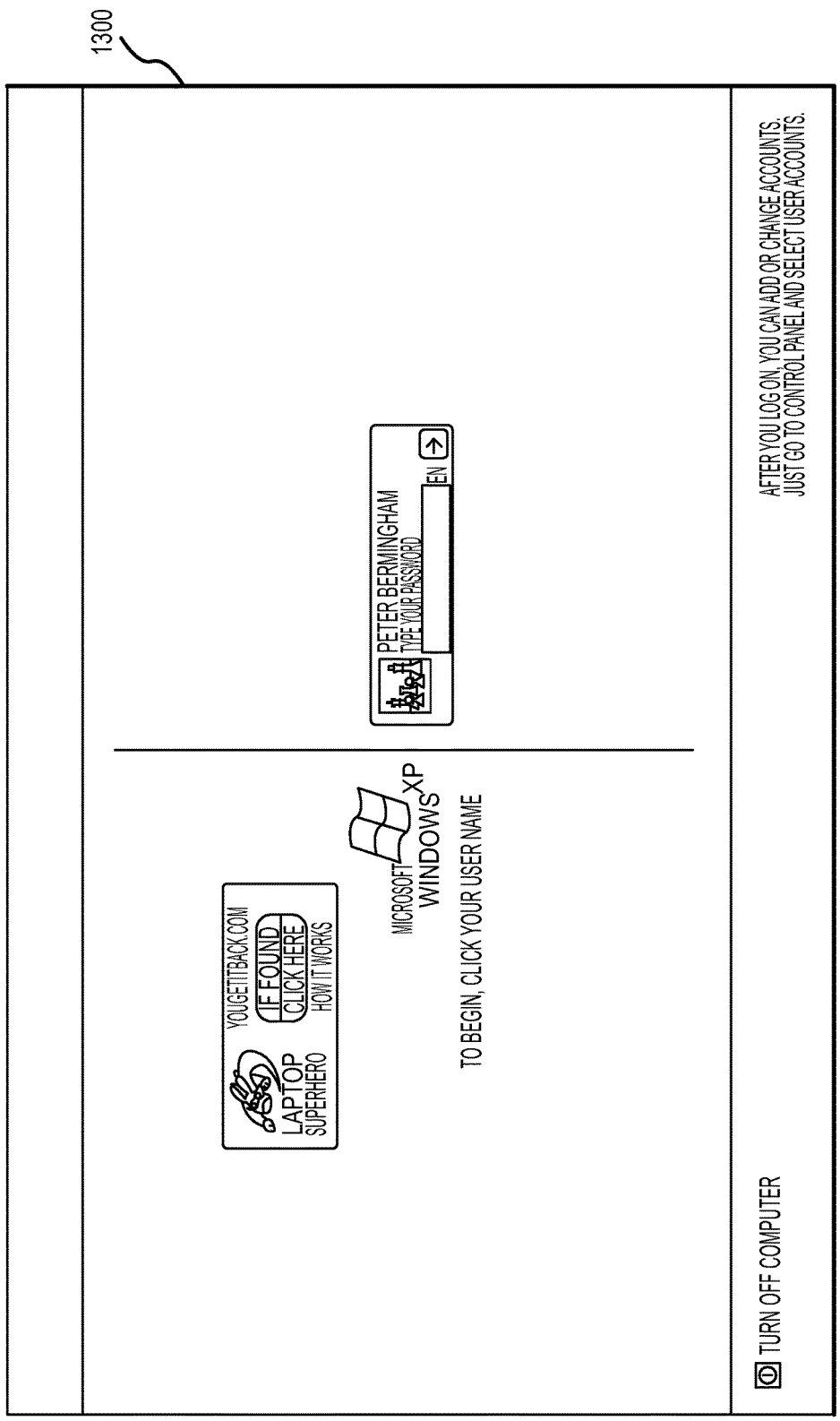
Figure 14:
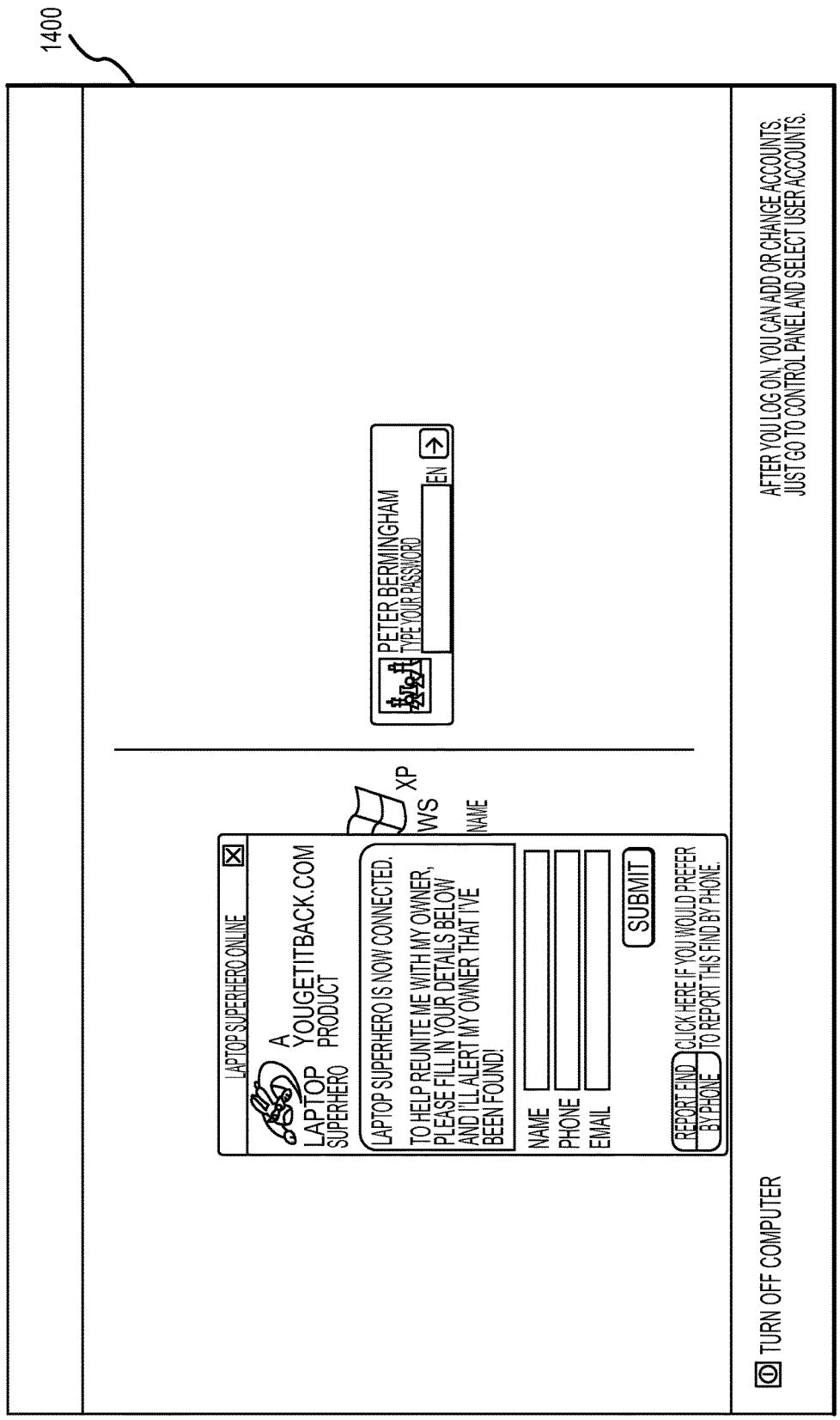
Figure 15:
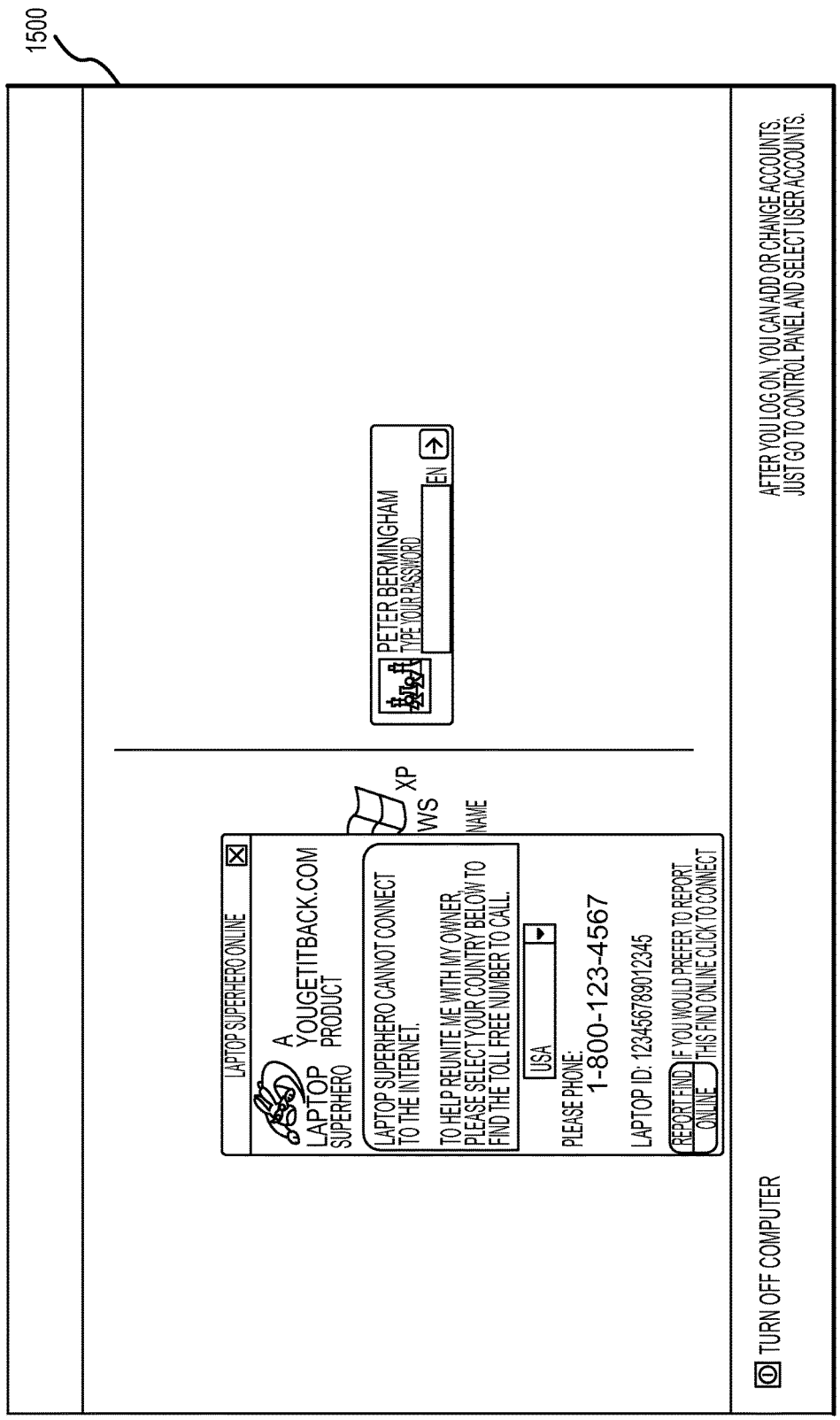
Figure 16:
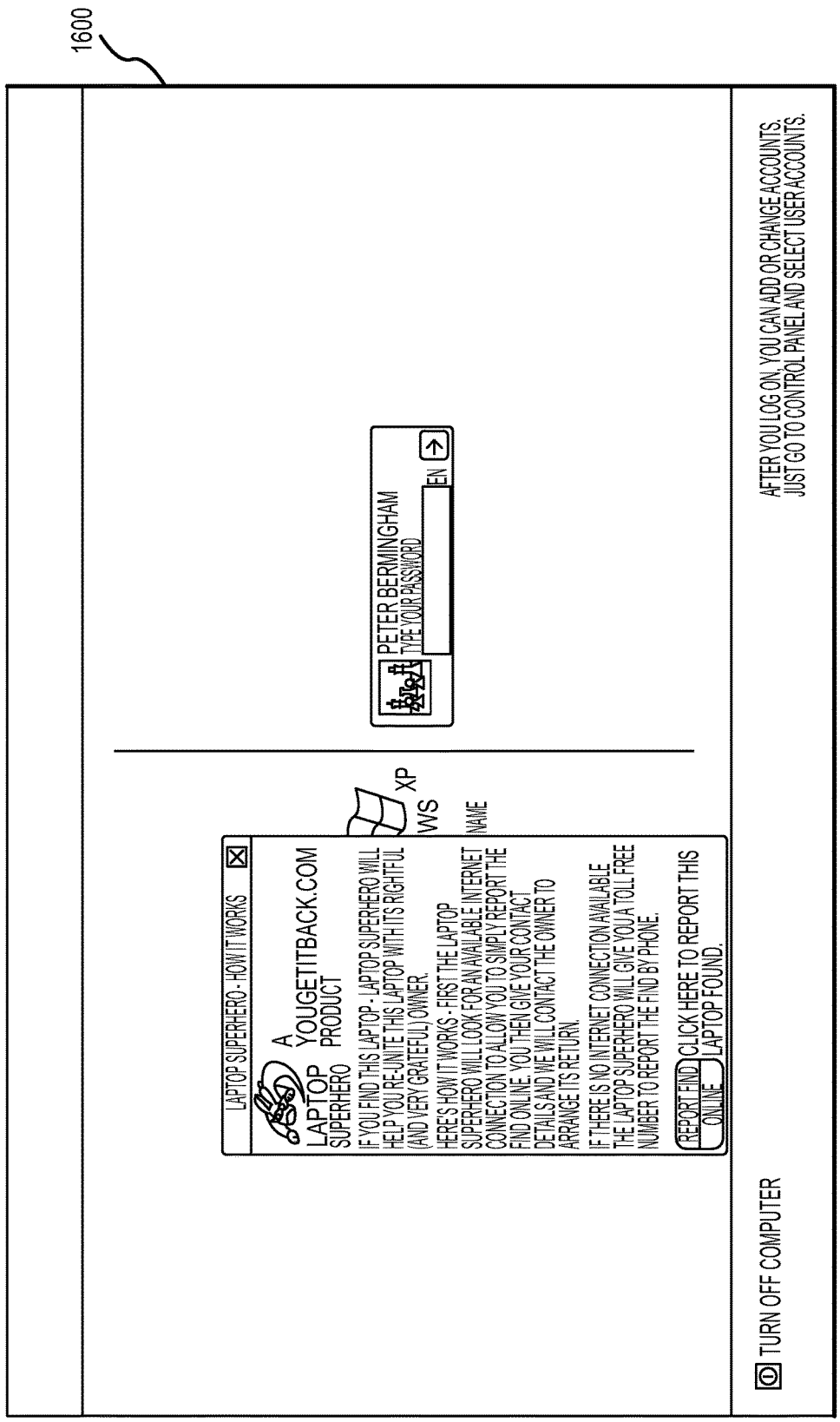
Figure 17:
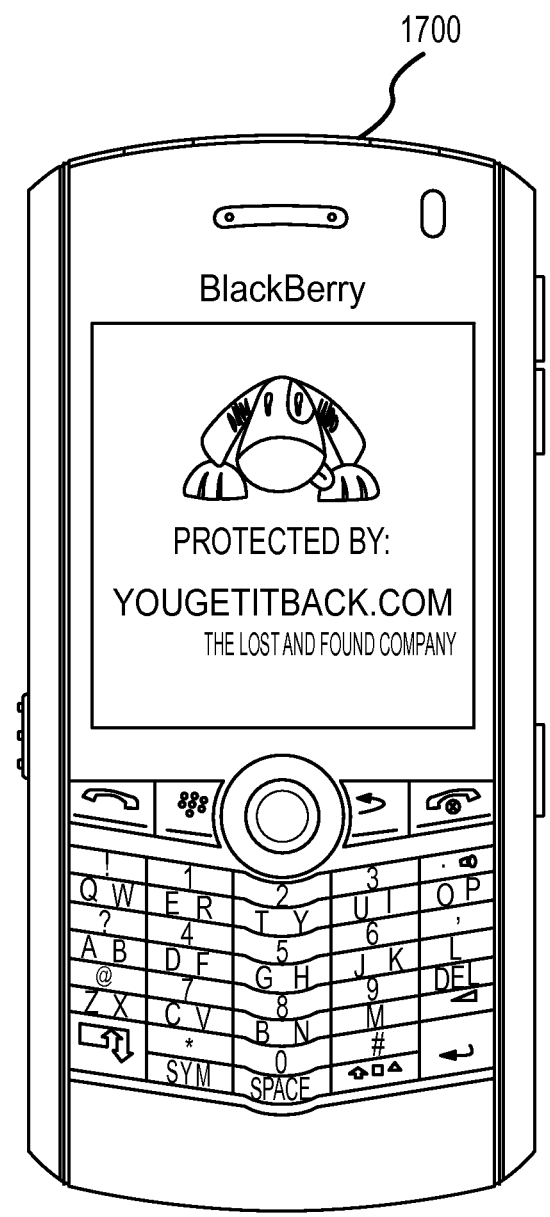
FIGS. 17-25 depict exemplary notification messages that may be displayed on a cellular phone, a PDA, or handheld mobile device.
Figure 18:
Figure 64:
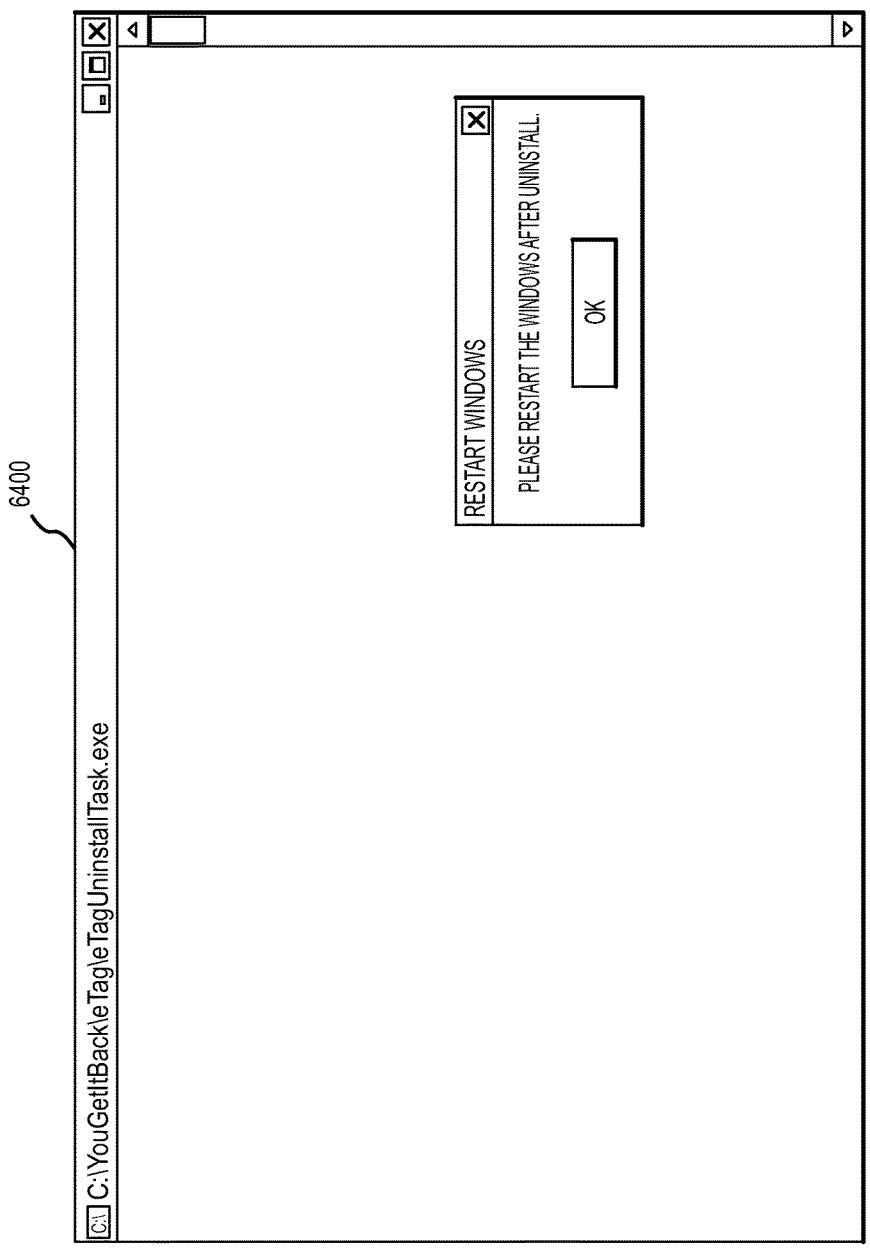

FIGS. 9-64 depict various aspects of the operation of exemplary embodiments according to the present invention.

FIGS. 9-16 depict exemplary notification measures that can be provided on a mobile computing device such as a laptop computer in accordance with the present invention. As shown in the illustrated embodiments, a notification icon or graphic is provided in proximity to input fields where users normally log in to access the mobile computing device. The notification icon or graphic is accompanied by text providing information regarding returning of the device. The various notification messages allow a finder of the mobile device to see that the device is protected by an application operating in conjunction with the present invention as well as to provide information to allow the user to return the device. For example, referring now to FIG. 13, screen 1300 provides a link to a website that an innocent finder can click on to return the device. Similarly, referring now to FIG. 14, screen 1400 provides entry fields for a finder of the device to enter his or her name, phone number, and email address, and submit this information to a security authority. Screens 1500 and 1600 in FIGS. 15 and 16 respectively, provide a toll-free phone number and information regarding how to return the mobile device.

Figure 19:
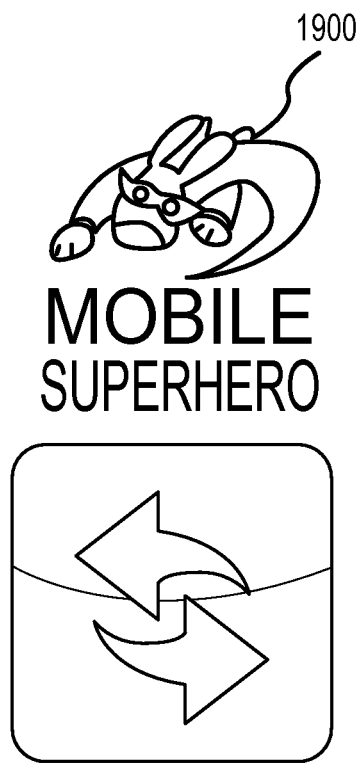
Figure 20:
Figure 21:
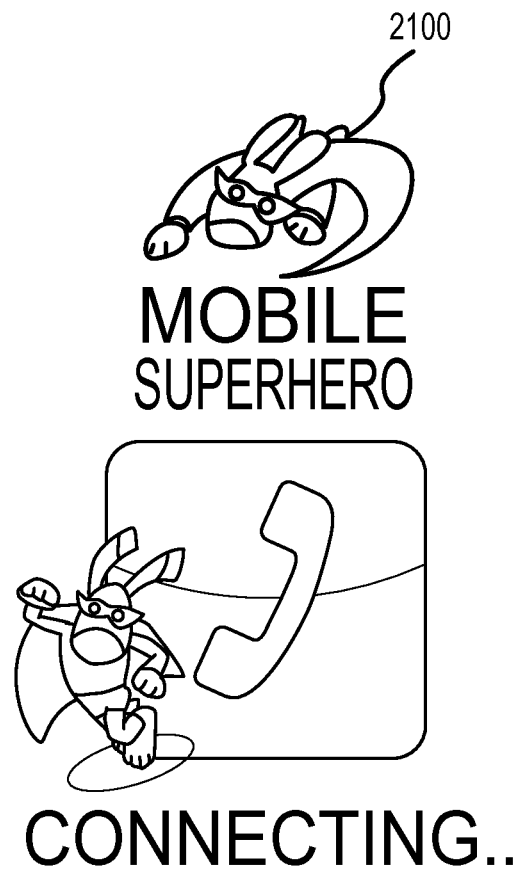
Figure 22:
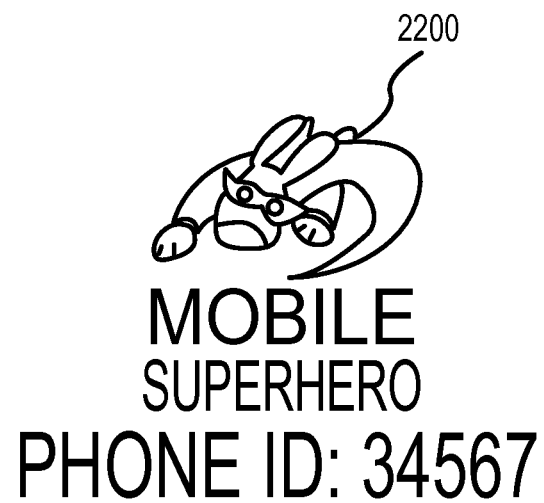
Figure 23:
Figure 24:
Figure 25:
Figure 26:
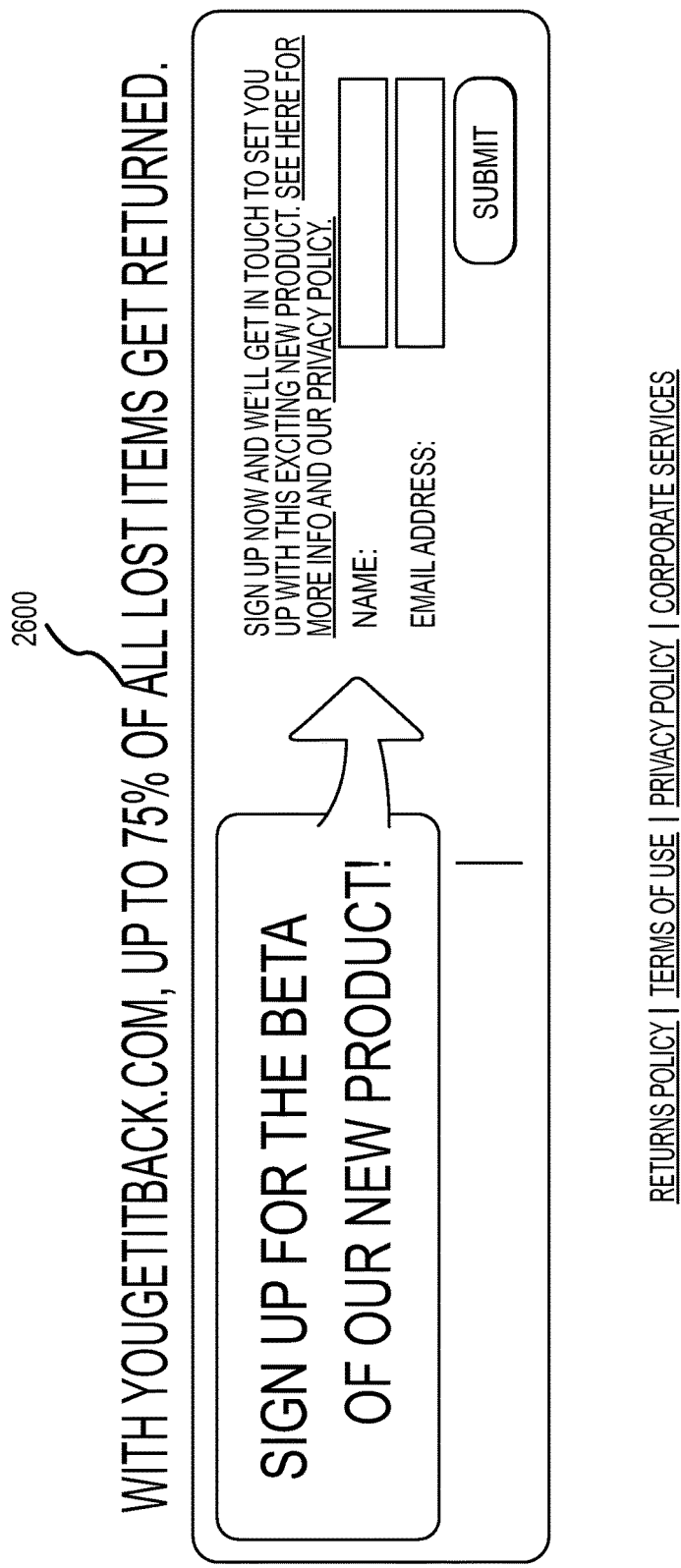
Figure 29:
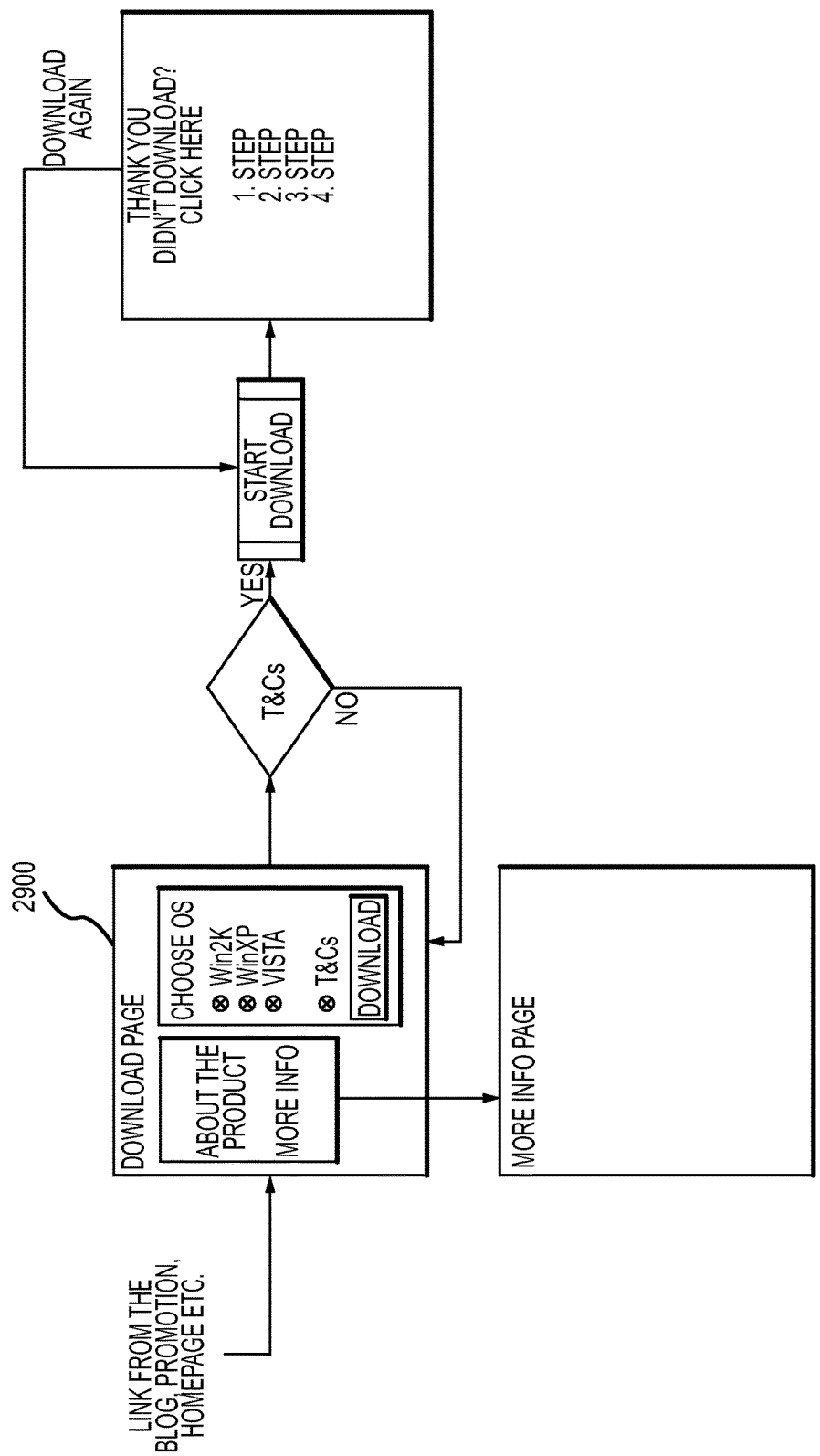

FIGS. 17-25 depict exemplary notification messages that may be displayed on a cellular phone, a PDA, or handheld mobile device. The notification messages alert the finder of the mobile device that the device is protected by an application operating in conjunction with the present invention as well as to provide information to allow the user to return the device. For example, referring now to FIGS. 18 and 22, the notification message may include buttons the user may select to return the mobile device. FIGS. 19, 20, and 21 depict notification messages that may be displayed when a user of a found mobile device places a call, such as to a security authority. Referring to FIG. 23, the notification message may include an identification number associated with the mobile device as well as any other desired information.

Figure 30:
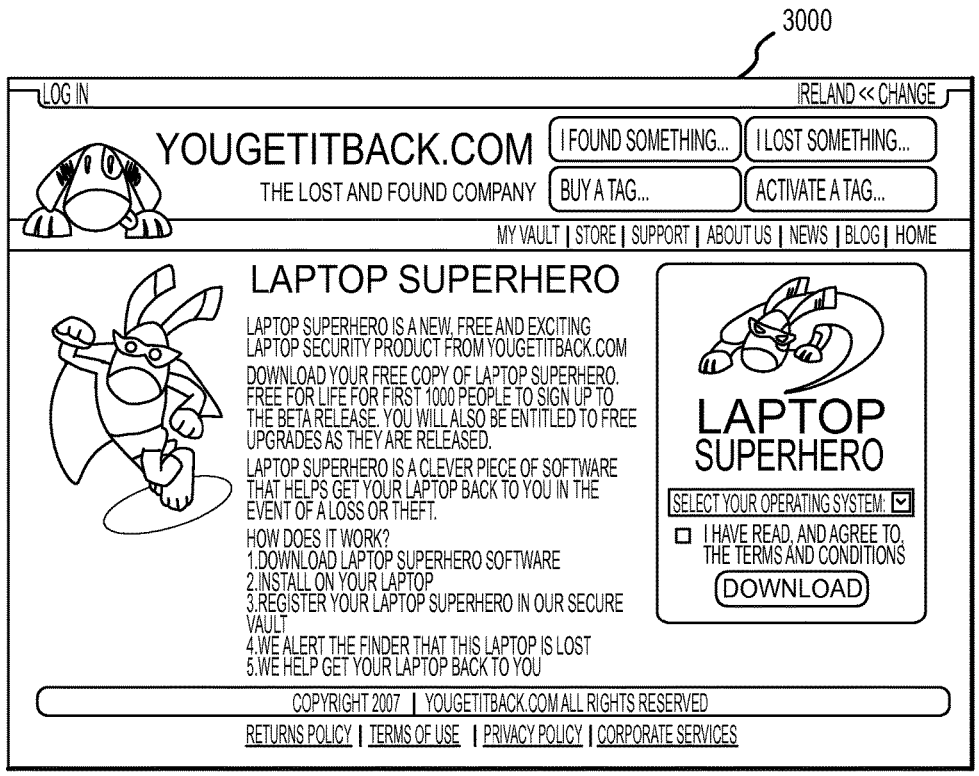
Figure 31:
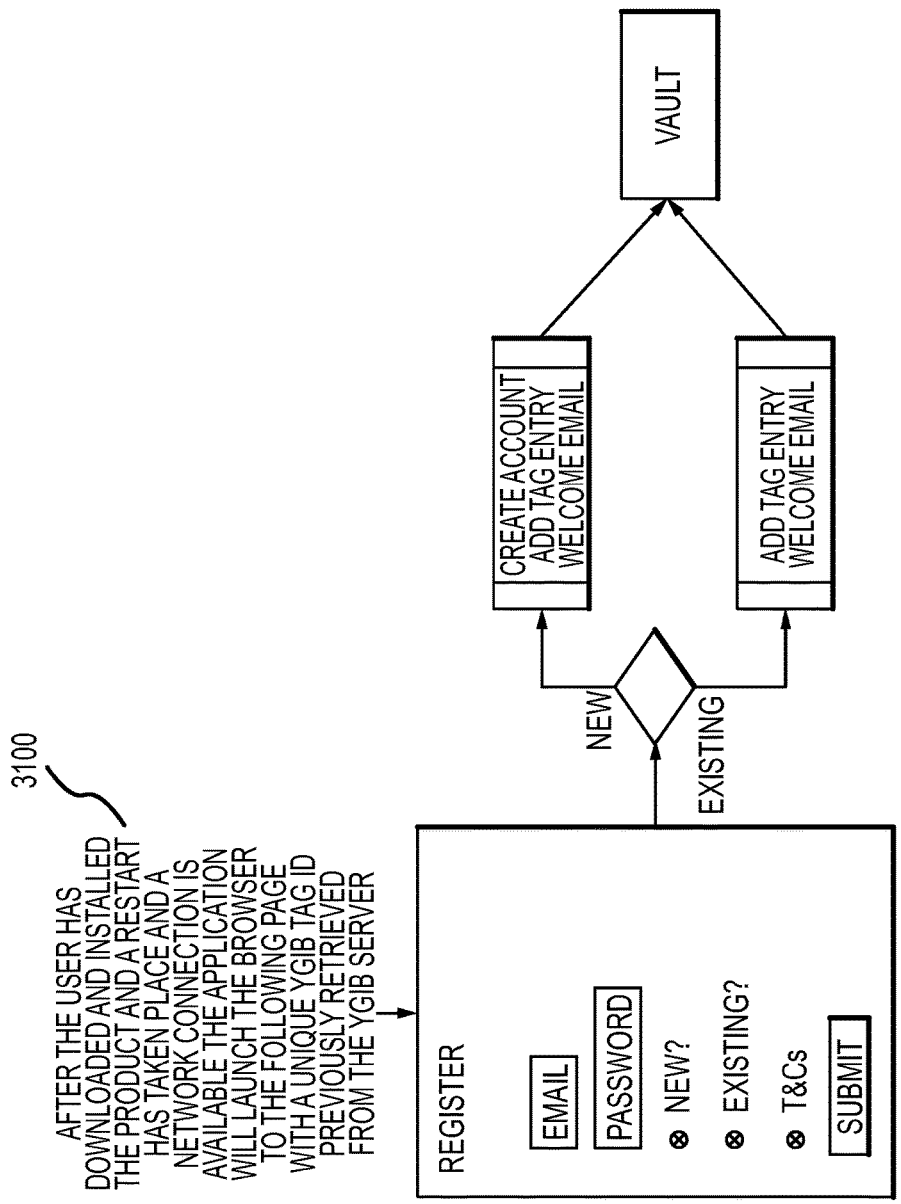
Figure 32:
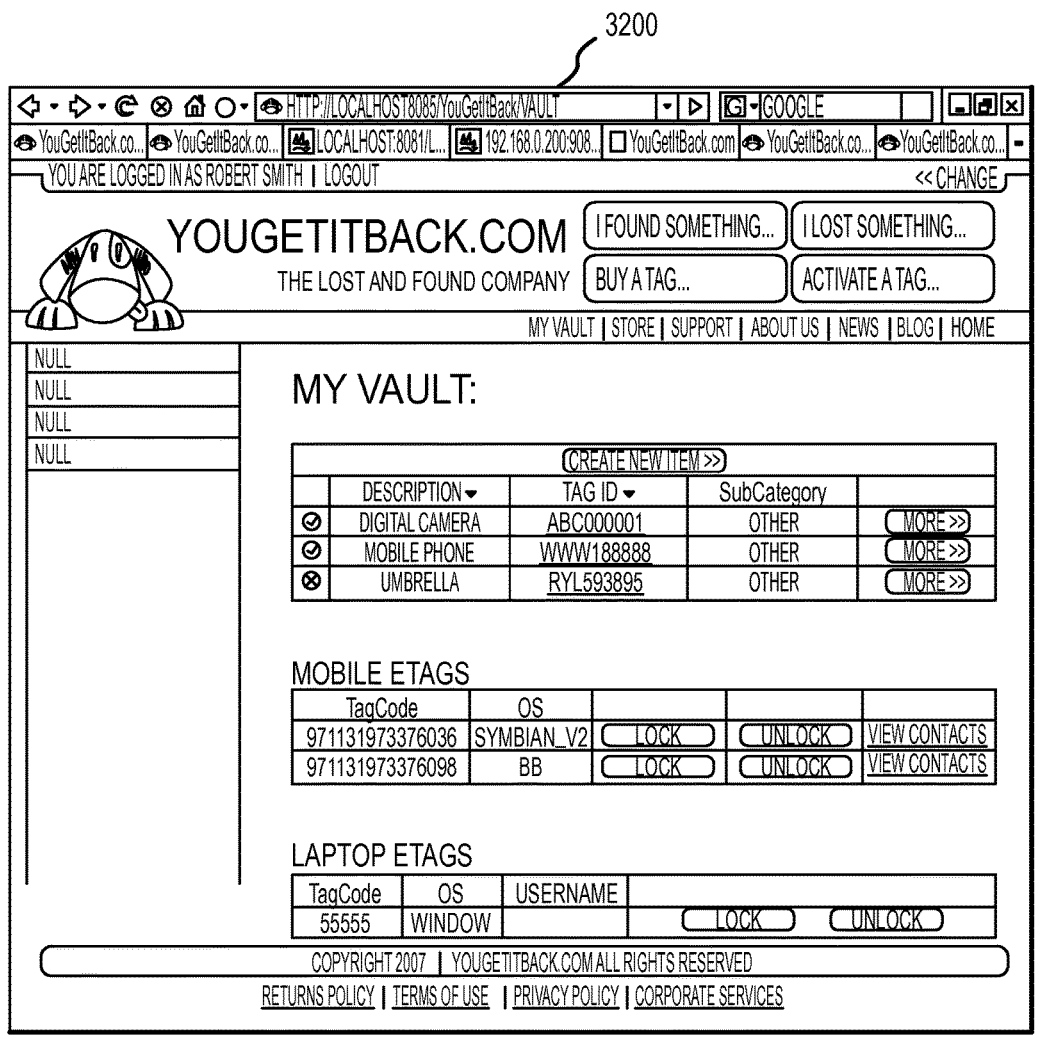
Figure 33:
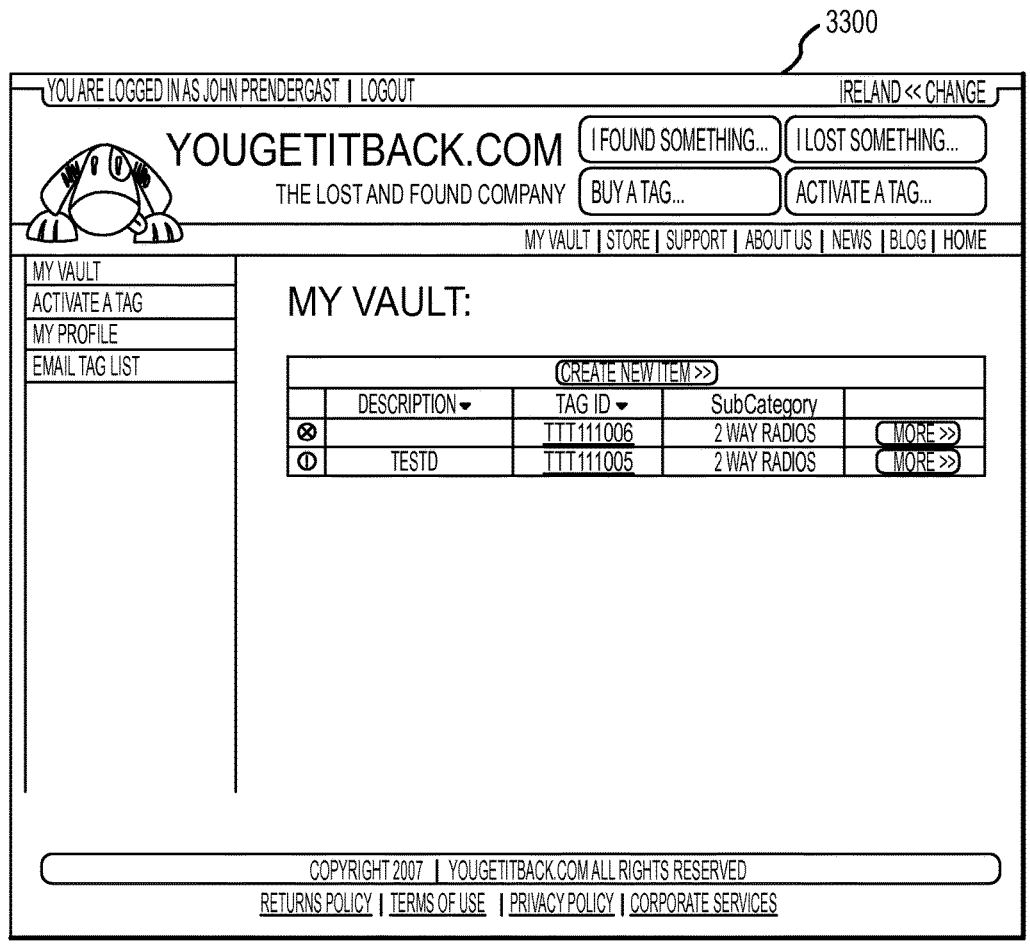

A user of a mobile device protected in accordance with the present invention may interface with a host server such as one administered by a security authority through a website. FIGS. 26-37 depict exemplary screens and processes associated with a host server as exemplified by embodiments of the present invention. A user may be given an opportunity to sign up for a service to protect one or more mobile computing devices in accordance with the present invention (FIGS. 26-34). After a user has created an account, he/she may download a software application to the mobile device to be protected, as depicted in flow diagram 2900 in FIG. 29. The user is thus provided with information regarding installation and user of the security application (FIG. 30). Referring to FIG. 31, after the user has downloaded and installed the product and has restarted the mobile device (if necessary), once a network connection is available the application will launch a browser to a web page using a unique identifier such as an identifier tag previous obtained from the host server. As shown in FIGS. 32-33, a summary of the registration information is also presented to the user through the browser screen, and the screen may present a list of multiple devices protected by the service.

Figure 34:
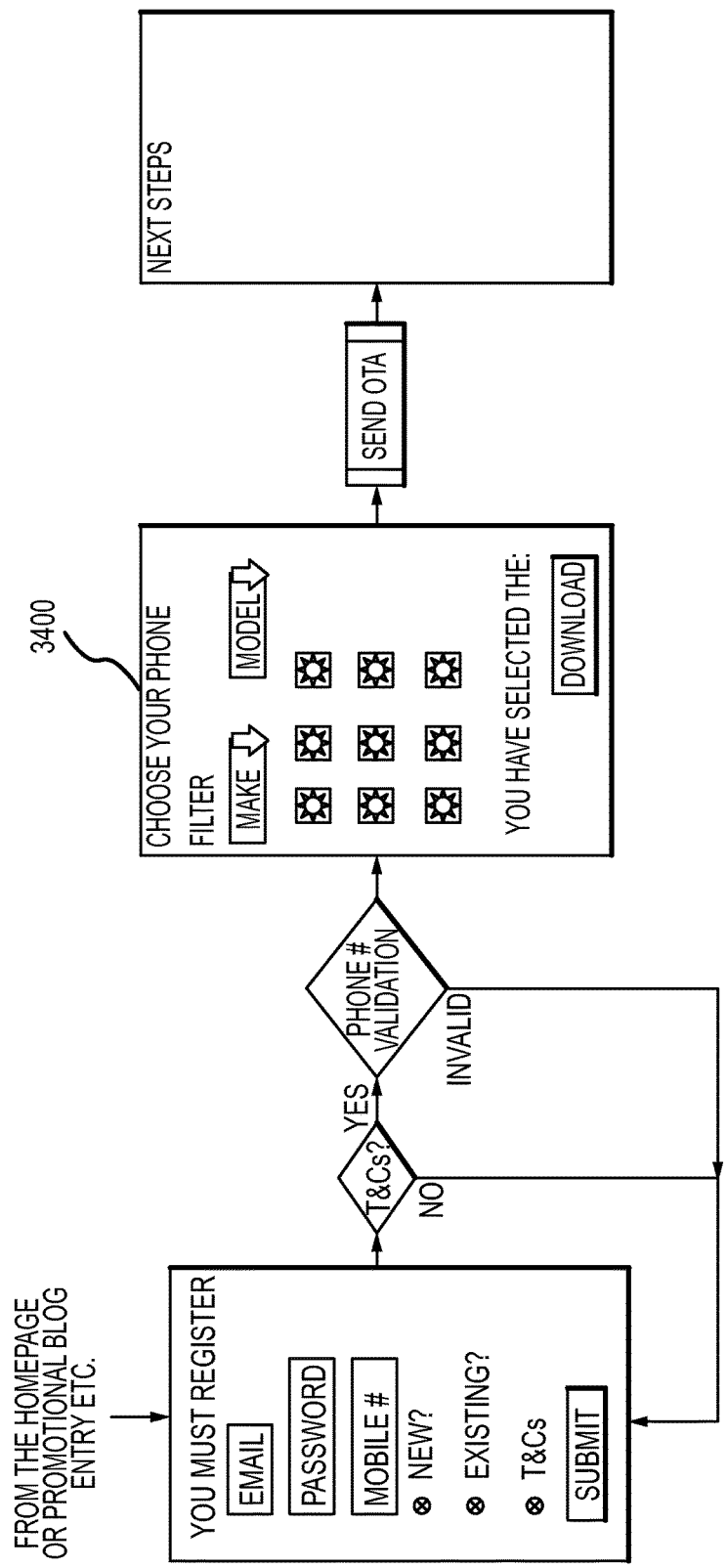
Figure 35:
Figure 36:
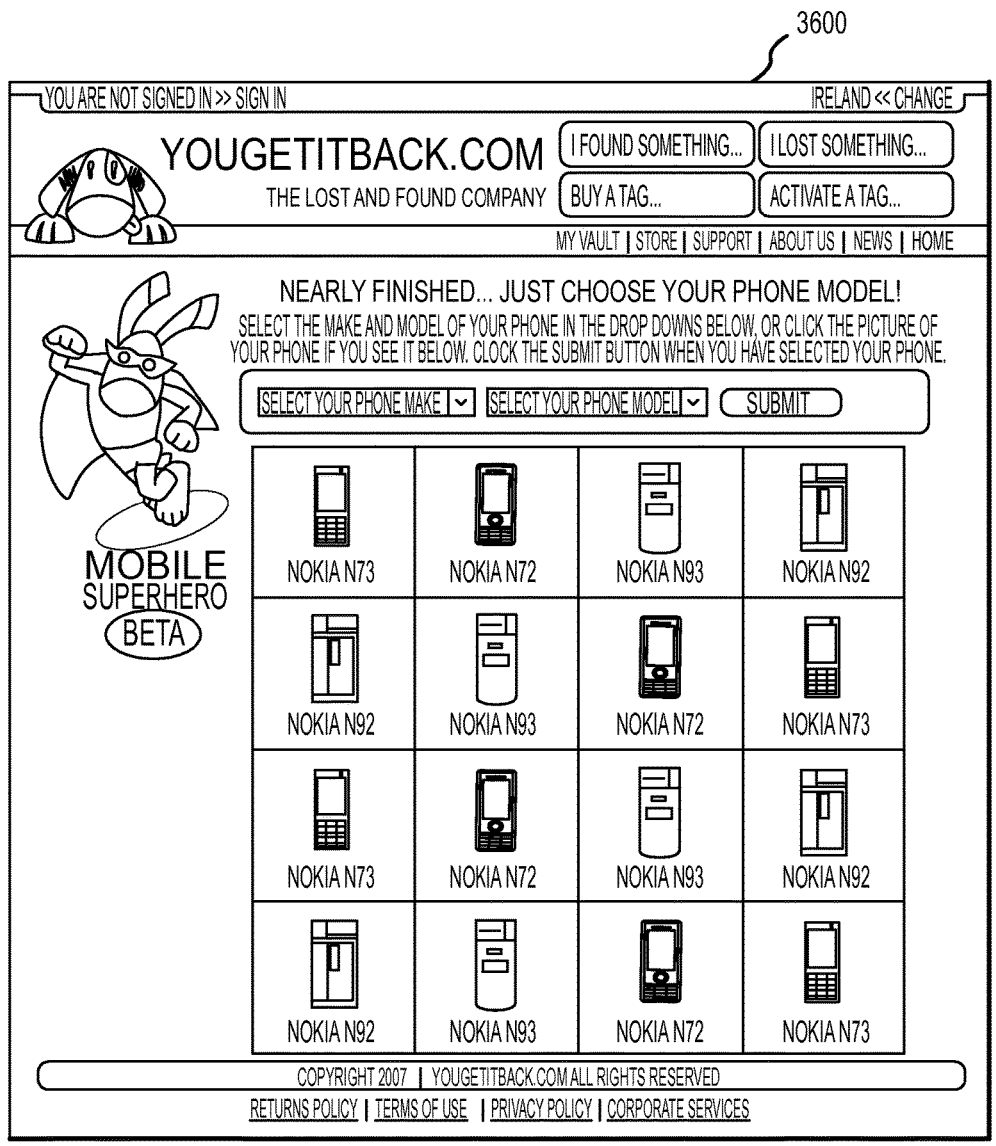
Figure 37:
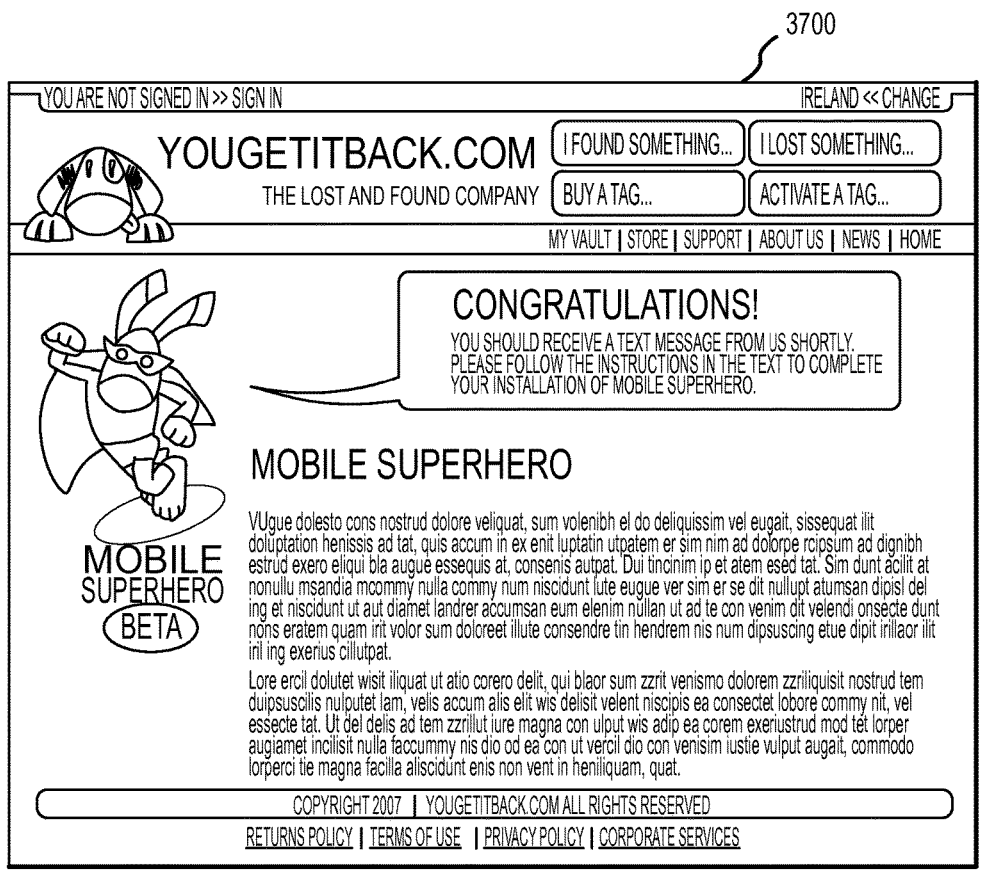
Figure 38:
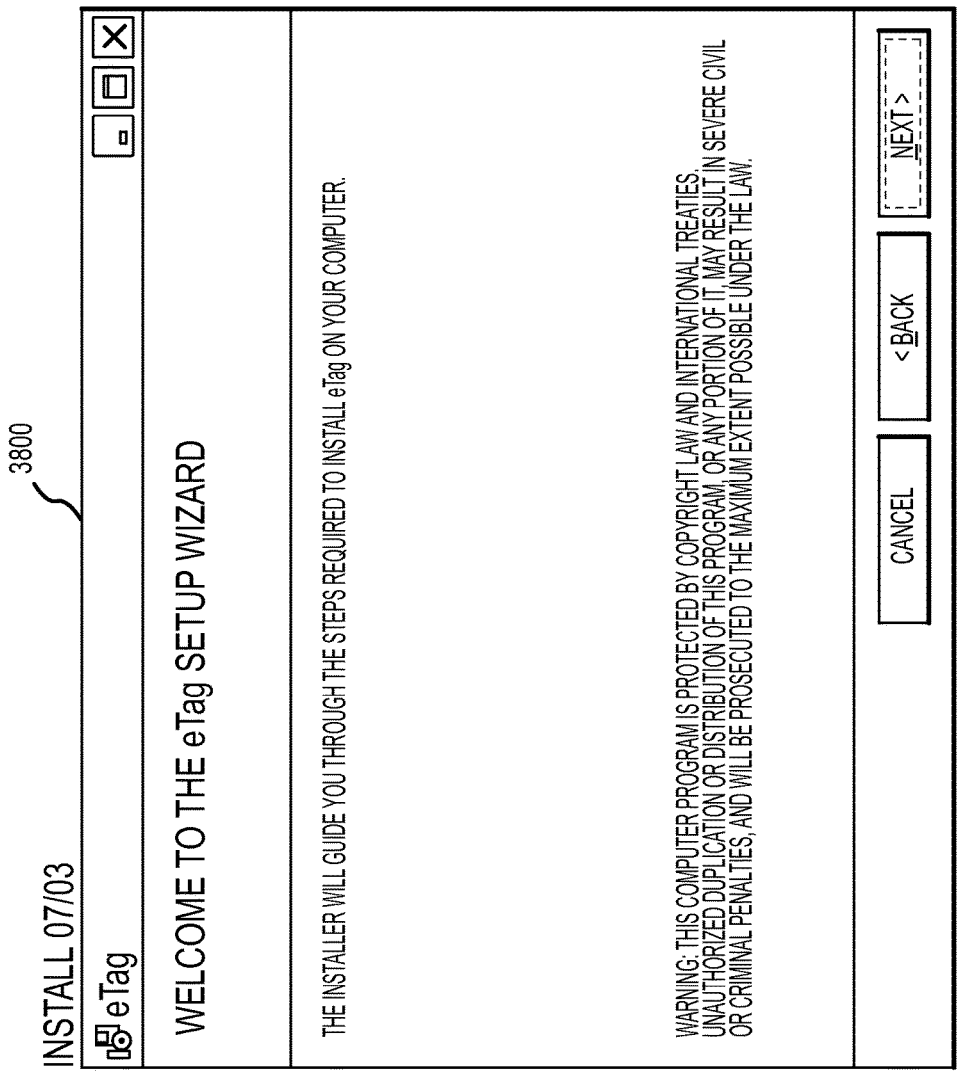
FIGS. 38-58 illustrate installation and registration of a software application downloaded onto a mobile device.
Figure 39:
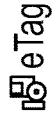
Figure 40:
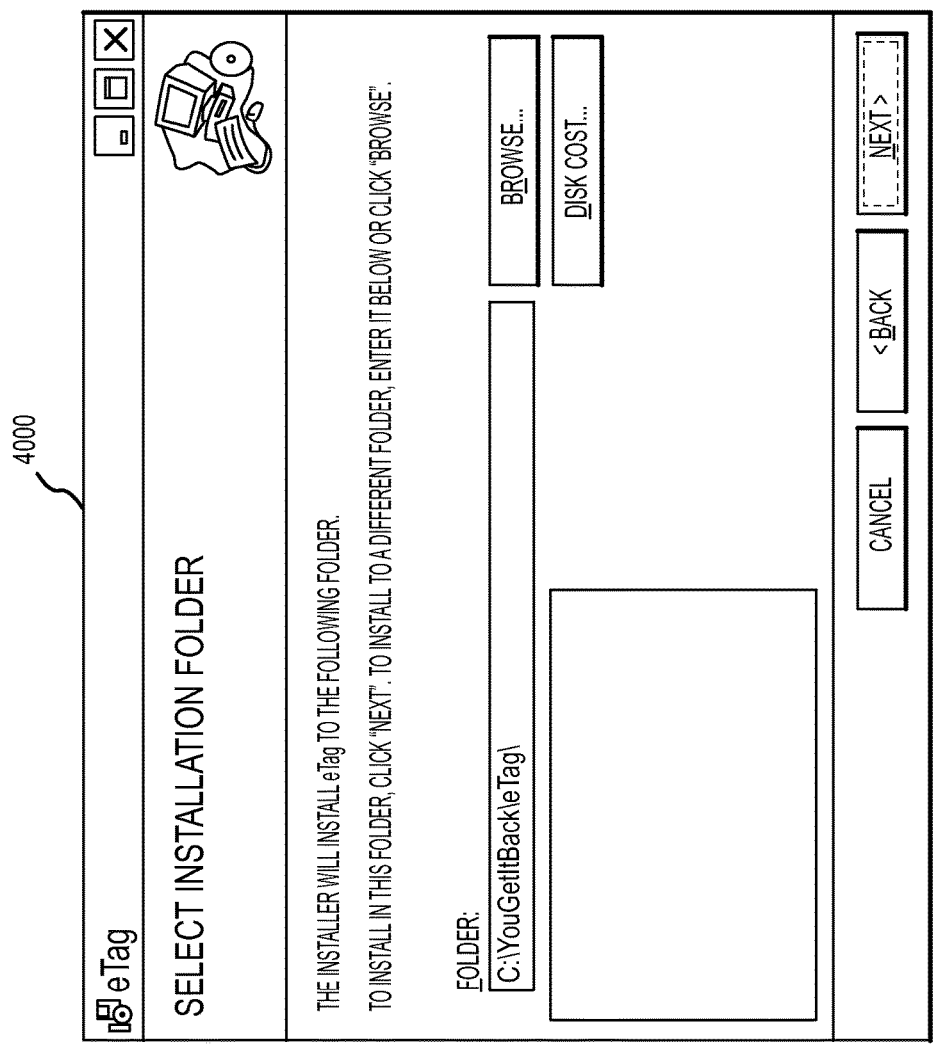

A user may be given an opportunity to sign up for a service to protect one or more mobile devices in accordance with the present invention. FIG. 34 illustrates an exemplary process for creating an account and registering a mobile device in accordance with the present invention. A user creates an account (FIG. 35), selects a mobile device (FIG. 36), and completes the registration (FIG. 37).

FIGS. 38-55 pertain to the installation and registration of a software application downloaded onto the mobile device.

Figure 41:
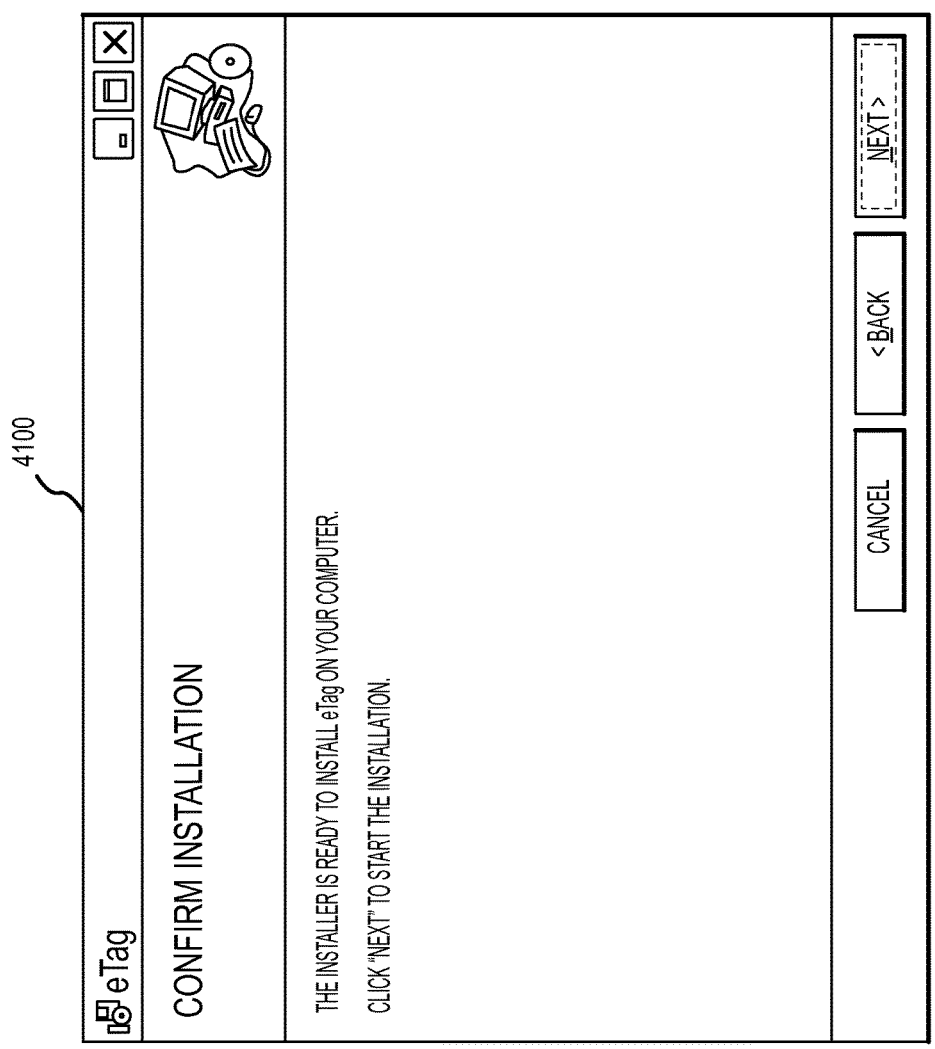
Figure 42:
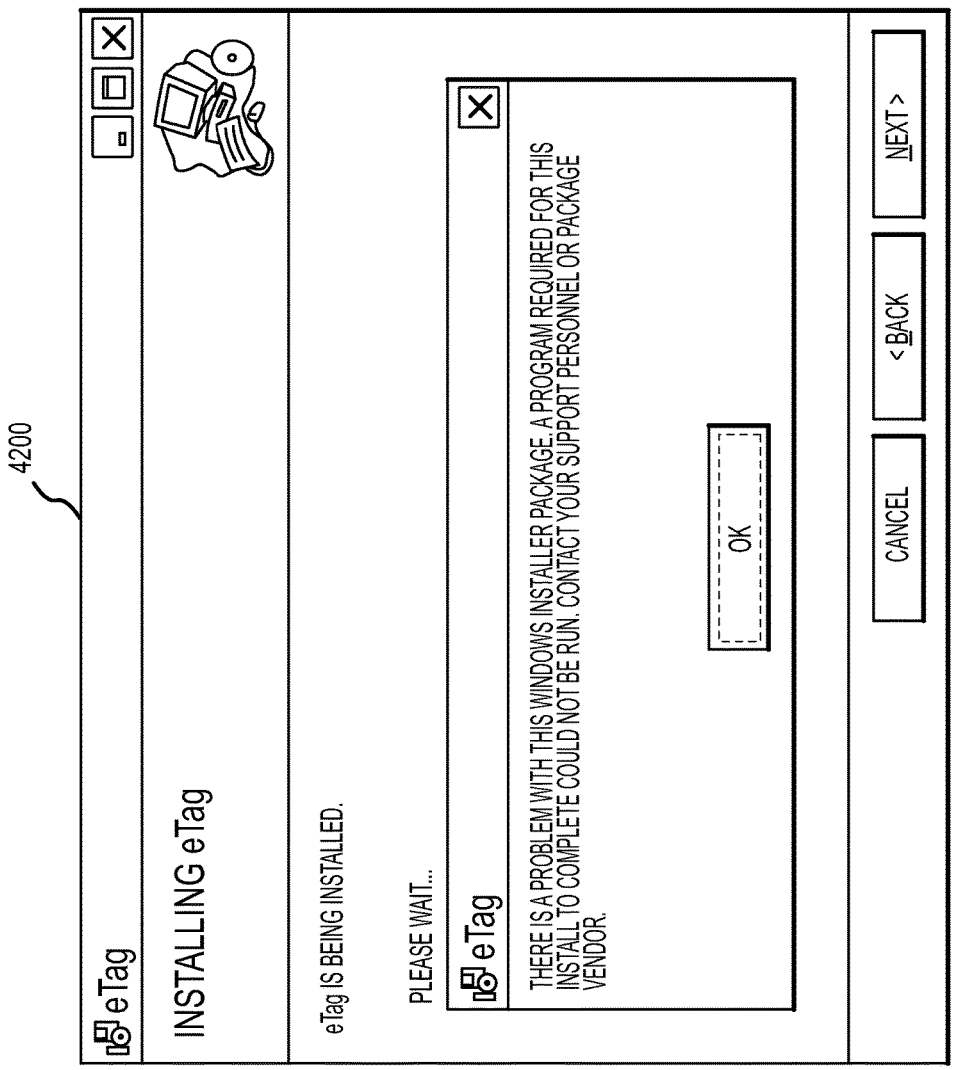
Figure 43:
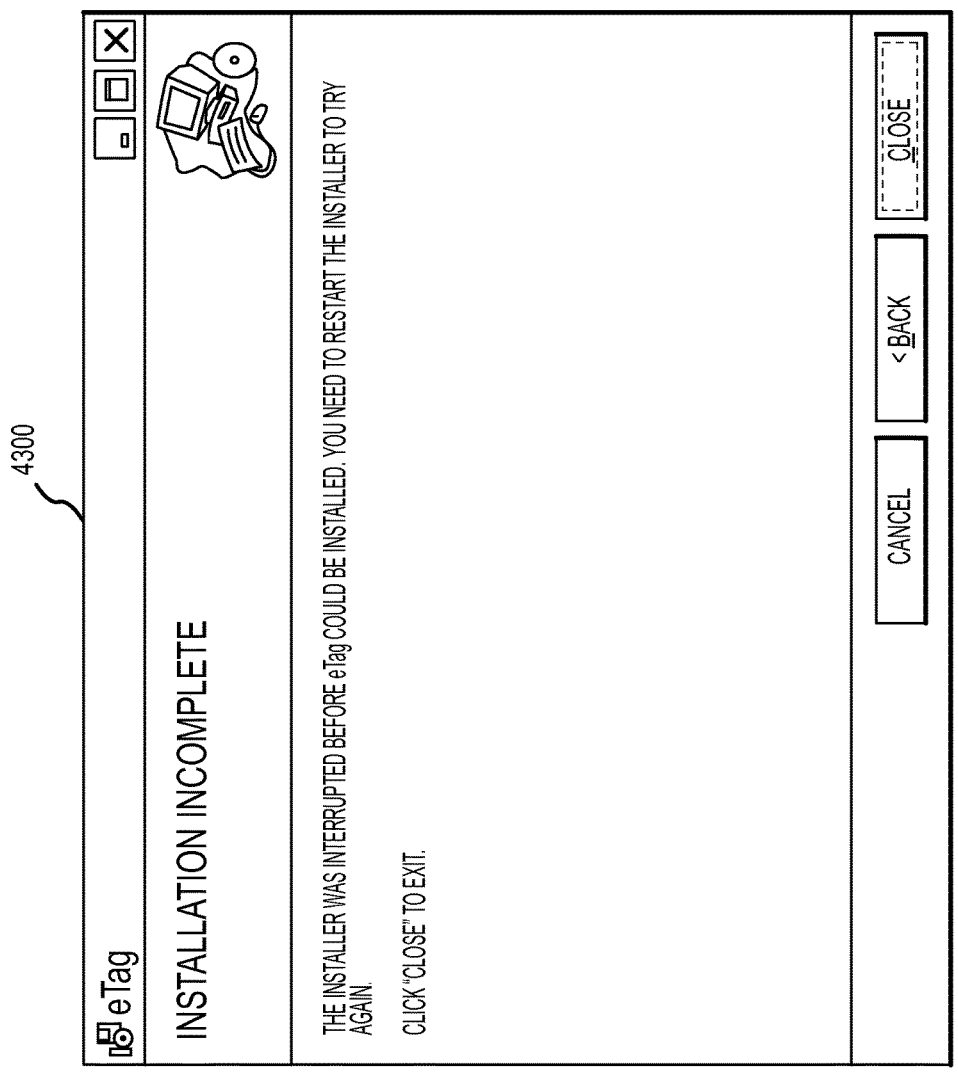
Figure 44:
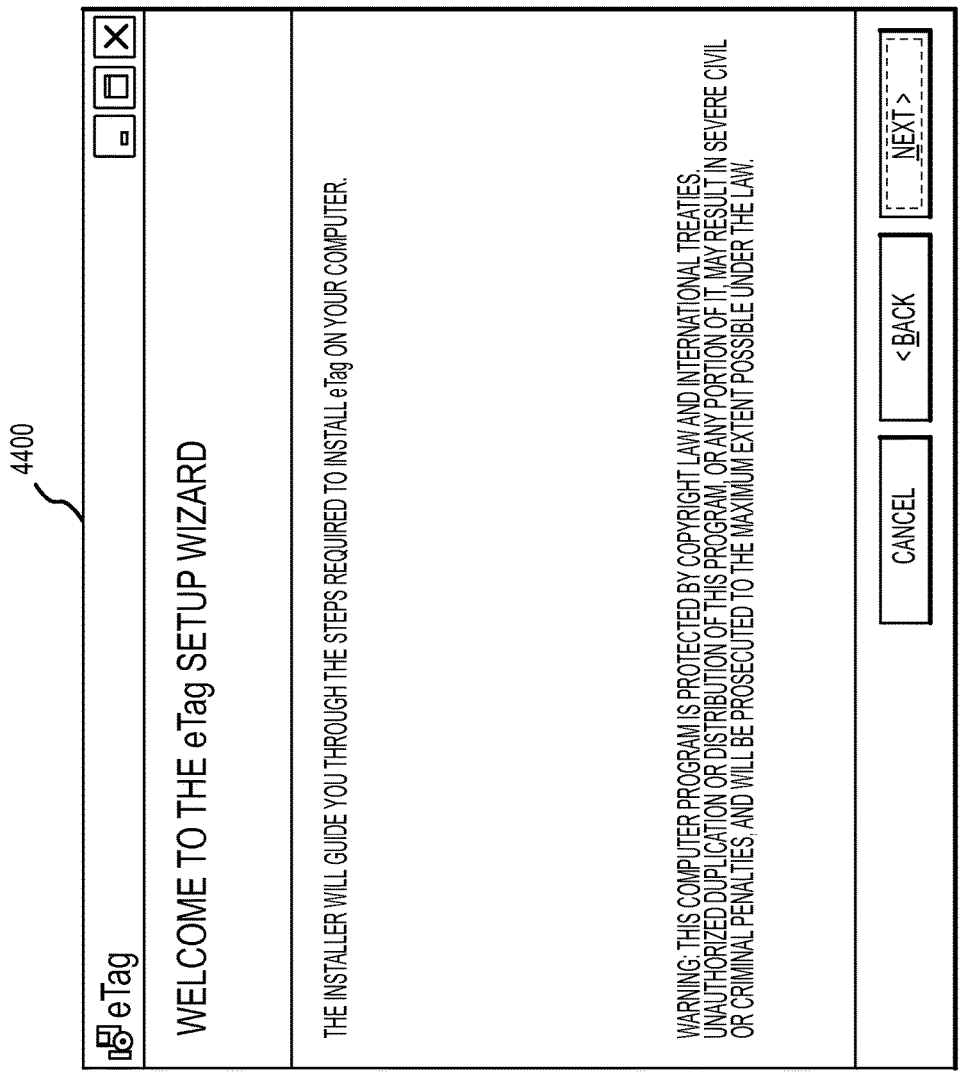
Figure 45:
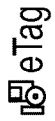
Figure 46:
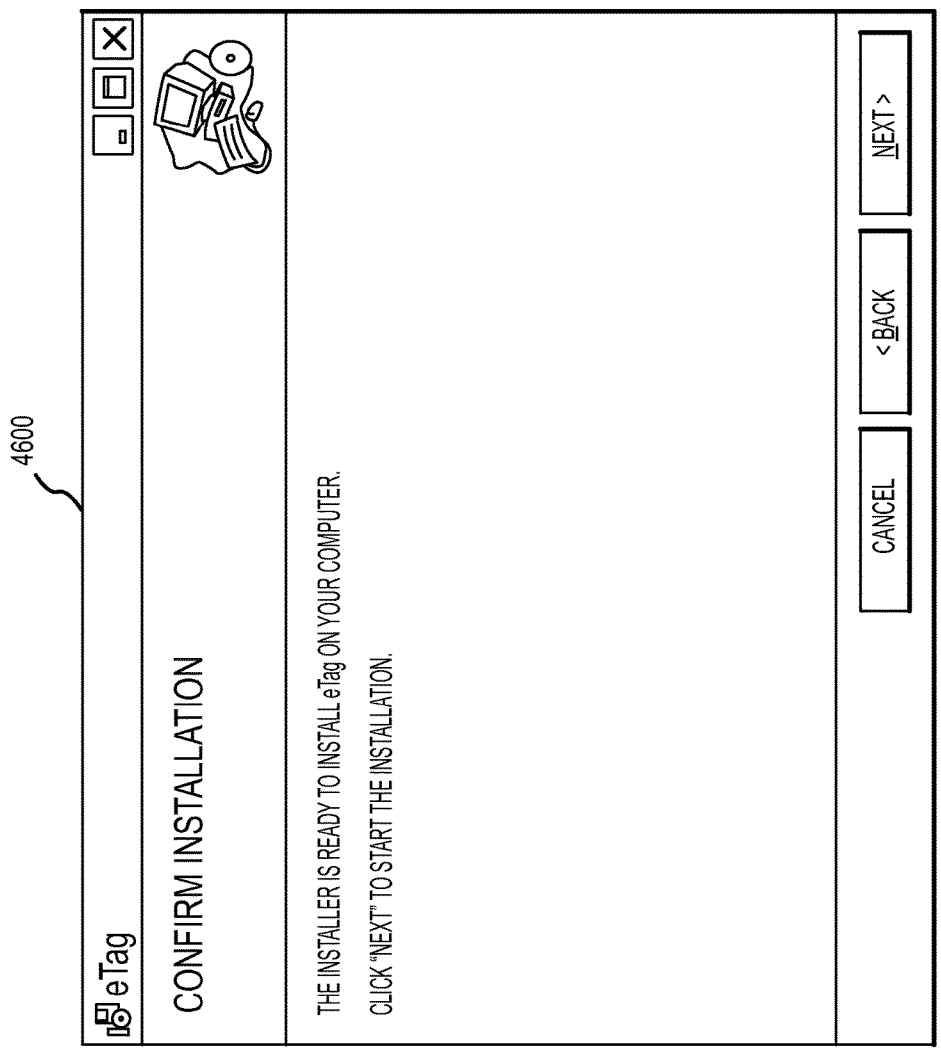
Figure 47:
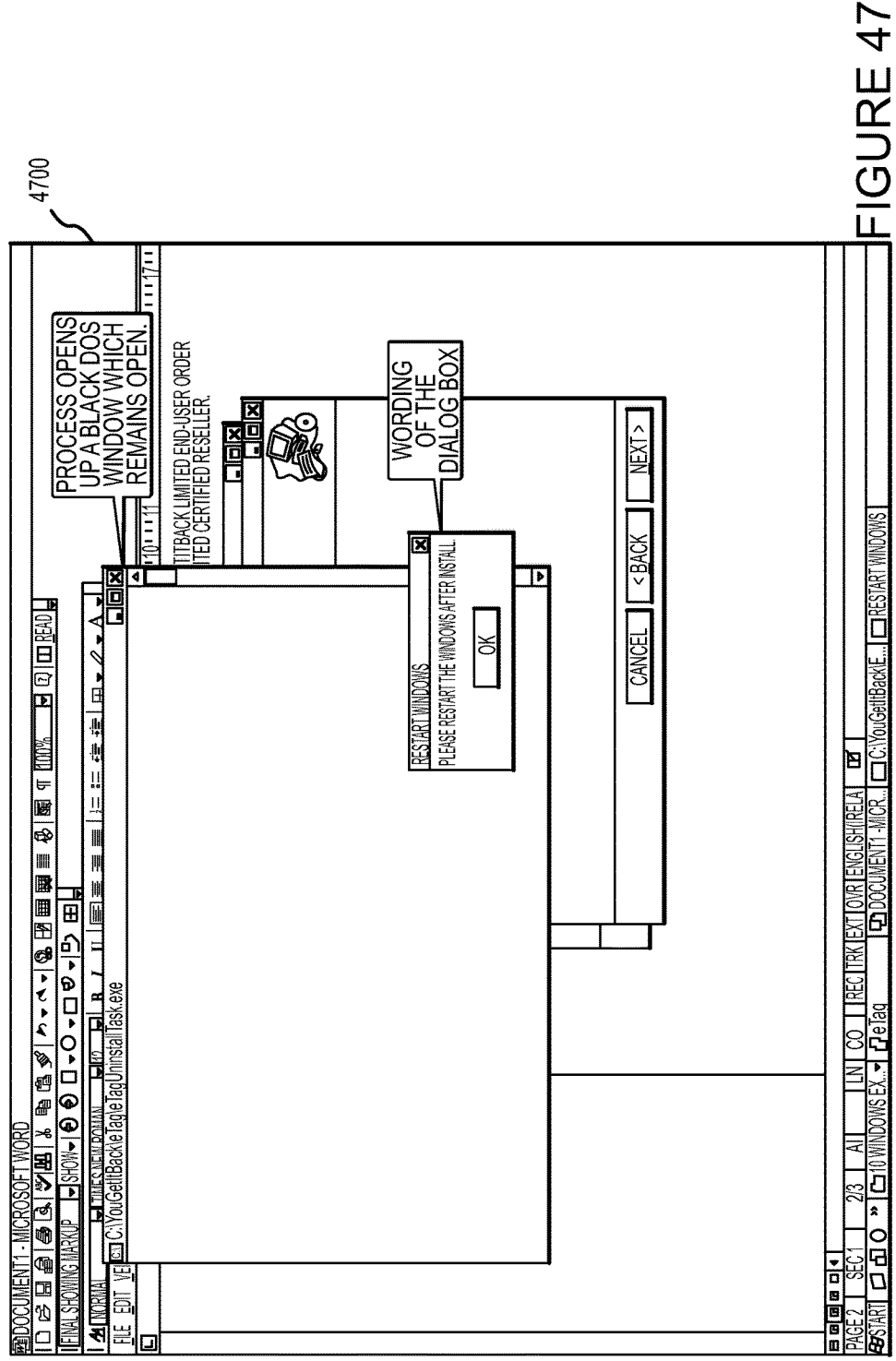
Figure 48:
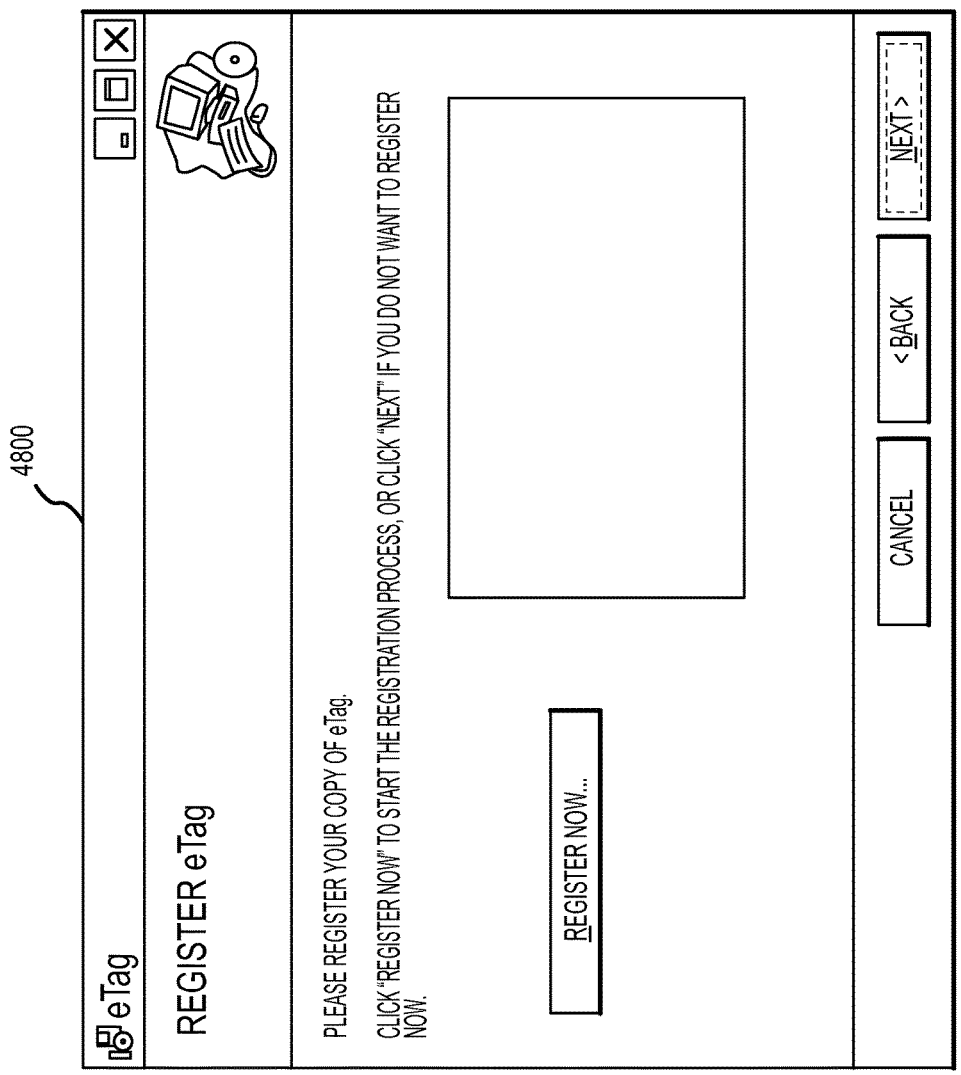
Figure 49:
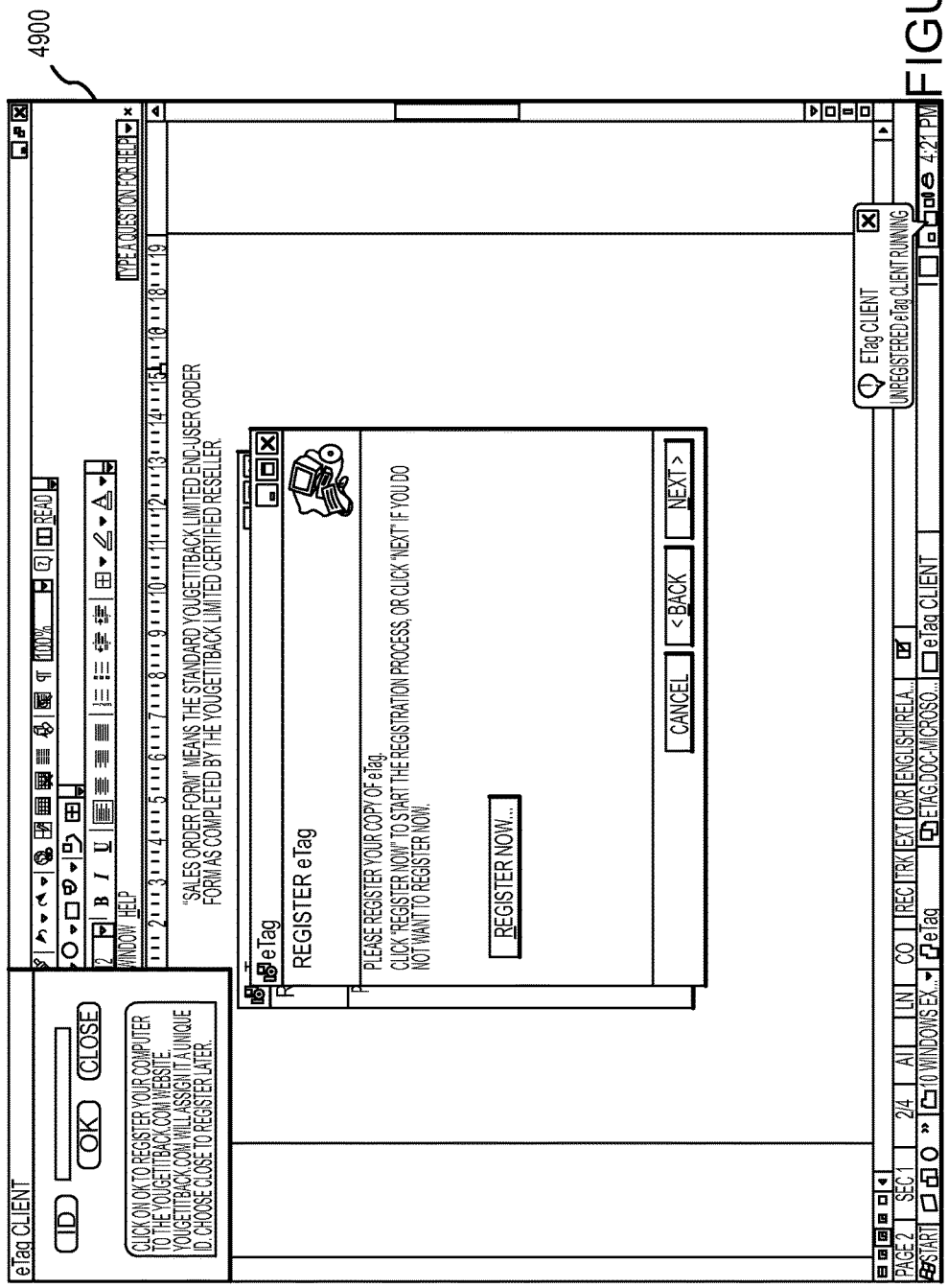
Figure 50:
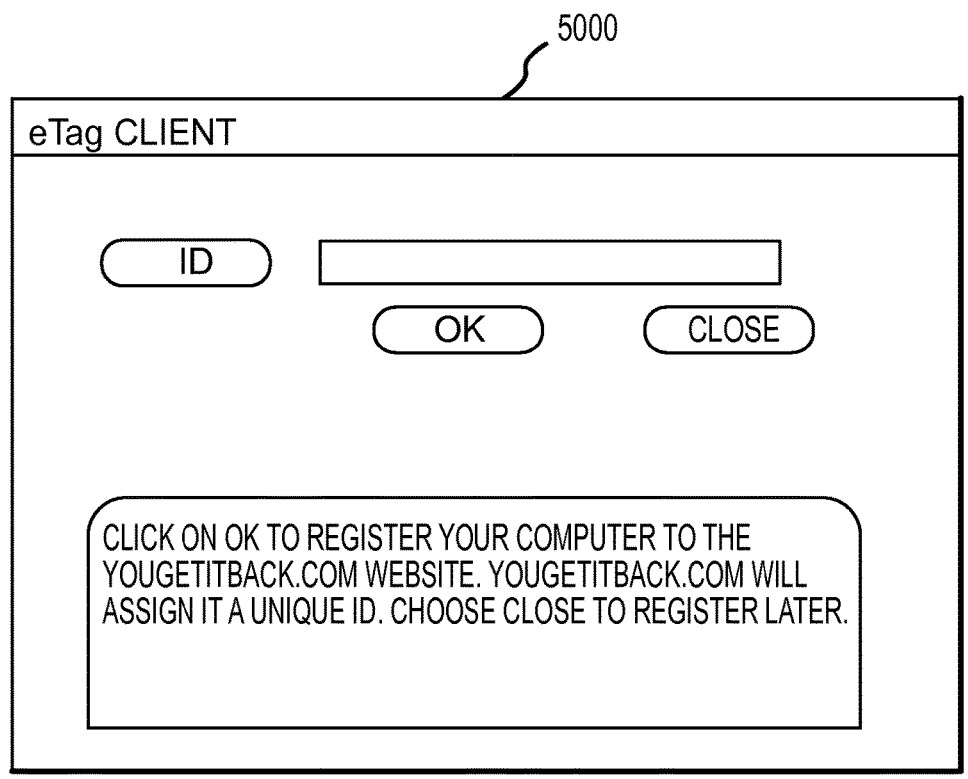
Figure 51:
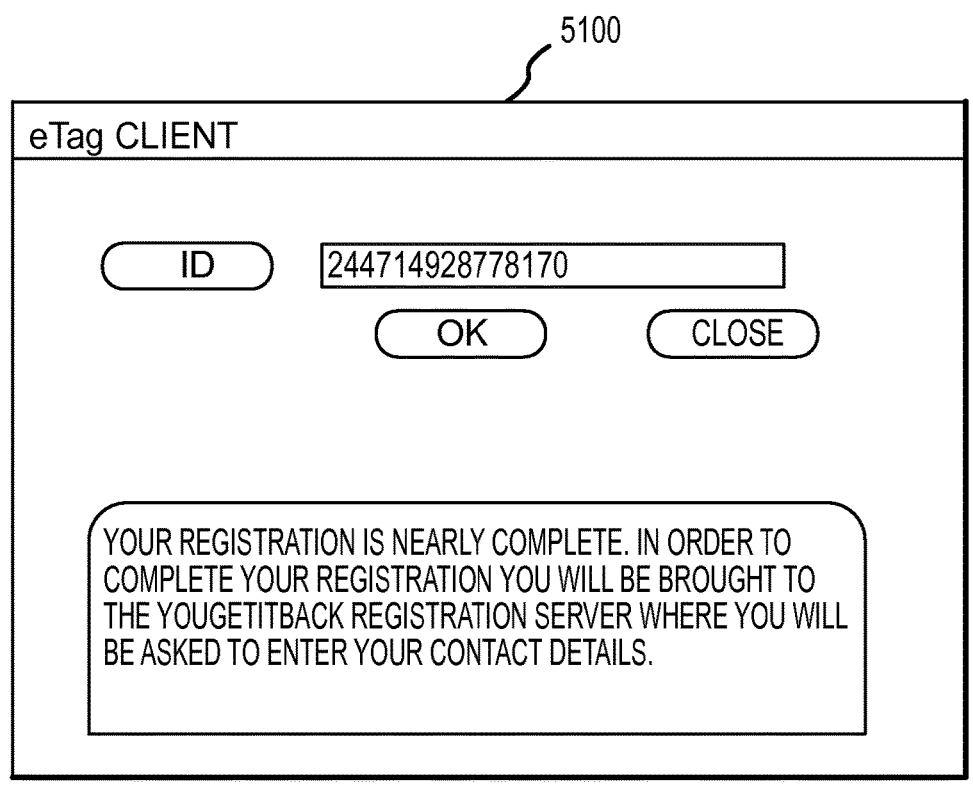
Figure 52:
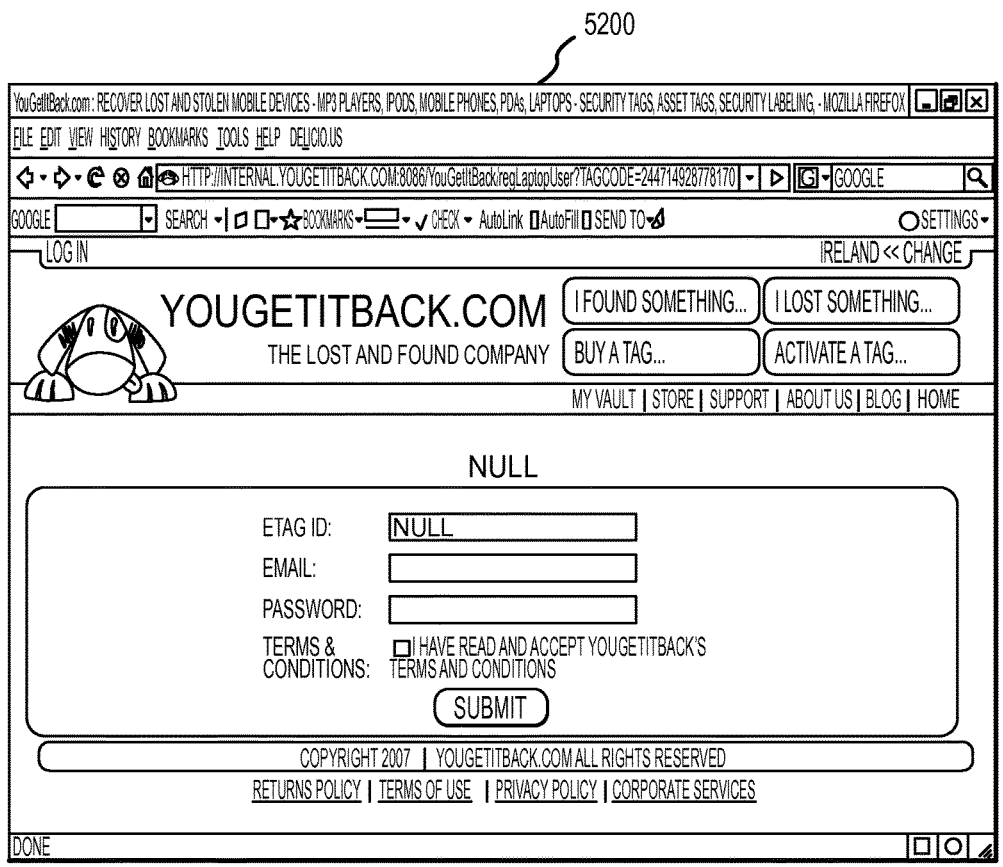
Figure 53:
Figure 54:
Figure 55:
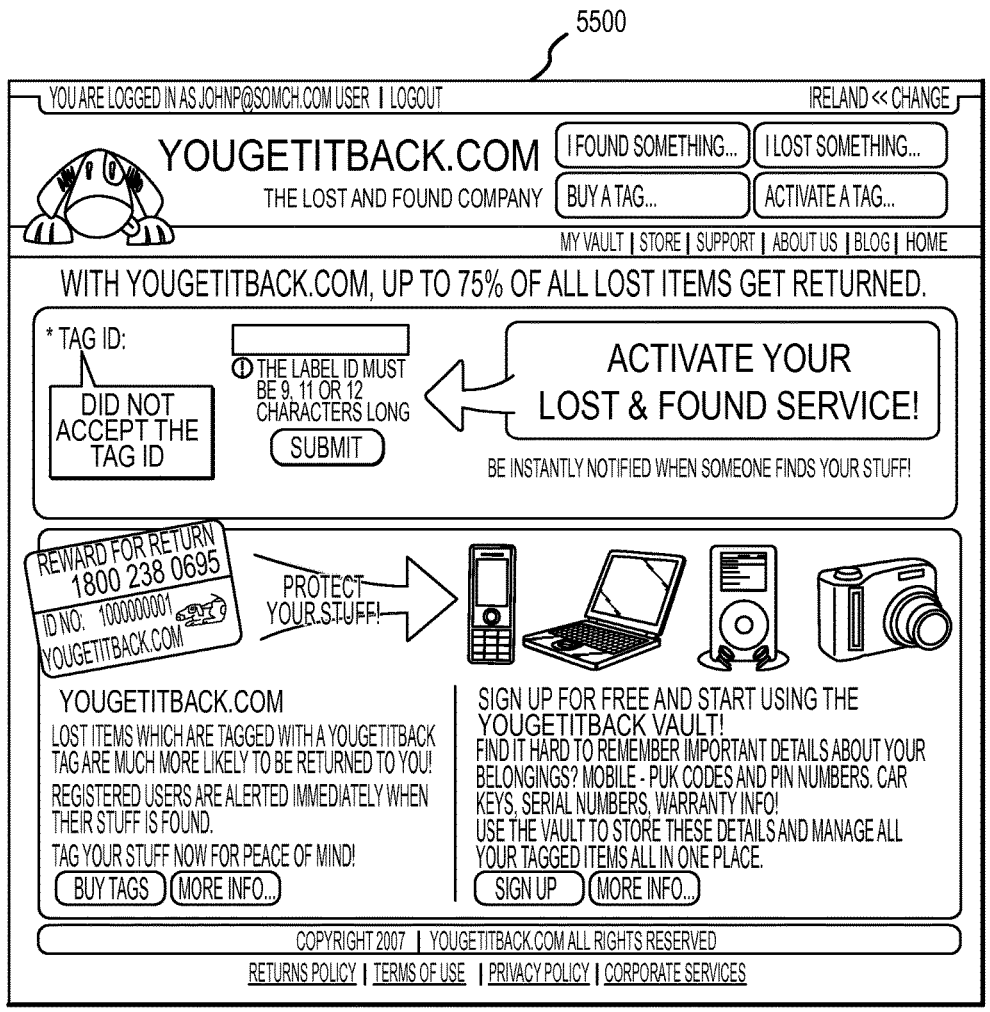
Figure 56:
Figure 57:
Figure 58:
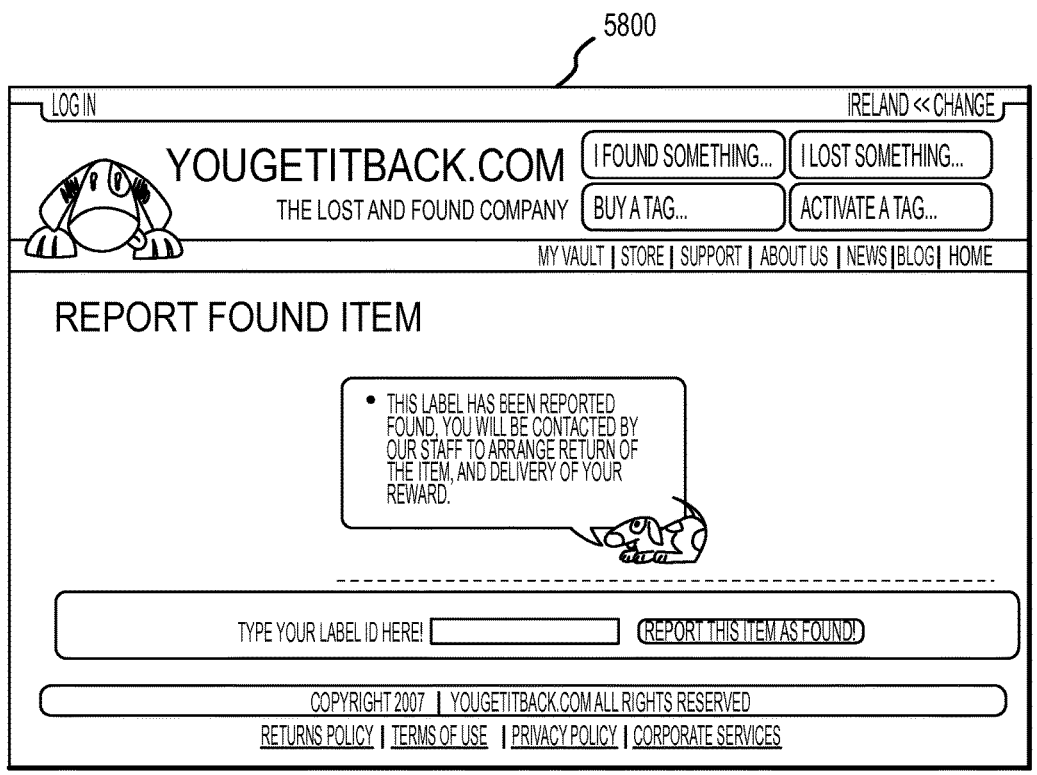
Figure 59:
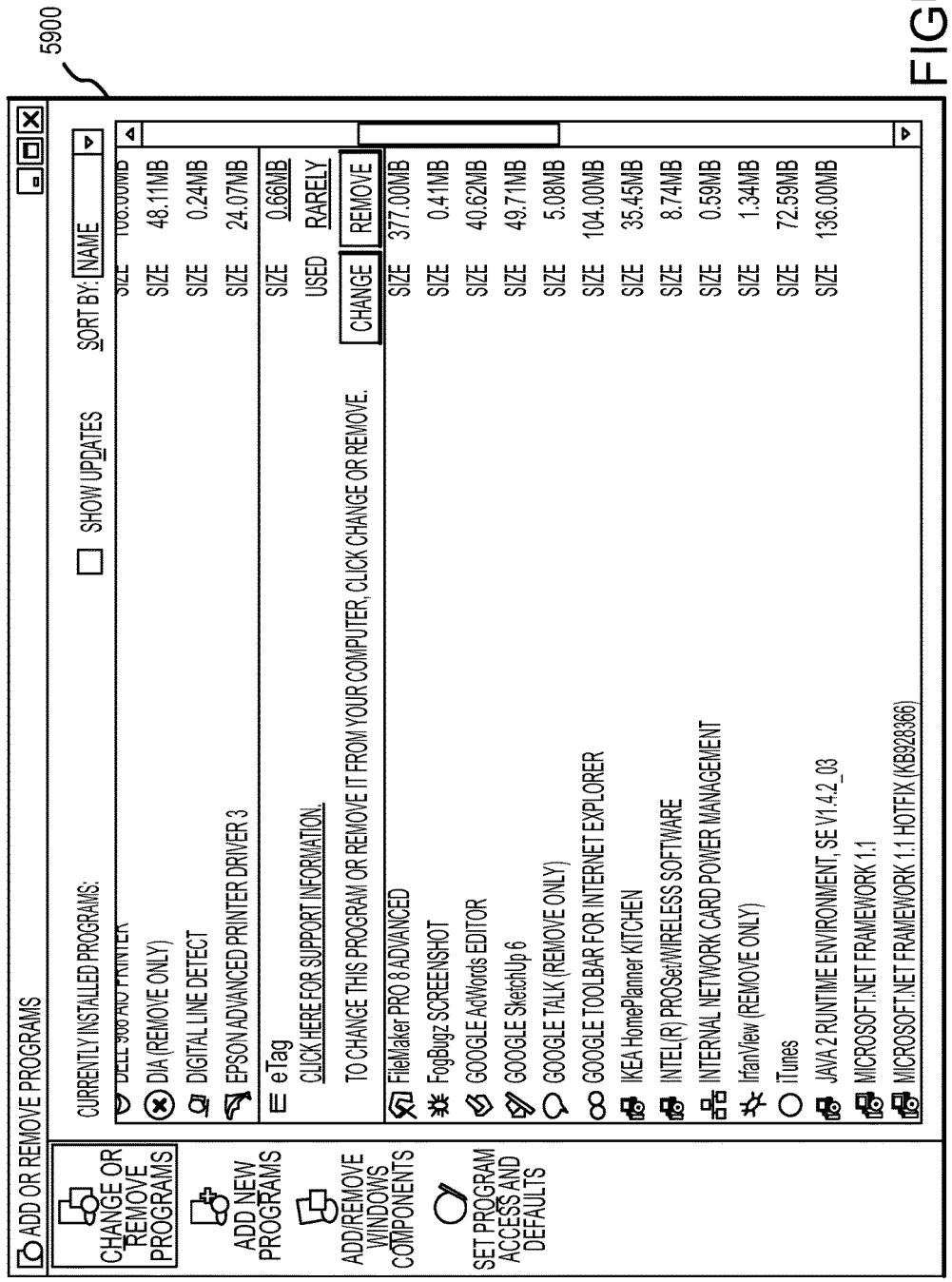
FIGS. 59-64 illustrate embodiments of the present invention showing a process for uninstalling the application from a mobile device.
Figure 60:
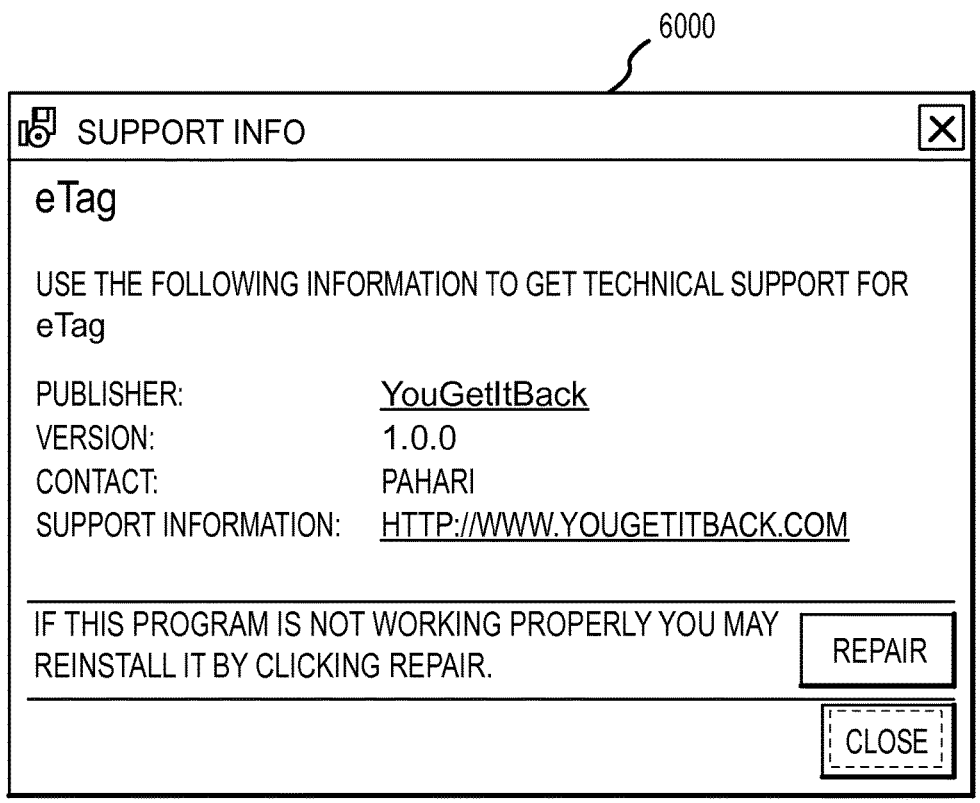
Figure 61:
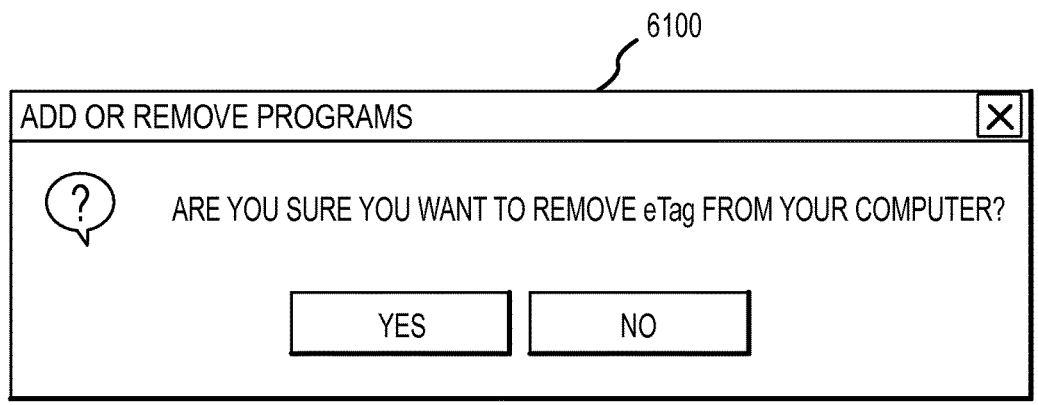
Figure 62:
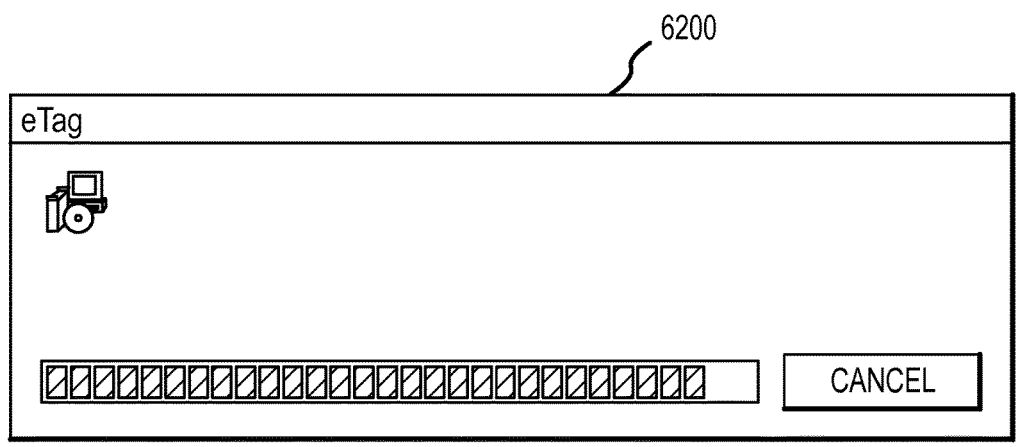
Figure 63:
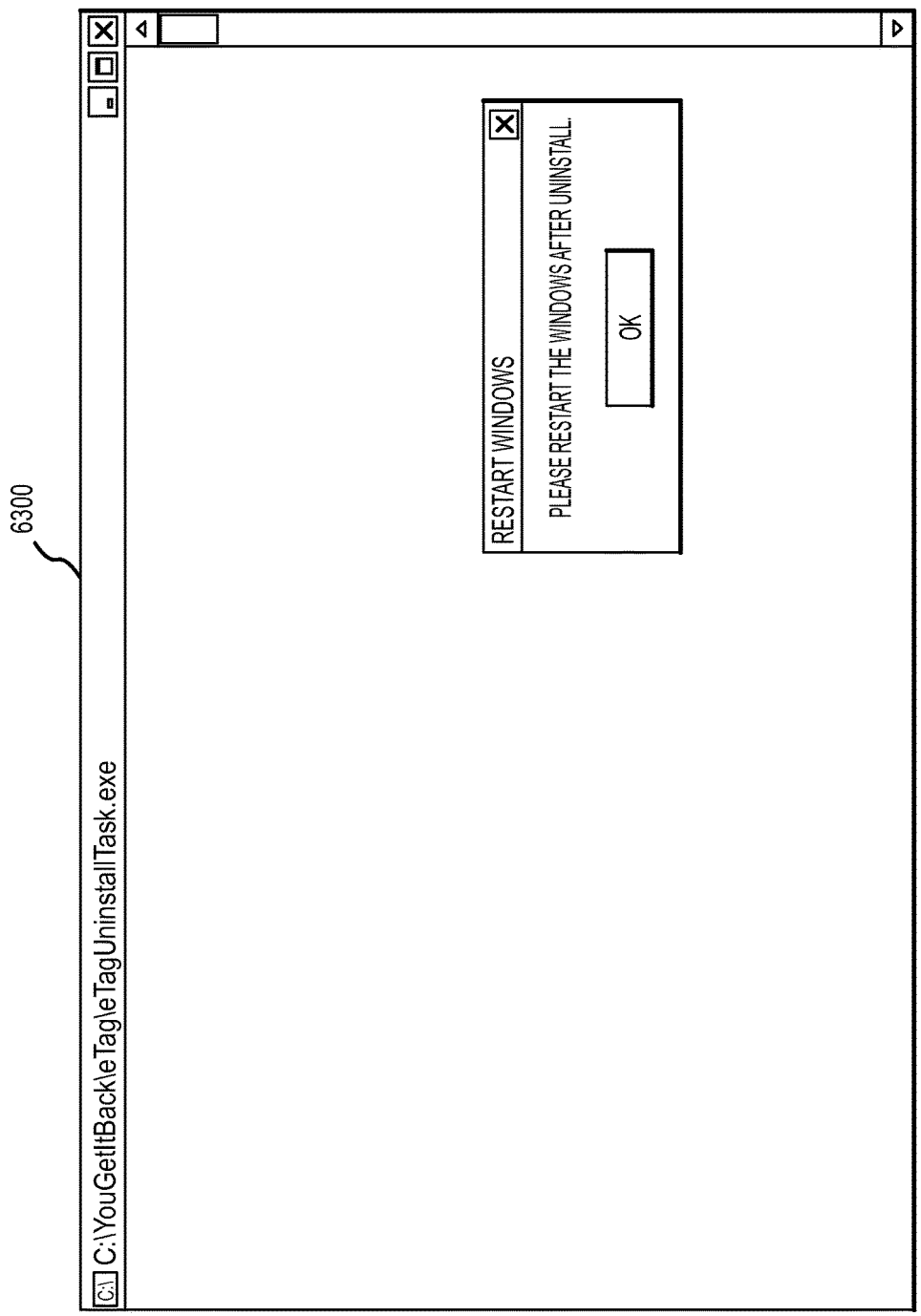

The user initiates an installation program (FIG. 38), agrees to a license agreement (FIG. 39), selects a destination in the file system of the mobile device for the software application (FIG. 40), and confirms installation of the software application (FIG. 41). The installation verifies that the software application installs properly, and if not, reinitiates the installation program (FIGS. 42-47). The user registers the software application with the host server (FIGS. 48-57). A finder of a mobile device protected in accordance with the mobile device may be directed to a web page hosted by the host server, which allows the finder to report that the mobile device has been found (FIG. 58). If desired, an authorized user may uninstall the application from the mobile device (FIG. 59-64).

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A tracking and loss mitigation system comprising:
a mobile device, the device comprising:
a user interface including a display and a data entry interface; and
a communications interface to a security authority, the communications interface configured to provide an authenticatable message from the security authority on behalf of an authorized user of the mobile device;
wherein the mobile device is configured to: provide, by the user interface of the mobile device, a notification describing how to return the mobile device to an authorized user;
receive and decode a communication from the security authority through the communications interface to the security authority, the communication initiated on behalf of a request from the authorized user of the mobile device to the security authority;
authenticate the validity of the decoded communication by one of:
computing a digest of the communication and comparing the digest value to a previously stored authorization digest value; and
decrypting at least part of the message with a public key associated with the sender of the message as part of an asymmetric encryption algorithm;
detect, from the decoding of the communication, that a security compromise event has occurred; and
determine, from the decoded communication, whether the function of the device should be altered in response to said security event; and wherein the security authority comprises one of a governmental law enforcement organization, private security firm, an insurance agency, and combinations thereof; and wherein the mobile device is further configured to detect that a security compromise event has occurred by:
associating the mobile device with a companion device; and
determining that the mobile device has been disassociated from the companion device by:
measuring a plurality of power levels of a wireless signal transmitted by the companion device;
computing an average power level from the plurality of measured power levels; measuring a current power level of a wireless signal transmitted by the companion device; and
determining that the measured current power level has varied from the average power level by a predetermined amount by: computing a standard deviation of the plurality of measured power levels; and
determining that the current power level exceeds an allowed signal range determined by a predetermined constant times the standard deviation of the plurality of measured signal.

2. The system as disclosed in claim 1, wherein the mobile device is further configured detect that a security compromise event has occurred by determining that a SIM card associated with the mobile device has been exchanged.

3. The system as disclosed in claim 1, wherein the mobile device is further configured detect that a security compromise event has occurred by determining that a SIM card associated has been removed from the mobile device.

4. The system as disclosed in claim 1, wherein the mobile device is further configured detect that a security compromise event has occurred by:
obtaining from the authorized user a set of criteria indicating unauthorized use of the mobile device; and
determining that at least one of the criteria indicating unauthorized use has occurred.

5. The system as disclosed in claim 4, wherein the criteria indicating unauthorized use of the mobile device comprise at least one of:
a maximum number of calls that may be placed to numbers not included in a pre-stored authorized number list;
a maximum number of calls that may be received by numbers not included in the pre-stored authorized number list; and
a call being placed to a country code not included in the pre-stored authorized number list.

6. The system as disclosed in claim 4, wherein the set of criteria indicating unauthorized use of the mobile device are stored in the mobile device.

7. The system as disclosed in claim 4, wherein the set of criteria indicating unauthorized use of the mobile device are stored in a database associated with the security authority.

8. The system as disclosed in claim 1, wherein the mobile device is further configured to execute an application residing in a read-only memory of the mobile device, wherein the application detects that a security compromise event has occurred.

9. The system as disclosed in claim 8 wherein the mobile device is configured to execute instructions inhibiting a current user from terminating the application if the current user is not the authorized user.

10. The system as disclosed in claim 1 wherein the mobile device is further configured to detect that a security compromise event has occurred by:
associating the mobile device with the companion device; and
determining that the mobile device has been moved relative to the location of the companion device.

11. The system as disclosed in claim 1, wherein the mobile device is further configured to format a message for transmission to the security authority, the message comprising information regarding movement of the mobile device with respect to the companion device.

12. The system as disclosed in claim 1, wherein the companion device is further configured to format a message for transmission to the security authority, the message comprising information regarding the disassociation of the mobile device with respect to the companion device.

13. The system as disclosed in claim 12, wherein the companion device is configured to transmit the formatted message to the security authority.

14. The system as disclosed in claim 12, wherein the information regarding the disassociation of the mobile device with the companion device comprises at least one of:
a date that the companion device and the mobile device were disassociated;
a time that the companion device and the mobile device were disassociated;
a location that the companion device and the mobile device were disassociated;
an identifier corresponding to the mobile device;
an identifier corresponding to the companion device; and
an identifier corresponding to a current user of the mobile device.

15. The system as disclosed in claim 1, wherein determining that the mobile device has been disassociated from the companion device comprises:
measuring a current power level of a wireless signal transmitted by the companion device; and
determining that the measured current power level has decreased by a predetermined amount.

16. The system as disclosed in claim 1 wherein the predetermined constant is 1.

17. The system as disclosed in claim 1, wherein determining that the mobile device has been disassociated from the companion device comprises:
measuring a plurality of power levels of a wireless signal transmitted by the companion device;
computing an average power level from the plurality of measured power levels;
measuring a plurality of current power levels of a wireless signal transmitted by the companion device; and
determining that for a predetermined number of times within a predetermined time period, one of the plurality of current power levels has varied from the average power level by a predetermined amount.

18. The system as disclosed in claim 11, wherein the information regarding the disassociation of the mobile device with the companion device comprises at least one of:
a date that the companion device and the mobile device were disassociated;
a time that the companion device and the mobile device were disassociated;
a location that the companion device and the mobile device were disassociated;
an identifier corresponding to the mobile device;
an identifier corresponding to the companion device; and an identifier corresponding to a current user of the mobile device.

\* \* \* \* \*